United States Patent [19]

Mostafa et al.

[11] Patent Number: 5,495,282
[45] Date of Patent: Feb. 27, 1996

[54] MONITORING SYSTEM FOR TV, CABLE AND VCR

[75] Inventors: Ayman A. Mostafa, Germantown; Wendell D. Lynch, Silver Spring; James M. Jensen, Columbia, all of Md.

[73] Assignee: The Arbitron Company, Columbia, Md.

[21] Appl. No.: 970,633

[22] Filed: Nov. 3, 1992

[51] Int. Cl.$^6$ .................................................. H04N 7/00
[52] U.S. Cl. ........................... 348/5; 348/1; 348/4; 455/2
[58] Field of Search ........................... 455/2, 67.1, 67.4, 455/6.2, 3.1, 6.2, 6.1; 348/1, 2, 4, 5, 10, 6; 358/84, 335, 189, 191.1, 192.1, 193.1

[56] References Cited

U.S. PATENT DOCUMENTS

| | | | |
|---|---|---|---|
| 3,372,233 | 3/1968 | Currey | 358/84 |
| 3,703,684 | 11/1972 | McVoy | 325/31 |
| 4,025,851 | 5/1977 | Haselwood et al. | 325/31 |
| 4,044,376 | 8/1977 | Porter | 358/84 |
| 4,058,829 | 11/1977 | Thompson | 358/84 |
| 4,230,990 | 10/1980 | Lert, Jr. et al. | 455/67 |
| 4,425,578 | 1/1984 | Haselwood et al. | 358/84 |
| 4,566,030 | 1/1986 | Nickerson et al. | 358/84 |
| 4,574,304 | 3/1986 | Watanabe et al. | 358/84 |
| 4,599,644 | 7/1986 | Fischer | 358/84 |
| 4,605,958 | 8/1986 | Machnik et al. | 358/84 |
| 4,622,583 | 11/1986 | Watanabe | 358/84 |
| 4,633,302 | 12/1986 | Damoci | 358/84 |
| 4,764,808 | 8/1988 | Solar | 358/84 |
| 4,816,904 | 3/1989 | McKenna et al. | 358/84 |
| 4,847,685 | 7/1989 | Gall et al. | 455/2 |
| 4,857,999 | 8/1989 | Welsh | 358/84 |
| 4,885,579 | 12/1989 | Sandbank | 340/825.72 |
| 4,885,632 | 12/1989 | Mabey et al. | 358/84 |
| 4,907,079 | 3/1990 | Turner et al. | 358/84 |
| 4,912,552 | 3/1990 | Allison, III et al. | 358/84 |
| 4,931,871 | 6/1990 | Kramer | 358/142 |
| 4,945,412 | 7/1990 | Kramer | 358/142 |
| 4,972,503 | 11/1990 | Zurlinden | 455/2 |
| 5,165,069 | 11/1992 | Vitt et al. | 358/335 |

Primary Examiner—Reinhard J. Eisenzopf
Assistant Examiner—Nguyen Vo
Attorney, Agent, or Firm—Curtis, Morris & Safford; Eugene L. Flanagan, III

[57] ABSTRACT

In a system for monitoring use of a video monitoring system, RF signals are injected into a cable converter and a VCR in order to detect channels selected by the cable converter and VCR. Installation of probes is not required for channel detection. Channel identification signals are also injected into the VCR and cable converter for recording by the VCR on videotape. Respective channel identification signals are provided to the cable converter and VCR with time multiplexing. The state of the "TV/VCR" switch of the VCR is determined by injecting a code signal into the VCR and determining whether that signal is present in an RF video signal output by the VCR. The system includes a switch for interconnecting the cable converter, VCR and TV and also for coupling injection signals to respective inputs of the cable converter and VCR. The system also includes an injection signal receiver that detects signals injected into and passed through the VCR and cable converter for the purpose of channel detection. The receiver also receives data contained in channel identification signals. The receiver is selectively connectable to the VCR and the cable converter. Changes in the signal source for the cable converter and VCR are optionally detected by sampling and holding signal levels during certain horizontal blanking intervals of the signal output from the cable converter or VCR. Monitoring of a system that includes two VCRs is also disclosed.

73 Claims, 22 Drawing Sheets

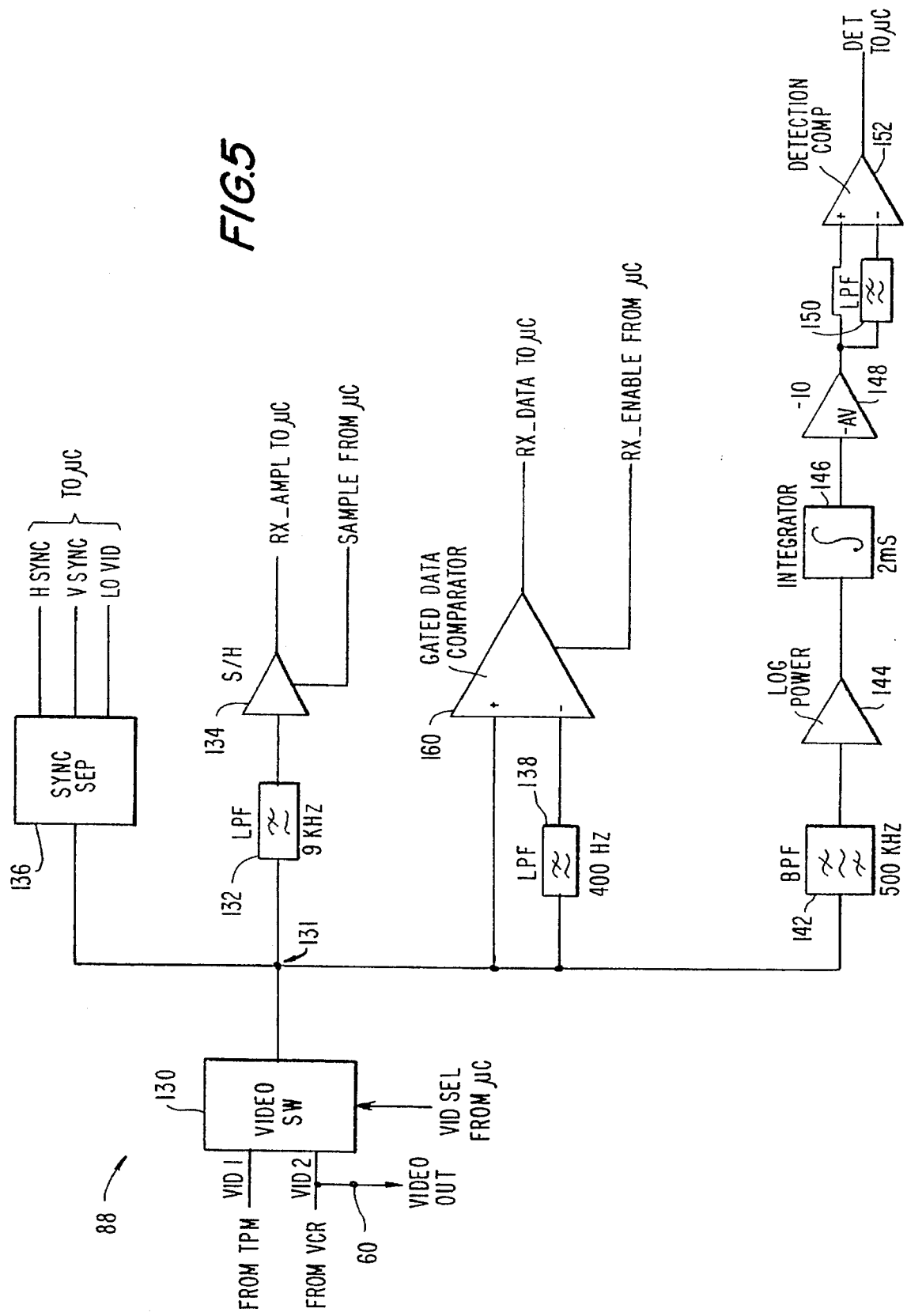

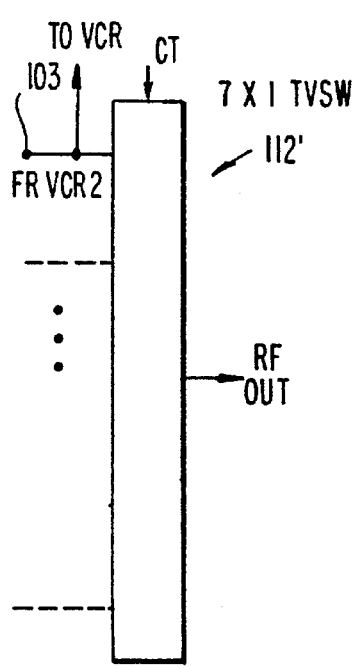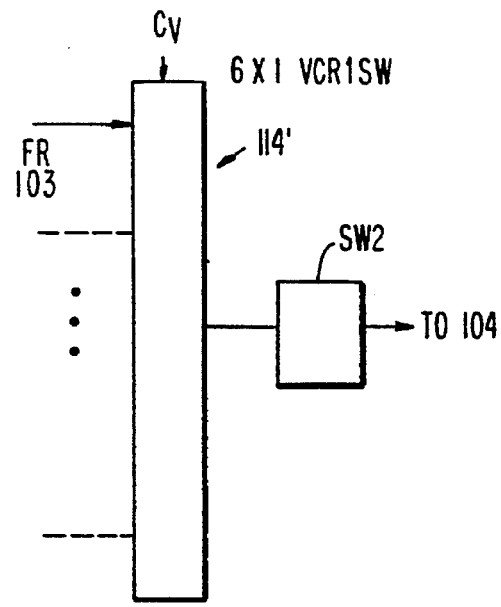
FIG.11A  FIG.11B
FIG.11D  FIG.11C
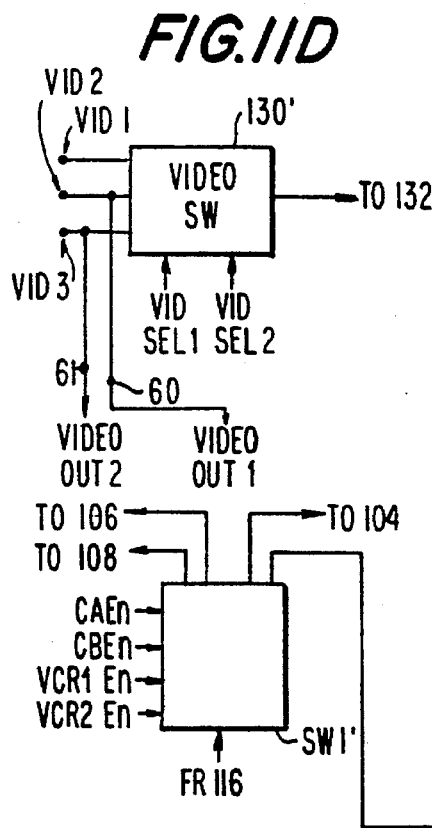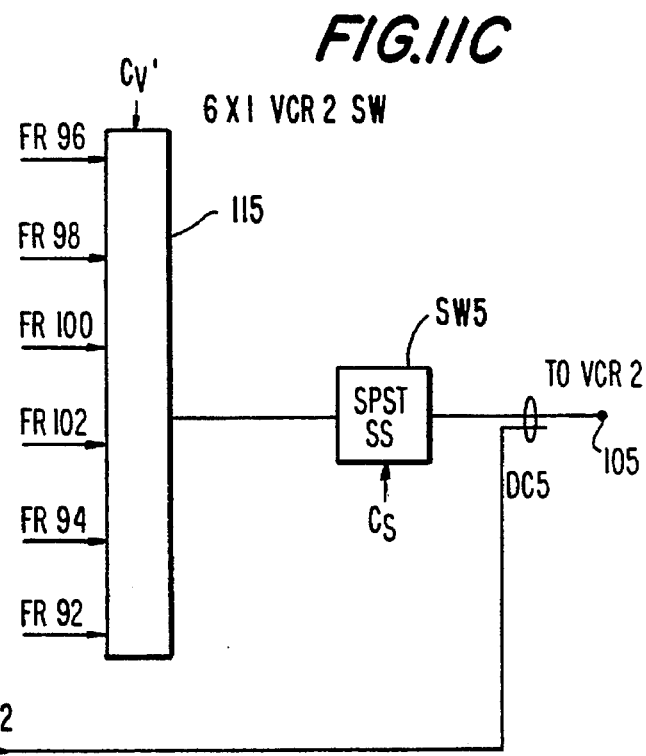

MONITORING SYSTEM FOR TV, CABLE AND VCR

FIELD OF THE INVENTION

This invention relates to monitoring usage of video monitoring systems and is particularly useful for monitoring viewing of a video monitoring system that includes a video monitor, a cable converter and a VCR.

BACKGROUND OF THE INVENTION

Electronic systems for monitoring television viewing are known. As the number of sources of television programming for the home viewer has increased, and as home viewing systems have increased in complexity, greater capabilities have been demanded of monitoring systems.

It has become common for home viewing systems to include a video cassette recorder (VCR) or a cable converter module, or both of those items of equipment, in addition to the television receiver. In a viewing system including both a VCR and a cable converter, a variety of modes of operating the system are possible. For example, a program may be viewed on the TV "off-air", i.e., from a signal received via an RF antenna, at the same time that another program, received via the cable converter, is recorded on magnetic tape by the VCR. Alternatively, a program received via the cable converter may be viewed while a program is recorded off-air by the VCR. Another possibility is that a program may be recorded off-air while a different program is viewed off-air. In still another possible mode of operation, program material previously recorded by the VCR, off-air or from cable, may be played back by the VCR and viewed on the TV. Of course, it is also possible to play back and view a prerecorded tape, such as a rented or purchased film or exercise video.

The addition of a second VCR to the viewing system can add still further possibilities, including recording of a program off-air or from cable by a first VCR at the same time that a rented or purchased videotape, or previously recorded program, is played back by the second VCR and viewed on the TV.

There is accordingly a need for a system that is capable of monitoring all of the modes of television viewing that are possible in viewing systems which include cable access and/or one or more VCRs. Such a monitoring system should also be readily adaptable to home viewing systems that do not include some or all of these elements. Moreover, since many of the people whose television viewing is to be monitored are volunteers, it is desirable that the television monitoring system be easy to use and that the system can be installed with a minimum of disruption to the viewer's equipment. It is also important that the monitoring system not impede television viewing. Further, it is a strong preference of people whose viewing is to be monitored that the monitoring system not require installation of probes or other modification of the television receiver and VCR owned by the viewer.

It is also desired that the system's needed versatility and ease of use be achieved without great expense.

OBJECTS OF THE INVENTION

It accordingly is an object of the invention to provide a method and apparatus for monitoring usage of a video monitoring system that includes a video monitor, a cable converter and/or a VCR.

It is another object of the invention to provide an apparatus for monitoring usage of a video monitoring system that can readily be adapted for use with systems that have a variety of configurations.

It is still another object of the invention to provide a method and apparatus for monitoring usage of a video monitoring system which is easy to use and install.

It is yet another object of the invention to provide a method and apparatus for monitoring the usage of a video monitoring system which eliminates or minimizes installation of probes within the components thereof.

It is still a further object of the invention that the monitoring system be capable of determining the source of program materials played back by a VCR.

It is a further object of the invention to provide a method and apparatus for monitoring viewing of a video monitoring system that includes a video monitor, a cable converter and two VCRs.

SUMMARY OF THE INVENTION

In accordance with one aspect of the present invention, the foregoing objects are met by provision of an apparatus and method for monitoring the usage of a video monitoring system that includes a video monitoring device, a cable converter and a VCR in which the apparatus is able to determine the channels selected by both the VCR and the cable converter without use of probes installed within the VCR and the cable converter. The apparatus and method comprise means for and the steps of, respectively, supplying a first channel detection signal to an input of the cable converter, receiving a signal output from the cable converter, determining whether the first channel detection signal is present in the signal output from the cable converter in order to detect which of a plurality of channels has been selected by the cable converter, supplying a second channel detection signal to an input of the VCR, receiving a signal output from the VCR and determining whether the second channel detection signal is present in the output from the VCR in order to detect which of a plurality of channels has been selected for reception by the VCR.

In this way, the apparatus can detect the respective channels to which the VCR and the cable converter are tuned without installation of probes in the VCR and cable converter.

In accordance with a further feature of the invention in certain embodiments, the means for supplying the first and second channel detection signals includes a single RF generator for generating both of the channel detection signals, thereby realizing economies in the design of the circuitry.

According to another feature of the invention in further embodiments, the means for receiving the signal output from the cable converter and the means for receiving the signal output from the VCR include a single receiver for receiving both of those signals, so that further economies in the circuitry are achieved.

In accordance with yet another feature of the invention in certain other embodiments, the receiver includes an input terminal for receiving the signals output from the VCR and the cable converter and also includes a means for selectively coupling the input terminal to a selected one of the cable converter and the VCR. This feature provides for versatile and efficient operation of the output signal receiver.

According to yet another feature of the invention in still other advantageous embodiments, the apparatus includes means for supplying a channel identification signal to the input of the VCR, which identification signal includes data that identifies the channel selected for reception by the VCR.

According to yet another feature of the invention provided in still further advantageous embodiments, the apparatus includes means for supplying a channel identification signal to the input of the cable converter, which identification signal includes data that identifies the channel selected by the cable converter. Both of the latter two features aid in identifying the source of program materials played back by the VCR.

According to yet another feature of the invention in accordance with certain other embodiments, the apparatus includes circuitry for generating the channel identification signals by modulating an RF signal generated by the RF generator. The amount of hardware required for the apparatus is thereby minimized by using the same RF generator for generation of both the channel detection and the channel identification signals.

According to another aspect of the invention, there is provided a method of and apparatus for monitoring usage of a video monitoring system that includes a video monitoring device and a VCR. The method and apparatus comprise the steps of and means for, respectively, detecting a channel to which the VCR is tuned and supplying a channel identification signal to an RF input of the VCR, which signal includes data that identifies the detected channel. In certain embodiments of the invention, a signal output by the VCR is monitored to determine whether the channel identification signal is present in the signal output by the VCR, and the channel identification signal is repeatedly supplied to the RF input at regular intervals. A change in a source of the signal output by the VCR is detected by determining that the channel identification signal is not present in the signal output by the VCR.

According to another feature of the invention in certain advantageous applications, the channel identification signal is recorded by the VCR on a magnetic tape.

This aspect of the invention as just described and its associated features make it possible to record channel identification signals on a videotape along with a television program so that when the television program is later played back, the source of the program can be identified. Another advantage of the invention is that the channel identification signal is provided to an existing input terminal of the VCR so that no modification of the VCR or installation of special components in the VCR is necessary for recording of the identification signal.

According to yet another feature of the invention in accordance with certain embodiments, for a video monitoring system that includes a second VCR, the method and apparatus described above also include the steps of and means for, respectively, detecting a channel to which the second VCR is tuned and supplying a second channel identification to an RF input of the second VCR, which signal includes data that identifies the channel to which the second VCR is tuned. According to still other advantageous embodiments of the invention, both of the channel identification signals are generated by use of a single RF generator. Thus the invention permits monitoring of the use of two VCRs included within the monitoring system while the amount of hardware necessary to carry out the invention is minimized by generating channel identification signals for both of the VCRs by using the same RF generator.

According to another aspect of the invention, there are provided a method of and an apparatus for monitoring usage of a video recording device that is tuned to a channel in order to receive a program signal, the device being selectively operable in a recording mode in which the program signal is recorded on a recording medium. The method and apparatus according to this aspect of the invention comprise the steps of and the means for, respectively, detecting the channel to which the device is tuned, detecting timing pulses of the program signal, generating an i.d. signal that identifies the detected channel, modulating an RF carrier with the i.d. signal, which carrier has a frequency related to the frequency of the detected channel, and supplying the modulated RF carrier to an RF input of the device in accordance with a timing based on the detected timing pulses of the program signal. This method allows the i.d. signal to be recorded during a blanking interval or an inactive horizontal scan line of the program signal and does not interfere with display of the program signal. Also, the modulated RF carrier which carries the i.d. signal is provided to an existing input of the VCR so that no modification of the VCR or installation of components within the VCR is required.

According to another feature of the invention, the method and apparatus just described, in certain advantageous embodiments, include the additional step of and means for determining whether the device is being operated in record mode. Further, the step of and means for supplying the modulated RF carrier to the RF input of the device include the steps of and means for, respectively, repeatedly supplying the modulated RF carrier in synchronism with a first set of scanning intervals in the program signal when it is determined that the device is not being operated in record mode and repeatedly supplying the modulated RF carrier in synchronism with a second set of scanning intervals of the program signal when it is determined that the device is being operated in record mode so that the i.d. signal is recorded on the recording medium with the program signal. The second set of intervals includes the first set of intervals and additional scanning intervals of the program signal.

In certain embodiments of the invention, the device is selectively operative in a playback mode in which signals recorded on the recording medium are played back, and the method and apparatus further include the step of determining whether or not the device is being operated in playback mode. Further, in particular embodiments the step of and means for determining whether the device is being operated in playback mode include the steps of and means for sequentially supplying a plurality of channel detection signals to the RF input of the device, monitoring signals output from the device, and determining that the device is being operated in the playback mode if none of the plurality of channel detection signals are present in the signals output by the device. According to further embodiments of the invention, the i.d. signal includes data representative of a time at which the signal was generated and the inventive method and apparatus further include the steps of and means for detecting and decoding an i.d. signal that was previously recorded on the recording medium with a program signal by monitoring the signals as the same are played back by the device. In this way there are determined a time at which and a channel from which the program signal was recorded. In certain embodiments of the invention, the step of determining whether or not the device is being operated in record mode includes detecting a level of power drawn by the device. According to an alternative feature of the invention in particular embodiments, the step of determining whether or not the device is being operated in record mode includes detecting an erase signal that is applied to the recording medium by the device when the device is being operated in record mode. According to certain embodiments of the invention, the step of and means for supplying the modulated RF carrier to the RF input of the device include the step of and means for interrupting the program signal during intervals that are in synchronism with times at which the modulated RF carrier is supplied so that the device receives only the modulated RF carrier during those intervals.

This aspect of the invention includes the advantages of conveniently recording channel identification information along with a program recorded by a VCR. Also, the playback mode of the VCR is detected without implanting a probe in the VCR. Moreover, the record mode of the VCR is also detected without implantation of a probe within the VCR. Further, the source of a program that has been recorded on the VCR can be conveniently determined by use of this method. In addition, interrupting the program signal during intervals at which the i.d. signal is supplied makes it easier to detect the i.d. signal on playback of the tape. Also, recording i.d. signals during an augmented set of scanning intervals aids in detecting the playback mode of the VCR.

According to another aspect of the invention, a method and apparatus are provided for monitoring usage of a video monitoring system that includes a video monitoring device, a cable converter and a VCR. The inventive method and apparatus include the steps of and means for, respectively, detecting which of a plurality of channels is selected for reception by the cable converter and supplying a channel identification signal to an input of the cable converter, which signal includes data that identifies the detected channel. In accordance with certain embodiments, the inventive method includes the step of recording the channel identification signal on a magnetic tape. In certain advantageous embodiments of the invention, the channel identification signal is repeatedly supplied to the input of the cable converter at regular intervals, a signal output by the cable converter is monitored to determine whether the channel identification signal is present in the signal output by the cable converter and a change of channels by the cable converter is detected by determining that the channel identification signal is not present in the signal output by the cable converter. According to yet another feature of the invention in certain embodiments, the channel detecting step and the channel detecting means include the steps of and means for, respectively, supplying a channel detection signal to the input of the cable converter, receiving signals output from the cable converter and determining whether the channel detection signal is present in the signal output from the cable converter. By use of this feature of the method and apparatus, subsequent playback of programs received via a cable converter can be detected and changes in the channel selected by the cable converter can be detected without implanting a probe in the cable converter.

According to another aspect of the invention, in a video monitoring system that includes a VCR which has an input for receiving input video signals and an RF output for outputting RF video signals, the VCR being selectively operable in a first mode in which the input video signals are passed through to the RF output without tuning and a second mode in which a tuned RF television signal is output via said RF output, a method of detecting the VCR's mode of operation is provided. The method includes the steps of supplying a code signal to the input of the VCR, receiving and tuning a signal output from the RF output, and determining whether the code signal is present in the signal that was received and tuned.

There is also provided an apparatus for detecting the mode of operation of a VCR which has an input for receiving input video signals and an RF output for outputting RF modulated video signals, the VCR being selectively operable in a first mode in which the input video signals are passed through to the RF output without tuning and a second mode in which a tuned RF video signal is output via the RF output. The apparatus includes means for supplying a code signal to the input of the VCR, means for receiving and tuning a signal output from the RF output, and means for determining whether the code signal is present in the signal that was received and tuned.

In this way, the state of the VCR's "TV/VCR" switch can be determined without implanting a probe in the VCR.

According to still another aspect of the invention, there is provided a method of and apparatus for monitoring usage of a VCR that is selectively operable in a playback mode in which the VCR outputs signals reproduced from a videotape. The method and apparatus include the steps of and means for, respectively, sequentially supplying a plurality of channel detection signals to an RF input of the VCR, monitoring signals output from the VCR, and detecting that the VCR is being operated in playback mode by determining that none of the channel detection signals are present in the signals output from the VCR. In this way a playback mode of the VCR can be detected without implanting a probe in the VCR.

According to yet another aspect of the invention, there is provided in a device for monitoring use of a video monitoring system that includes a video monitor, a cable converter and a VCR, an apparatus for interconnecting the video monitor, cable converter and VCR. The apparatus includes a plurality of input terminals for each receiving video signals from a respective source, a VCR input terminal for receiving signals output by the VCR, a tuning meter module for providing a tuned signal to the video monitor, a VCR output terminal for providing a selected signal to the VCR, first switch means for selectively coupling one of the plurality of input terminals to the VCR output terminal, second switch means for selectively coupling one of the VCR input terminal and the plurality of input terminals to the tuning/meter module and a control means for controlling operation of the first and second switch means. This device allows easy interconnection of the components of the video monitoring system while permitting monitoring of the operation thereof. In certain embodiments, the interconnecting apparatus includes an injection signal input terminal for receiving RF injection signals, two cable converter output terminals, each coupled to a respective one of the cable input terminals, for providing cable television signals to the cable converter and a third switch means controlled by the control means for coupling the injection signal input terminal to a selected one of the three output terminals. This additional feature facilitates application of monitoring signals to the VCR and the cable converter.

In a preferred embodiment of the invention, the plurality of input terminals consists of an antenna input terminal for receiving broadcast television signals from an antenna, an auxiliary input terminal for receiving signals from an auxiliary source, a first cable input terminal for receiving cable television signals from a first cable, a second cable input terminal for receiving cable television signals from a second cable, and a cable converter input terminal for receiving signals output by the cable converter.

In certain embodiments, the interconnection apparatus includes a second VCR input for receiving signals output by a second VCR, a second VCR output terminal for providing a selected signal to the second VCR and a third switch for selectively coupling to the second VCR output terminal a selected one of the input terminals other than the second VCR input terminal. The second switch means includes means for selectively coupling the second VCR input terminal to the tuning/meter module and the first switch includes means for selectively coupling the second VCR input terminal to the VCR output terminal that is not the second VCR output terminal. In such embodiments, there is a capability for interconnecting components of a video monitoring system that includes two VCRs so that convenient monitoring of such a system can be carried out.

There is also provided a method of operating a device for monitoring usage of a video monitoring system that includes a VCR, the device including a tuning/meter module for providing a tuned signal to a video monitor, and also including a plurality of input terminals selected from an antenna input terminal for receiving broadcast television signals from an antenna, an auxiliary input terminal for receiving signals from an auxiliary source, a first cable input terminal for receiving cable television signals from a first cable, a second input terminal for receiving cable television signals from a second cable, and a cable converter input terminal for receiving signals output by a cable converter, the device further including a VCR input terminal for receiving signals output from the VCR. The method includes the steps of connecting an input of the VCR to a selected one of the plurality of input terminals, and connecting an input of the tuning/meter module to a selected one of the VCR input terminal and the plurality of input terminals.

According to yet another aspect of the invention, an apparatus for receiving channel detection and channel identification signals applied to and transmitted through an RF channel selection device includes an input terminal for receiving signals output from the channel selection device, means connected to the input terminal for generating a hit signal in response to the channel detection being present at the input terminal and means connected to the input terminal for transmitting data contained in the received channel identification signal. The above-described signal receiving apparatus efficiently receives both channel detection and channel identification signals in a system for monitoring use of a video monitoring system.

In certain embodiments of the invention, the channel detection and channel identification receiving apparatus includes switch means that selectively couples its input terminal to one of a plurality of channel selection devices. In this way, a single receiving device is used in the monitoring of a plurality of channel selection devices. The channel detection and channel identification signal receiving apparatus includes means for transmitting signals indicative of timing pulses present in RF signals output from the channel selection device. This feature aids in supplying identification signals to a channel selecting device at times during which the signals will not interfere with display of a program signal.

In certain embodiments, the channel detection and channel identification signal receiving apparatus includes means for transmitting a signal indicative of a level of the RF signals output by the channel selection device being below a predetermined level. This feature of the apparatus makes it possible to detect when a poor or low signal is being output by the channel selection device.

In certain embodiments, the channel detection and channel identification signal receiving apparatus includes means for sampling and holding an average level of an interval of signals received at the input terminal. This feature assists in determining when the channel selection device has changed channels.

In some embodiments, the hit signal generating circuit of the channel detection and channel identification signal receiving apparatus includes means for generating a log power signal that varies as a function of the logarithm of the spectral energy, in a predetermined frequency band, of a signal present at the input terminal, means for integrating the log power signal, means for amplifying the integrated log power signal, means for averaging the amplified signal to produce a reference signal, and means for comparing the amplified signal to the reference signal and generating the hit signal in response to the level of the amplified signal exceeding the level of the reference signal by a predetermined factor. This construction of the hit signal generating circuit helps to prevent generation of spurious hit signals in response to signal spikes, interference from the program signal, and the like.

In certain embodiments, the data transmitting means of the channel detection and channel identification signal receiving apparatus includes means responsive to a control signal supplied thereto for preventing the data transmitting means from transmitting data at times other than intervals determined on the basis of timing pulses present in the signals output from the channel selection device. This construction of the data transmitting means helps to prevent errors caused by spurious data transmissions.

In certain alternative embodiments, the channel detection and channel identification signal receiving apparatus includes means for transmitting signals indicative of a level of at least one of the channel detection and channel identification signals. This feature assists in automatic gain control for the circuitry which generates the channel detection and channel identification signals.

In some alternative embodiments, the hit signal generating circuit of the channel detection and the channel identification signal receiving apparatus includes means for generating a ramp signal in response to the channel detection signal being present at the input terminal, means for differentiating the ramp signal, means for filtering the differentiated signal, means for buffering the filtered signal, and means for comparing the buffered signal against a reference level and generating the hit signal in response to the buffered signal being not less than the reference level. This construction of the hit signal generating circuit helps to prevent generation of spurious hit signals in response to signal spikes, interference from the program signal, and the like.

According to yet another aspect of the invention, there is provided a method of, and apparatus for determining whether a channel selection device is receiving an input signal from a predetermined signal source. The method and apparatus include the steps of and means for, respectively, receiving a video baseband signal originating from the channel selection device, which signal has vertical blanking intervals that each include a plurality of horizontal scanning intervals, separating vertical and horizontal synchronizing signals from the received video baseband signal, selecting ones of the plurality of horizontal scanning intervals in one of the vertical blanking intervals of the received video baseband signal, generating a respective sample level for each of the selected horizontal scanning intervals by sampling and holding a level of the received video baseband signal during the respective selected horizontal scanning interval, storing the generated sample levels and comparing the stored sample levels. In certain embodiments the input signal to the channel selection device is an RF video signal and the predetermined signal source is a predetermined channel; and first, second and third horizontal scanning intervals are selected, the input signal is interrupted during the second and third horizontal scanning intervals, and a substitute RF video signal is supplied to the channel selection device during the third horizontal scanning interval. The substitute RF video signal is at a frequency related to the predetermined channel. It is then determined whether the stored sample level corresponding to the third horizontal scanning interval is closer to the stored sample level corresponding to the first horizontal scanning interval or is closer to the stored sample level corresponding to the second horizontal scanning interval.

In certain embodiments of the invention in which the predetermined signal source is a cable over which a plurality of programs are transmitted simultaneously on respective channels, first and second horizontal scanning intervals are selected and the cable is disconnected from the channel selection device during the second horizontal scanning interval. It is then determined whether stored sample levels corresponding to the first and second horizontal scanning intervals differ by less than a predetermined amount.

By this method and apparatus there can be efficiently carried out a maintenance mode of operation in which changes in selected channels can be detected.

It is not intended that the invention be summarized here in its entirety. Rather, further features, aspects and advantages of the invention will be set forth in or apparent from the following description and drawings.

BRIEF DESCRIPTION OF THE DRAWINGS

FIG. 5 is a block diagram of an injection signal receiver that is part of the tuning and monitoring module of FIG. 2;

FIGS. 11A–11D are partial block diagrams that illustrate aspects of the tuning and monitoring module of FIG. 10.

DETAILED DESCRIPTION OF THE PREFERRED EMBODIMENTS

SYSTEM OVERVIEW

Figure 1:
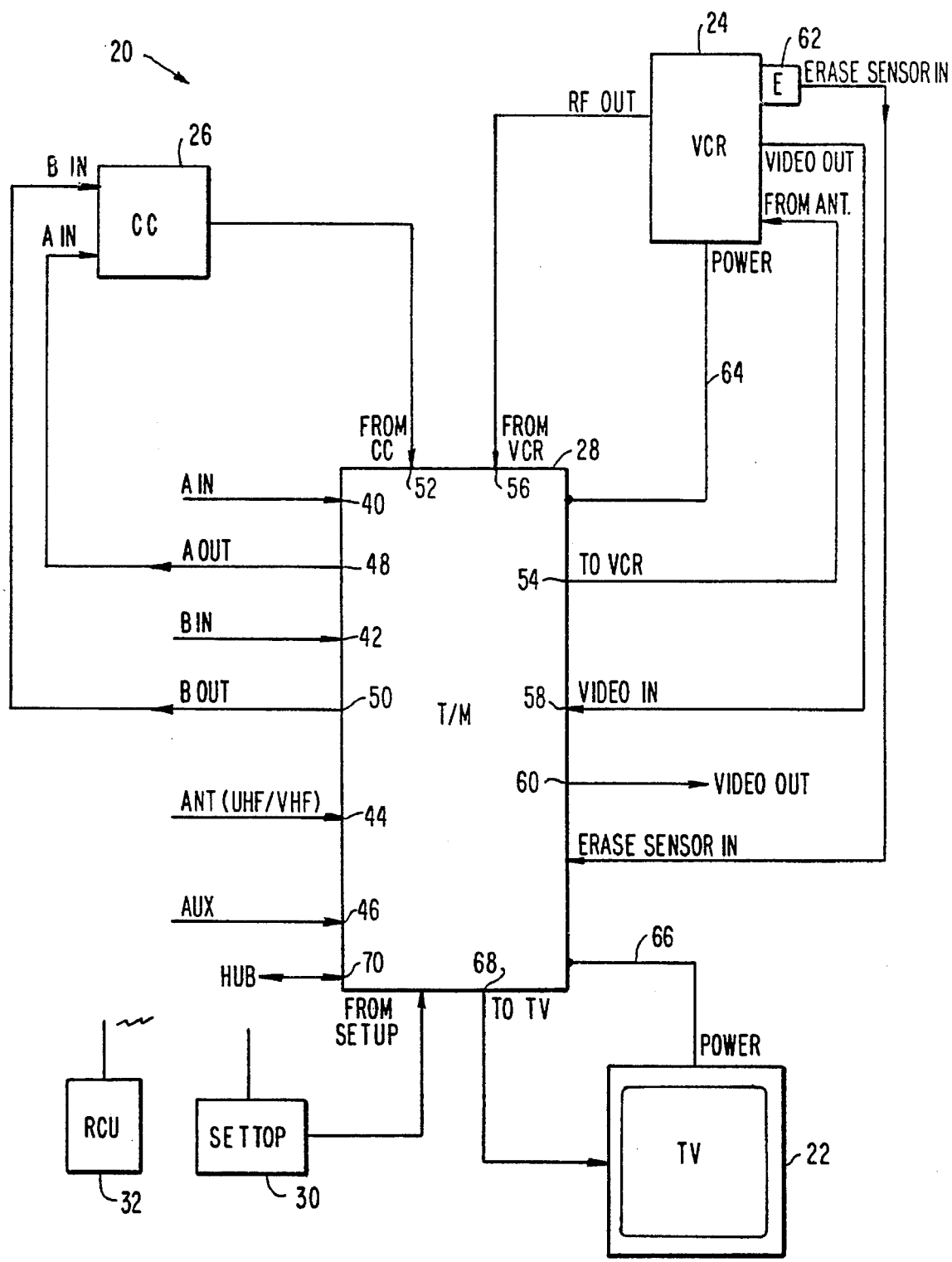
FIG. 1 is a block diagram of a video monitoring system that includes a tuning and monitoring module in accordance with the present invention.

Referring now to FIG. 1, a video monitoring system, generally indicated by reference numeral 20, includes a television receiver 22, a VCR 24 and a cable converter 26. Interconnected with TV 22, VCR 24 and cable converter 26 is a tuning/monitoring ("T/M") module 28 constructed in accordance with the present invention.

T/M module 28 has connected thereto a set top unit 30 by which a user of the system can transmit command data to T/M module 28 and system 20. Set top unit 30 may include a keyboard (not shown for purposes for simplicity and clarity) for entering commands such as channel selection commands or commands selecting the VCR 24 or cable converter 26 or another source of program signals for TV 22.

Preferably there is also provided a remote control unit (RCU) 32 which is in wireless communication (by infrared radiation, for example) with set top unit 30. RCU 32 includes a keyboard (not shown for purposes of simplicity and clarity) for entry of commands of the sort just described. As will be understood by those skilled in the art, RCU 32 is preferably also operable to respond to viewer identification inquiries that are displayed on TV 22 by T/M module 28.

In a preferred embodiment of T/M module 28, the module includes inputs for receiving program and other video signals from a variety of sources. For example, these inputs may include a terminal 40 for receiving a group of program signals from a first cable, an input terminal 42 for receiving a group of program signals from a second cable, input terminal 44 for receiving "off-air" UHF and VHF signals from an antenna, and input terminal 46 for receiving signals from an auxiliary source such as a computer or a video game. There will now be described the respective interconnections between T/M module 28 and TV 22, VCR 24 and cable converter 26.

T/M module 28 is connected to cable converter 26 through output terminals 48 and 50 of module 28, from which are output the respective groups of signals received from the first and second cables. T/M module 28 receives on an input terminal 52 the output of cable converter 26, which typically is a channel selected by cable converter 26 from among the two groups of signals provided on the two cables.

T/M module 28 is connected to VCR 24 by an output terminal 54 through which RF video signals are output to VCR 24 and by an input terminal 56 to which the VCR 24 supplies RF video signals. T/M module 28 also has a video input terminal 58 to which VCR 24 provides video baseband signals. These same video baseband signals may be taken out of T/M module 28 at a video output terminal 60. An erase sensor pickup 62 is associated with VCR 24 and provides to T/M module 28 signals indicative of operation of an erase head of VCR 24. As will be described in more detail below, these signals are used to detect when VCR 24 is operating in a record mode. VCR 24 also has a power cord 64 which is plugged into an appropriate receptacle of T/M module 28 to receive power therefrom.

TV 22 has a power cord 66 which also is plugged into an appropriate receptacle of T/M module 28 for receiving power therefrom. As will be discussed below, the monitoring operations performed by T/M module 28 include sensing when TV 22 and VCR 24 are in operation by detecting a level of power drawn thereby.

T/M module 28 also has an output terminal 68 by which it supplies to TV 22 an RF video signal to be displayed on TV 22. Preferably output terminal 68 is the only source of television signals to TV 22.

T/M module 28 also includes a data port 70, by means of which T/M module 28 is in data communication with a hub unit (not shown for purposes of simplicity and clarity) which periodically collects monitoring data from T/M module 28 and which may also be operative to control at least some of the modes of operation of T/M module 28. The hub unit may also receive information from, and control, other T/M modules located in the same household or in other households and may be of the type disclosed in U.S. Pat. No. 4,912,552.

TUNING/MONITORING MODULE

Figure 2:
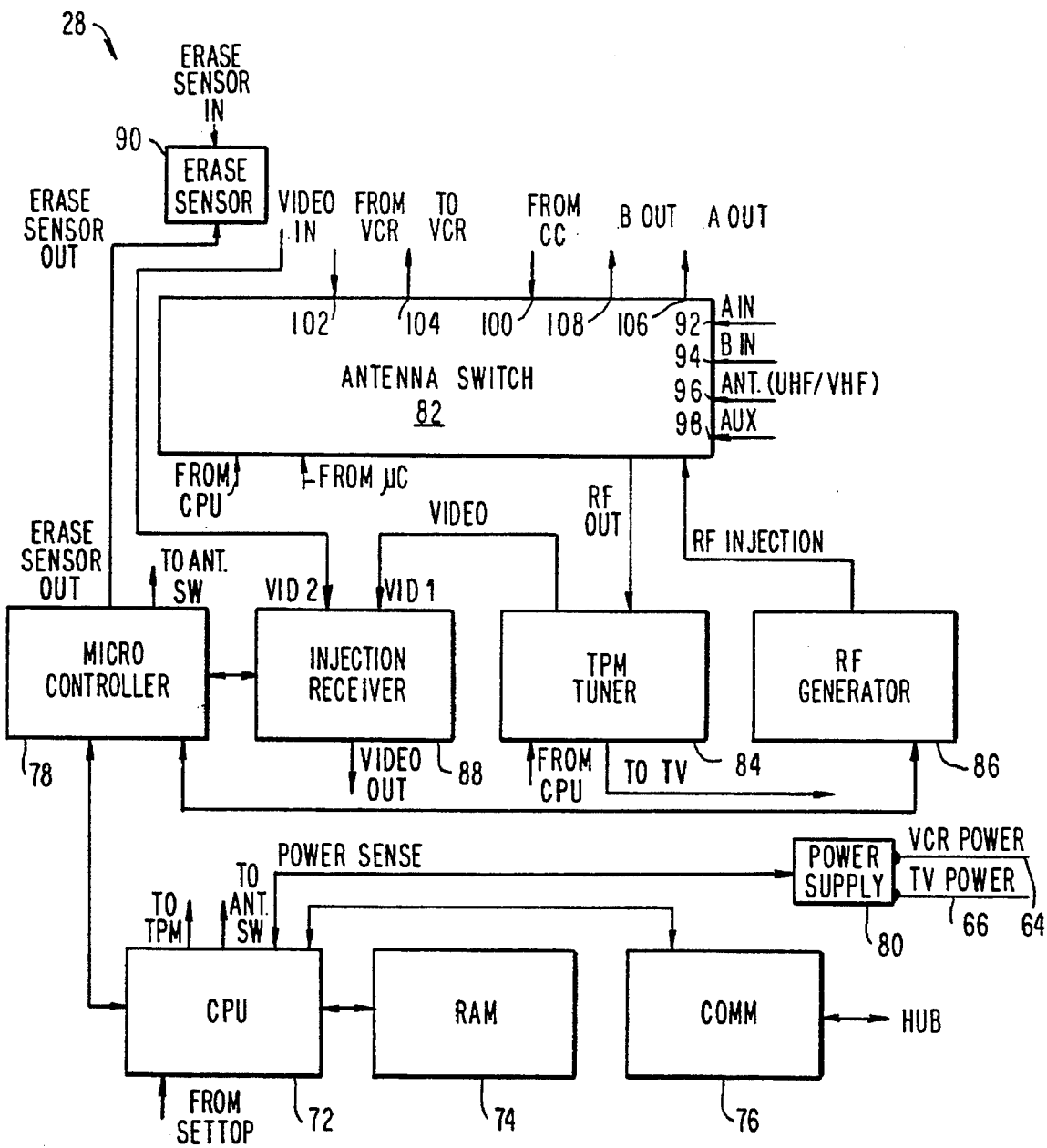
FIG. 2 is a block diagram of a tuning and monitoring module in accordance with the present invention.

Tuning/monitoring module 28 is illustrated in block diagram form in FIG. 2.

T/M module 28 includes a CPU 72, which may be, for example a model Z84C015 microprocessor available from Zilog, Inc., Campbell, Calif. CPU 72 is connected for data communication with a RAM 74 and communications submodule 76. CPU 72 is also connected to a program storage device (not shown for purposes of simplicity and clarity), such as a ROM, in which is stored a program for controlling CPU 72.

Also connected for data communication with CPU 72 is a microcontroller 78. CPU 72 also exchanges data with a power supply 80, into which power cords 64 and 66 are plugged. Further, CPU 72 supplies control signals to control operations of an antenna switch 82 and CPU 72 also is connected to and controls operations of a tuning people meter ("TPM") submodule 84. The connections between CPU 72 and antenna switch 80 and TPM submodule 84 respectively are shown in interrupted form in order to simplify the drawing.

Microcontroller 78 may be a conventional microcontroller such as the model SAB 80C535 available from Siemens Corporation, Iselin, N.J., and as is conventional has a RAM and ROM (not shown for purposes of simplicity and clarity) associated therewith. Preferably microcontroller 78 is also selected so as to include on-board analog-to-digital conversion capability. Microcontroller 78 is connected with an RF generator 86 and an injection receiver 88 and controls the operation thereof. Microcontroller 78 is also connected for data communication with erase sensor electronics submodule 90, which receives and processes signals received from erase sensor pickup 62 (FIG. 1).

Referring again to FIG. 2, microcontroller 78 is connected to provide control signals to antenna switch 82 for controlling operations thereof not under the control CPU 72. The connection between microcontroller 78 and antenna switch 82 is shown in interrupted form in order to simplify the drawing.

RF generator 86 is connected to an RF input of antenna switch 82 and supplies thereto an RF injection signal that is generated under control of microcontroller 78.

TPM submodule 84 receives an RF video signal from an RF output of antenna switch 82 and outputs an RF video signal which is supplied to TV 22 via output terminal 68 (FIG. 1). TPM submodule 84 also outputs a video baseband signal.

Injection receiver 88 (FIG. 2) has input terminals VID1 and VID2, for respectively receiving the video baseband signal output by TPM submodule 84 and a video baseband signal received from VCR 24 via input terminal 58 (FIG. 1). Referring again to FIG. 2, the video baseband signal received by injection receiver 88 on its input terminal VID2 passes through injection receiver 88 and is supplied to output terminal 60 (FIG. 1).

Antenna switch 82 (FIG. 2) has input terminals 92, 94, 96 and 98 which respectively are for receiving cable television signals from a first cable, receiving cable television signals from a second cable, receiving broadcast television signals from an antenna, and receiving signals from an auxiliary source, and which respectively correspond to input terminals 40, 42, 44 and 46 of FIG. 1. Antenna switch 82 also has input terminals 100 and 102 for respectively receiving RF signals output by cable converter 26 and VCR 24 and which respectively correspond to input terminals 52 and 56 of FIG. 1. Further, antenna switch 82 has an output terminal 104 for providing RF signals to VCR 24 and output terminals 106 and 108 for respectively providing to cable converter 26 the cable television signals received from the first and second cables.

ANTENNA SWITCH

Figure 3:
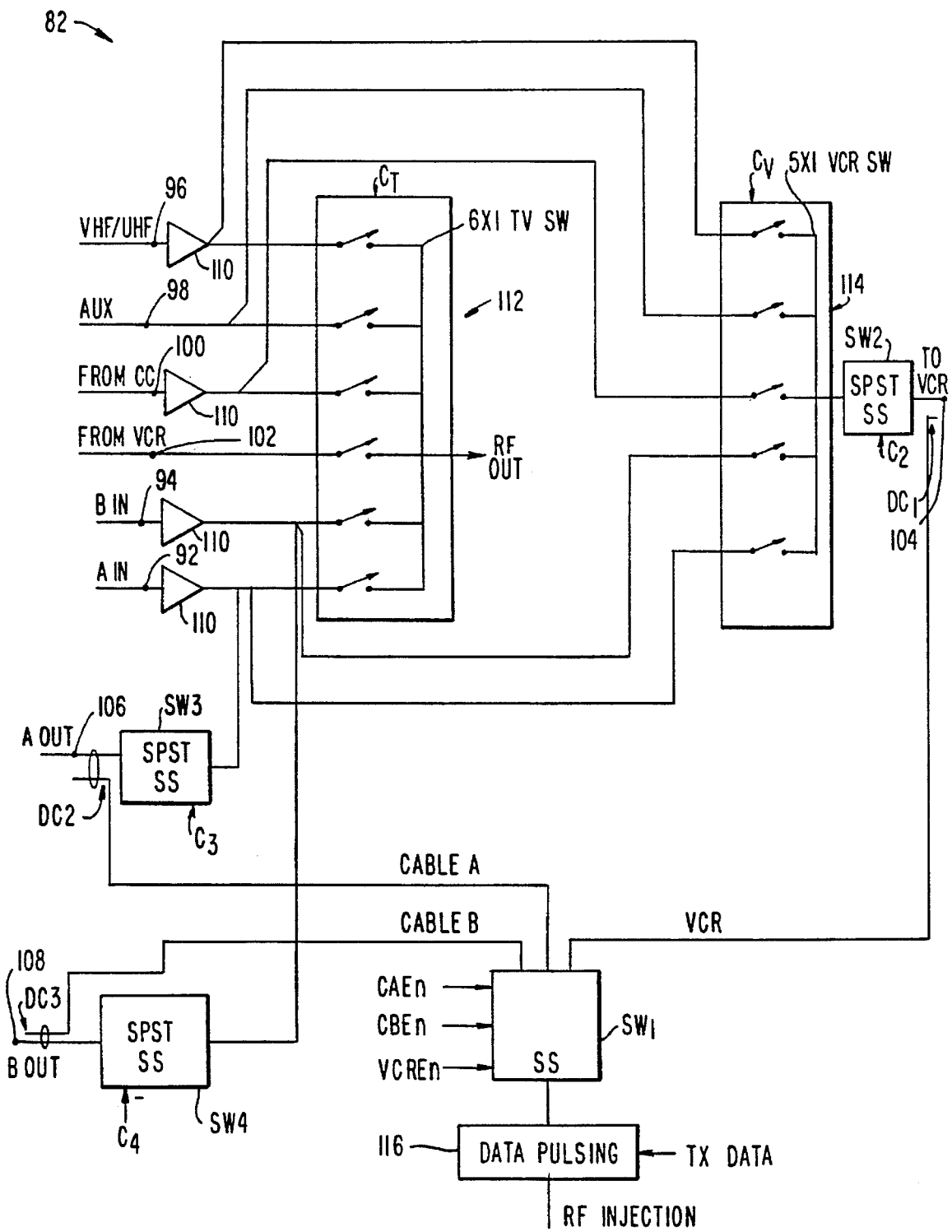
FIG. 3 is a simplified schematic drawing of an antenna switch that is part of the tuning and monitoring module of FIG. 2.

Antenna switch 82 is schematically illustrated in FIG. 3, in which reference numerals 92, 94, 96, 98, 100 and 102 indicate the same input terminals illustrated in FIG. 2 and reference numerals 104, 106 and 108 indicate the same output terminals shown in FIG. 2.

Referring now to FIG. 3, input terminals 92, 94, 96 and 100 are coupled through respective amplifiers 110 to respective inputs of six-input/one-output switch 112 and also, again through amplifiers 110, to respective inputs of five-input/one-output switch 114. Input terminals 98 and 102 are directly connected to respective inputs of switch 112 and input terminal 98 is also connected to an input of switch 114. Operation of switch 112 is controlled by control signal $c_T$ provided by CPU 72 and operation of switch 114 is controlled by control signal $c_V$ provided by CPU 72. The output of switch 112 is connected to TPM submodule 84 so as to supply an RF video signal thereto and the output of switch 114 is connected to a switch SW2 which operates under control of a control signal $c_2$ provided by microcontroller 78 to selectively connect the output of switch 114 to output terminal 104 through which RF video signals are supplied to VCR 24.

Input terminal 92 is connected through its respective amplifier 110 to a switch SW3. Switch SW3 is operable under control of a control signal $c_3$ supplied by microcontroller 78, to selectively connect input terminal 92 to output terminal 106.

Input terminal 94 is coupled through its respective amplifier 110 to a switch SW4. Switch SW4 is operable under control of control signal $c_4$, supplied by microcontroller 78, to selectively connect input terminal 94 to output terminal 108.

It will therefore be seen that antenna switch 82 is capable of selectively providing to TV 22 (through TPM submodule 84) any one of six signal sources, namely first cable, second cable, antenna, auxiliary, cable converter output and VCR output. Antenna switch 82 is also operable to either interrupt a source of signals to VCR 24 or to supply thereto any one of the foregoing six sources other than the VCR output. It will also be recognized that antenna switch 82 is operable to selectively supply to cable converter 26 one or the other, or both or neither, of the groups of television signals received from the first and second cables.

It is also within the contemplation of this invention that antenna switch 82 have more or fewer input terminals than those shown in FIG. 3. Thus, antenna switch 82 may include, in addition to VCR input terminal 102, a plurality of input terminals selected from an antenna input terminal, an auxiliary input terminal, first and second cable input terminals and a cable converter input terminal.

In addition to the television signal switching capability just described, antenna switch 82 also selectively provides RF injection signals to VCR 24 and cable converter 26 for the purpose of channel detection and channel identification. Thus, antenna switch 82 includes data pulsing switch 116, to which is supplied an RF injection signal generated by RF generator 86. Under control of data signals provided by microcontroller 78, switch 116 is operable to either interrupt or pass through the RF injection signal. Switch SW1 is connected to the input of switch 116. Under control of control signals CAEn, CBEn and VCREn provided by microcontroller 78, switch SW1 selectively couples the output of switch 116 to VCR output terminal 104 (through directional coupler DC1), cable A output terminal 106 (through directional coupler DC2) or cable B output terminal 108 (through directional coupler DC3). SW1 is also operable to couple the output of switch 116 to both cable converter output terminals 106 and 108 simultaneously.

In antenna switch 82, switches SW1, 112 and 114 preferably comprise relays since good isolation from noise is required but fast switching is not necessary. On the other hand, switches SW2, SW3 and SW4 are preferably solid state switches because a shorter switching time (for example, less than one microsecond) is desired.

RF GENERATOR

Figure 4:
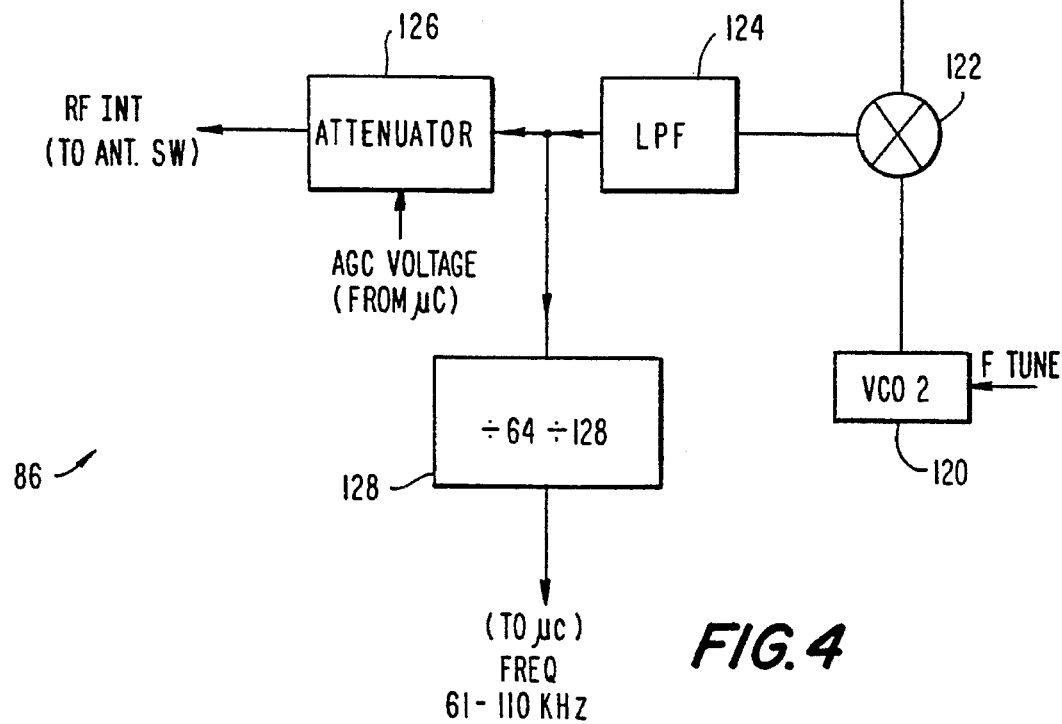
FIG. 4 is a block diagram of an RF generator that is part of the tuning and monitoring module of FIG. 2.

RF generator 86 will now be described with reference to FIG. 4. RF generator 86 includes a wide sweep voltage controlled oscillator 118 and a fine tuning voltage controlled oscillator 120. VCOs 118 and 120 operate under the control of respective signals supplied by microcontroller 78.

Wide sweep VCO 118 operates in a frequency range of 1.5 to 2.5 GHz while fine tuning VCO 120 is fixed at 2.5 GHz with a small tuning range. VCO 120 is used for automatic frequency control and also for precise detection of the selected channel frequency, as will be discussed below.

The signals output by VCOs 118 and 120 are respectively fed to mixer 122 which outputs a difference frequency in the range of 50 to 1000 MHz, which covers the cable and off-air UHF/VHF frequency range. The difference frequency output by mixer 122 is filtered by low pass filter 124 and then is provided to attenuator 126 for automatic gain control. Attenuator 126 also gradually increases and decreases the signal amplitude at certain times during data signal transmission operations as will be discussed below. Attenuator 126 operates under the control of a signal provided by microcontroller 78.

The output of attenuator 126 is provided as an RF injection signal to data pulsing switch 116 of antenna switch 82 (FIG. 3). During data transmission operations, the zero logic level corresponds to the video DC blanking level and the one logic level corresponds in amplitude to 80 IRE NTSC units peak to peak.

The difference frequency output by LPF 124 (FIG. 4) is also provided to frequency divider block 128, which divides the difference frequency by 64 and then again by 128 to provide a frequency signal to microcontroller 78. From this frequency signal, microcontroller 78 determines the frequency of the detected injection signal.

INJECTION RECEIVER

Injection receiver 88 will now be described with reference to FIG. 5. As previously noted, injection receiver 88 includes input terminals VID1 and VID2 to which are respectively supplied video baseband signals output by TPM submodule 84 and video baseband signals output by VCR 24. The signals received on input terminal VID2 are taken out to output terminal 60 to provide a video baseband output. The two input terminals VID1 and VID2 are connected to a video selector switch 130 which operates under control of a video selection signal VIDSEL provided by microcontroller 78 to selectively couple one of the input terminals VID1 and VID2 to the inputs of the signal processing segments of the injection receiver 88.

The output signal from video switch 130 is provided to a sync separator block 136. Sync separator 136 extracts the horizontal and vertical timing pulses from the selected video baseband signal and passes these timing signals on to the microcontroller 78. In a preferred embodiment of this invention, sync separator 136 also senses when a poor video signal is being received and sends a signal indicative of this condition to microcontroller 78. Upon receiving this signal, microcontroller 78 may take such remedial steps as interrupting channel change detection operations to minimize interference with the viewed signal (in a case where these signals are being supplied to TV 22), or, in a case where the signals are being recorded by VCR 24, generating a "weak signal" code for recording.

The output signal from video switch 130 is also provided to a sample and hold amplifier 134 through a low pass filter 132. The bandwidth of the low pass filter 132 is selected to be less than the horizontal scanning frequency in order to provide a smoothing action on the baseband video. The output of the sample and hold amplifier 134, RXAMPL, is provided to the microcontroller 78 for conversion from analog to digital, under the control of the microcontroller 78 through the SAMPLE signal. The output of the sample and hold amplifier represents a time average of the content of a video scan line, and is used in channel change detection operations.

The output signal from video switch 130 is also provided to a gated data comparator 160 which compares the video baseband signal to a time-averaged reference level formed by passing the video baseband signal through a low pass filter 138 with a 400 Hz bandwidth. The data gate is under the control of the Microcontroller 78 through the RX ENABLE signal so that valid data is output on the RX DATA signal line to the microcontroller 78 only in synchronism with times when the microcontroller expects valid data on the video baseband; otherwise the RX DATA signal line is held in a known (marking) state. As will be appreciated by those skilled in the art, this permits a standard serial port to be used with the Microcontroller 78 for data reception, as long as an appropriate baud rate is selected to provide a complete data word on a horizontal scan line, greatly simplifying the software required for data reception. (Provision of such software is well within the abilities of those skilled in the art and accordingly such software need not be described herein.)

As will be seen, when data signals are concurrently being generated at certain times by pulsing switch 116 (FIG. 3), the data output is gated at these times. Alternatively, when the signal source is VCR 24 operating in playback mode, the times when the data output is gated are those at which an identification signal might be present on the taped played back by VCR 24. In either case, the times when the data output is gated are determined on the basis of timing pulses present in a video signal received through injection receiver 88.

The output signal from video switch 130 is also provided to a 500 kHz band pass filter 142 which provides its output signals to log power block 144. The net result is the generation of a log power signal by the log power block 144. The log power signal varies as a function of the logarithm of the spectral energy, or power, of the received signal in a band centered on 500 kHz. The center frequency of the band pass filter 142 was selected to be in a region of the energy spectrum of the video baseband which has moderate to low energy density and is not likely to be cut-off by poor frequency response of the VCR 24. The logarithm of the power of the video baseband signal is taken to minimize spurious responses. The output of the log power block 144 is integrated by an integrator block 146. The integrated signal is passed through a gain block 148 for amplification, and the amplified signal is compared by a detection comparator 152 to a reference signal, formed by the time average of the amplified signal provided by a low pass filter 150. The integrator block 146 sets an upper limit on an acceptable RF sweep rate reflected into the video baseband signal. The detection comparator sends a detection or "hit" signal DET to the microcontroller 78 when the integrated, amplified power level exceeds the time average by a predetermined factor, such as 20 dB.

It will be recognized that junction 131 may be considered a common input terminal for sync separator 130, sample and hold amplifier 134, gated data comparator 160 and detection comparator 152. It will also be seen that junction 131 is selectively coupled to a plurality of channel selection devices by video switch 130.

Figure 5A:
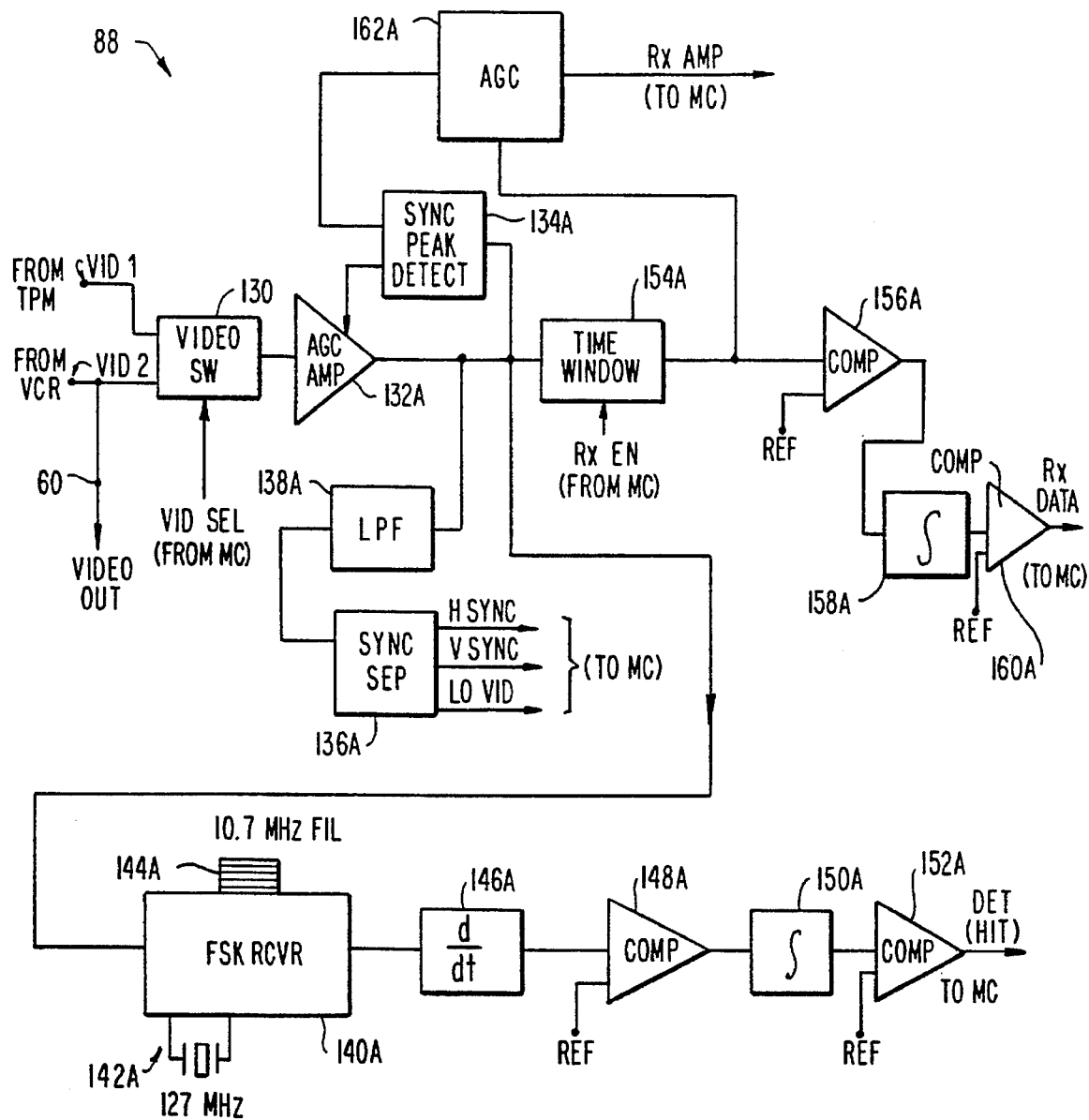
FIG. 5A is a block diagram of an alternative embodiment of an injection signal receiver that is part of the tuning and monitoring module of FIG. 2.

An alternative embodiment of injection receiver 88 will now be described with reference to FIG. 5A. As previously noted, injection receiver 88 includes input terminals VID1 and VID2 to which are respectively supplied video baseband signals output by TPM submodule 84 and video baseband signals output by VCR 24. The signals received on input terminal VID2 are taken out to output terminal 60 to provide a video baseband output. The two input terminals VID1 and VID2 are connected to a video selector switch 130 which operates under control of a video selection signal VID SEL provided by microcontroller 78 to selectively couple one of the input terminals VID1 and VID2 to an input of an automatic gain control amplifier 132A. AGC amp 132A maintains a constant amplitude in the video signal and restores the DC blanking level of the signal.

The output of AGC amplifier 132A is connected to a sync peak detection block 134A which detects the amplitude of synchronization peaks present in the signal output by AGC amp 132A and provides a feedback signal to AGC amp 132A.

The output signal from AGC amp 132A is also provided to a sync separator block 136A via a low pass filter 138A. Sync separator 136A extracts the horizontal and vertical timing pulses from the video signal and passes these timing signals on to the microcontroller 78. Sync separator 136A also senses when a poor video signal is being received and sends a signal indicative of this condition to microcontroller 78. Upon receiving this signal, microcontroller 78 may take such remedial steps as interrupting generation of injection signals (in a case where these signals are being supplied to TV 22) to minimize interference with the viewed signal, or, in a case where the signals are being recorded by VCR 24, generating a "weak signal" code to be recorded by VCR 24.

The signal output from AGC amp 132A is also provided to FSK receiver 140A which is arranged with a 12.7 MHz oscillator 142A and a 10.7 MHz filter 144A. A signal output from FSK receiver 140A is differentiated by a differentiating circuit 146A. The differentiated signal output by circuit 146A is buffered by a buffering amplifier 148A and the buffered signal is integrated by an integrator 150A. The integrated signal is then provided to a comparator 152A which compares the integrated signal against a reference level and generates a detection or "hit" signal when the buffered signal that it receives from integrator 150A is not less than the reference level. The hit signal generated by comparator 152A is provided to microcontroller 78.

The signal output from AGC amplifier 132A is also provided to time window block 154A which operates under control of a signal provided by microcontroller 78 so that the signal from AGC amplifier 132A is permitted to pass through time window block 154A only at times when data is expected to be present in that signal. As will be seen, when data signals are concurrently being generated at certain times by pulsing switch 116 (FIG. 3), time window 154A is enabled at these times. Alternatively, when the signal source is VCR 24 operating in playback mode, the times when time window 154A is enabled are those at which an identification signal might be present on the tape played back by VCR 24. In either case, the times when time window 154A is enabled are determined on the basis of timing pulses present in a video signal received through injection receiver 88.

The signal output from time window 154A is supplied to buffering amplifier 156A. The buffered signal output by amplifier 156A is then provided to integrator 158A which integrates the signal to provide an integrated signal to a comparator 160a. Comparator 160A compares the integrated signal output by integrator 158A against a reference and provides received data signals to microcontroller 78.

Signals output by time window block 154A are also provided to automatic gain control circuit 162A. AGC circuit 162A also receives a signal output by sync peak detection block 134A and provides a signal to microcontroller 78, which signal is used to control the amplitude of injection signals generated by RF generator 86.

TUNING PEOPLE METER

Figure 6:
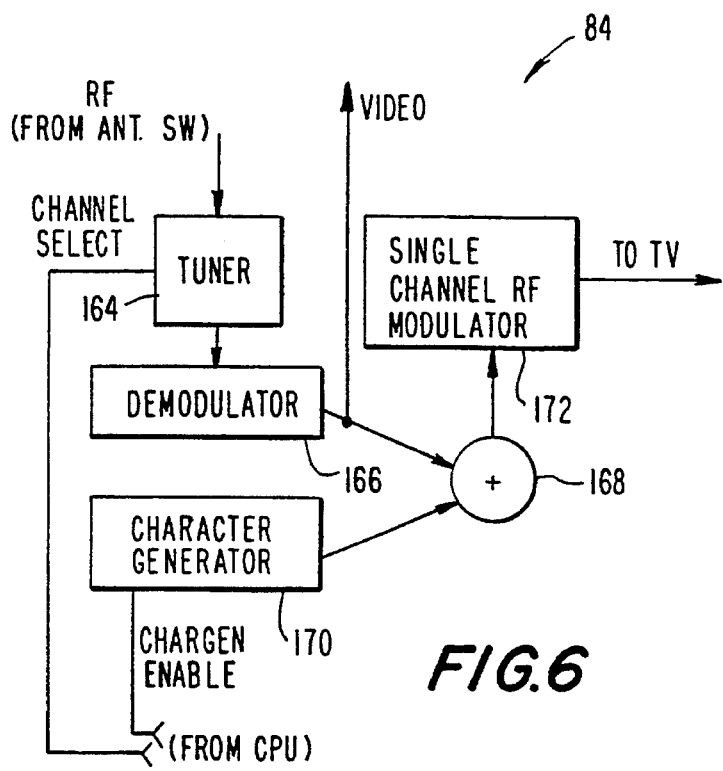
FIG. 6 is a simplified block diagram of a tuning and metering submodule that is part of the tuning and monitoring module of FIG. 2.

TPM submodule 84 will now be described with reference to FIG. 6. In a preferred embodiment of tuning/monitoring module 28, TPM submodule 84 is similar to a well-known type of tuning people meter (of which one example is described in U.S Pat. No. 4,816,904), except that TPM submodule 84 provides a video baseband output signal in addition to the RF video signal that is output to TV 22. TPM submodule 84 will therefore not be described in detail.

In summary then, TPM submodule 84 includes a tuner 164 which receives an RF signal from antenna switch 82. The RF signal may include a plurality of channel signals. The received signal is tuned by tuner 164 under control of a channel select signal received from CPU 72. The tuned signal is then provided to a demodulator 166 which outputs a video baseband signal. The video baseband signal output by demodulator 166 is taken out and supplied to input VID1 of injection receiver 88 (FIG. 2) and is also supplied to mixer 168 (FIG. 6).

TPM submodule 84 also includes a character generator 170 which generates character signals in accordance with signals received from CPU 72. Mixer 168 combines the character signals generated by character generator 170 with the video baseband signal output by demodulator 166 and provides a resulting signal to single channel RF modulator 172, which in turn provides an RF modulated signal to TV 22. As will be understood by those skilled in the art, TV 22 then displays a television picture corresponding to the signals output by tuner 164 with characters superimposed thereupon in accordance with character generation signals output by CPU 72. The characters are typically used to prompt the viewer to input information to CPU 72 via remote control unit 32 and set top unit 30.

Alternatively, TPM submodule 84 may be of the type which passively gathers viewer data, i.e., without requiring display of viewer data prompts on TV 22 and without input of viewer data. It will be understood, however, that such a known type of tuning people meter must be modified so as to provide a video baseband signal to input terminal VID1 of injection receiver 88.

It is also possible to use a tuning and metering submodule which does not collect viewer information, so long as the video baseband signal is provided as noted above.

ERASE SENSOR ELECTRONICS

Erase sensor electronics submodule 90 will now be described with reference to FIG. 7A.

As is well known to those skilled in the art, when a VCR is in record mode, it applies an erase signal to the videotape before recording the video signal thereon. The erase signal is customarily in the range of 50 to 100 KHz. The erase signal is such that it may be picked up by a sensor installed in proximity to the VCR, for example by attachment to an external wall of the VCR's housing. A sensor of this type is identified by reference numeral 62 on FIG. 1.

Figure 7:
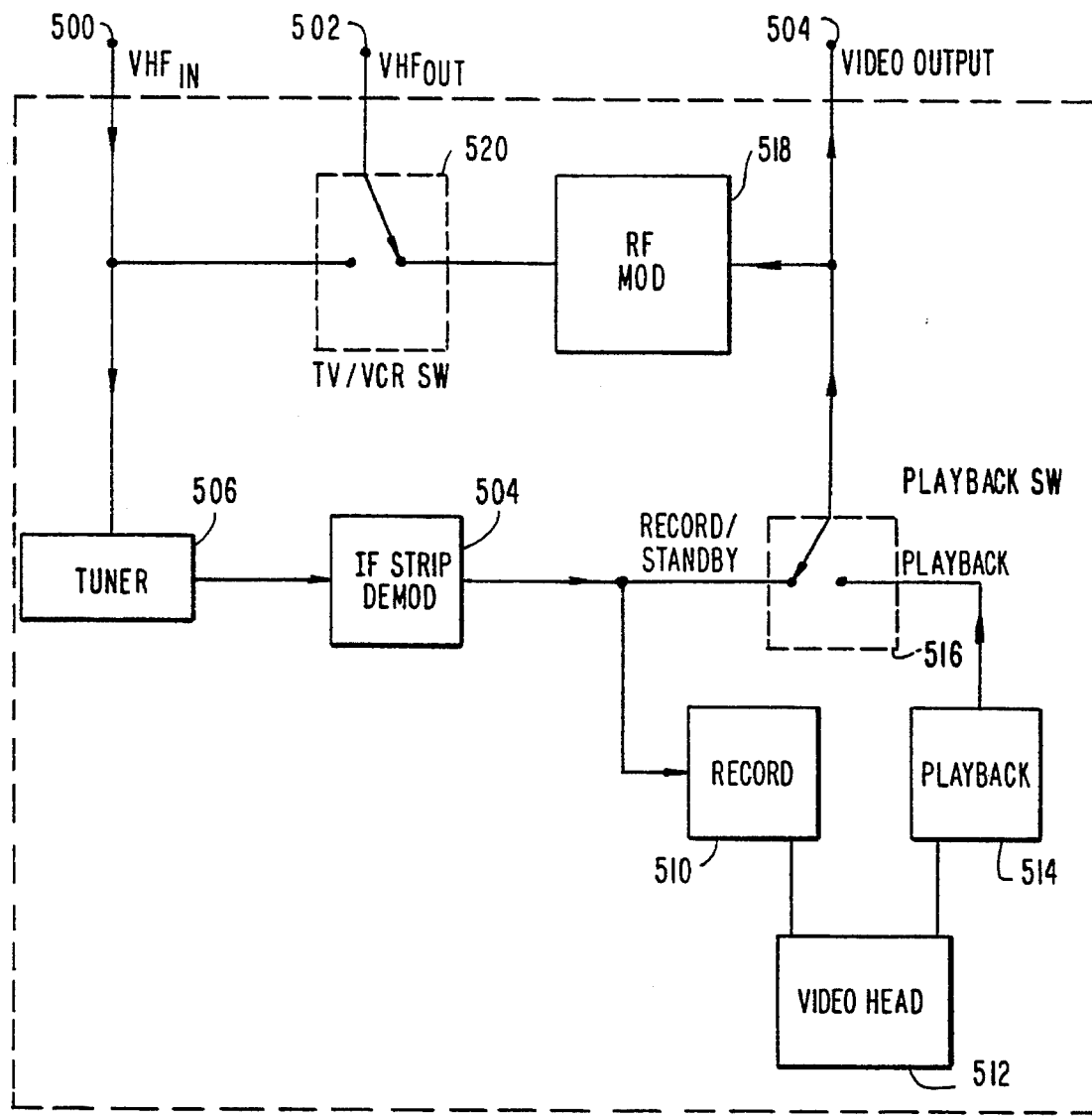
FIG. 7 is a simplified block diagram of a typical VCR used in the viewing system of FIG. 1.
Figures 7A, 7B:
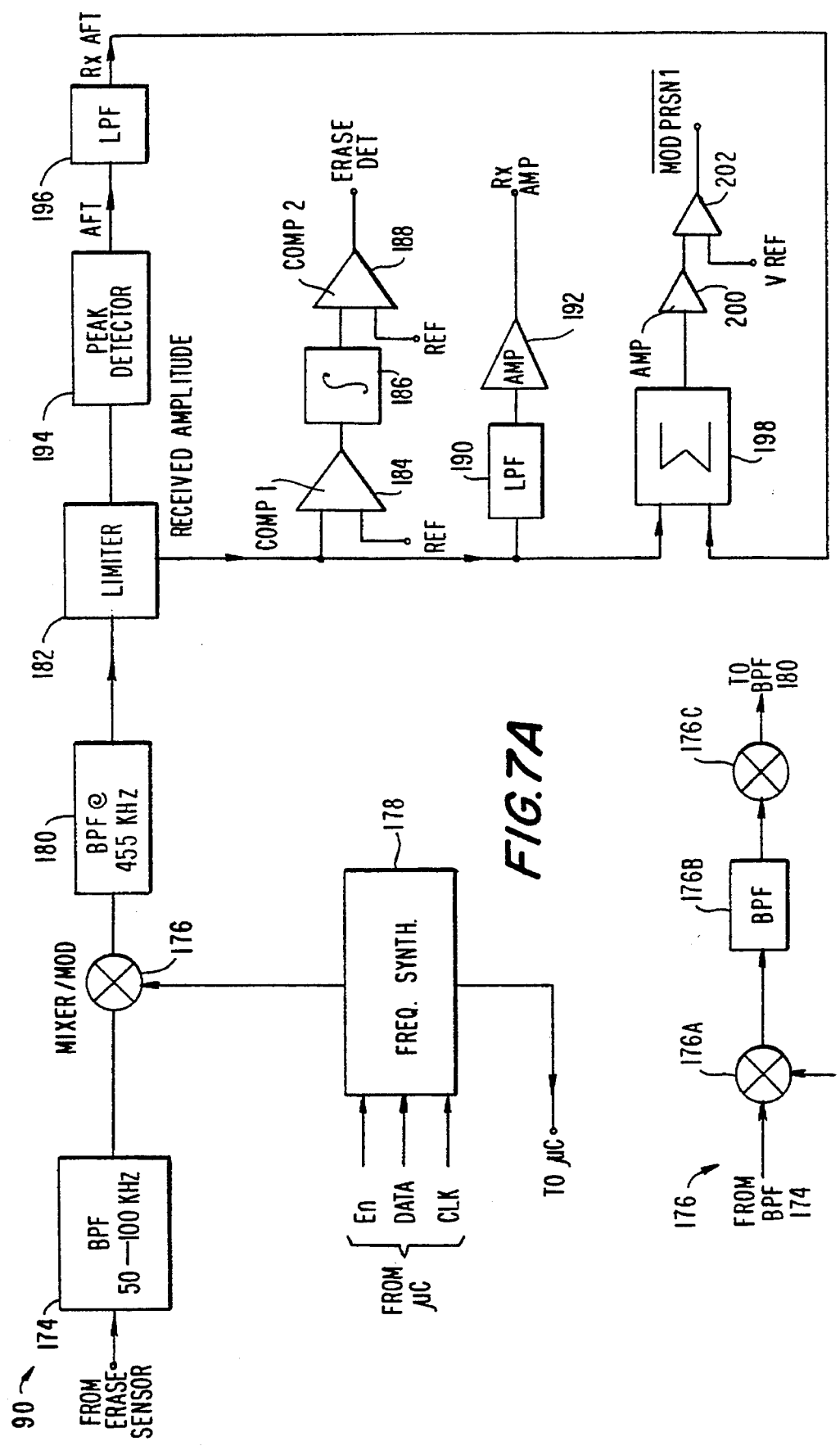
FIG. 7A is a simplified block diagram of an erase sensor submodule that is part of the tuning and monitoring module of FIG. 2.
FIG. 7B is a block diagram of a portion of the erase sensor submodule of FIG. 7A according to another embodiment of the invention.

The signal picked up by erase sensor 62 is provided to a bandpass filter 174 (FIG. 7A). The filtered signal output from BPF 174 is provided to mixer/modulator stage 176. Bandpass filter 174 is preferably an elliptical filter with one of its out of band poles chosen to be in the middle of the frequency range of the local oscillator that is part of mixer/modulator stage 176. BPF 174 should also be appropriately matched to sensor 62 in order to prevent back radiation or a standing wave pattern.

Stage 176 preferably includes a mixer which up-converts the received signal through a local oscillator which is controlled by a signal received from frequency synthesizer 178. The resulting signal is applied to a bandpass filter 180. Filter 180 is preferably a two stage ceramic ladder filter and has an effective band width that is less than the frequency step of frequency synthesizer 178.

In an alternative preferred embodiment, mixer/modulator stage 176 is constituted as shown in FIG. 7B, including a first mixer 176A which up-converts the signal received from BPF 174 through a first local oscillator that is part of first mixer 176A and is controlled by a signal received from frequency synthesizer 178. The resulting signal produced by mixer 176A is filtered by a sharp-skirt bandpass filter 176B, which may be, for example, a 4.5 MHz TV sound ceramic bandpass filter. The filtered signal is then mixed by a second mixer 176C with a signal provided by a second local oscillator included in the second mixer and operating at a fixed frequency. The signal produced by mixer 176C is then applied to bandpass filter 180.

Use of a two-mixer stage 176 permits relaxation of otherwise stringent requirements in the rejection band and sharp skirt roll-off of BPF 180.

The filtered signal output by BPF filter 180 is amplitude limited by limiting circuit 182 and then supplied to buffer amplifier 184 which outputs a signal to integrator 186. The output signal of integrator 186 is compared by a comparator 188 to a reference level for the purpose of generating an erase detection signal that is supplied to microcontroller 78.

At the same time, the signal output by limiting circuit 182 is filtered by lowpass filter 190 and amplified by amplifier 192 to provide another signal to microcontroller 78, which is used to confirm the accuracy of the erase detection signal.

A signal output by limiting circuit 182 is also supplied to peak detector 194, the output of which is filtered by lowpass filter 196 and then supplied to summation circuit 198. Summation circuit 198 sums the signal received from LPF 196 in appropriate proportions with the signal from limiting circuit 182 that was supplied to LPF 190 and buffer amplifier 184. The output of summation circuit 198 is passed through amplifier 200 to comparator 202, which provides a signal to microcontroller 78 when frequency modulation or amplitude modulation is present in the signal output by limiting circuit 182. The signal provided by comparator 202 is used by microcontroller 78 to disregard spurious erase detection signals caused by leakage of AM or FM signals into erase sensor electronics submodule 90.

During installation of tuning/monitoring module 28 in viewing system 20, the erase sensor pickup 62 is installed in proximity to VCR 24, as noted above, and VCR 24 is placed in record mode. Frequency synthesizer 178 is then stepped through its frequency range under control of signals provided by microcontroller 78. A sharp amplitude peak is detected through erase sensor electronics 90 at a setting of frequency synthesizer 178 that corresponds to the particular erase frequency utilized by VCR 24. Based on a signal received from frequency synthesizer 178, microcontroller 78 determines the corresponding frequency of frequency synthesizer 178 and sets synthesizer 178 to that value for detection of the recording mode of VCR 24 during operation of T/M module 28.

OVERVIEW OF OTHER COMPONENTS

Other components making up, or associated with, T/M module 28 will now be briefly described.

Referring again to FIGS. 1 and 2, remote control unit 32 and set top unit 30 are both constructed in a conventional manner and provide such well known functions as volume control and tuner channel selection through TPM submodule 84. Upon installation of the T/M module 28, CPU 72 is programmed so that the functions of RCU 32, other than viewer data input, are limited to those previously available in the viewer's system. Thus, if the viewer had no remote control before installation of T/M module 28, CPU 72 is programmed to disable all functions of RCU 32 other than viewer data input. In this case, channel and source selection are made through set top unit 30.

Communications submodule 76 is preferably a conventional communication integrated circuit such as the model 85C30 available from the aforesaid Zilog, Inc.

Power supply 80 is generally similar to the power level sensing power supply disclosed in U.S. Pat. No. 4,605,958 to Machnik, et al. Power supply 80 includes a battery that powers CPU 72 in case of a power outage so that the outage can be reported to the hub.

SUMMARY OF CPU AND MICROCONTROLLER FUNCTIONS

The functions of CPU 72 and microcontroller 78 will now be briefly described.

CPU 72 implements channel selection through TPM submodule 80 in response to codes received from set top unit 30. It will be understood that these codes may originate from remote control unit 32 and be passed on to CPU 72 by set top unit 30.

In a manner well known to those skilled in the art, CPU 72 stores data concerning the selected channel for future transmission to a data gathering unit.

CPU 72 also manages automatic frequency tuning (AFT) performed within TPM submodule 84 and manages volume control and sound muting, again in response to codes received from set top unit 30.

CPU 72 also receives source selection codes from set top unit 30 and sends appropriate control signals to antenna switch 82 to control the setting of switches 112 and 114 (FIG. 3).

As noted above, CPU 72 also controls generation of characters by TPM submodule 84 for the purpose of displaying viewer information prompts on TV 22. CPU 72 also receives responses to those prompts input by the viewer via RCU 32.

CPU 72 also handles monitoring of power levels drawn by VCR 24 and TV 22 for on/off detection. For that purpose CPU 72 supplies a reference analog level to power supply 80 and receives back therefrom signals indicating a power level drawn by each of VCR 24 and TV 22. As to VCR 24, in addition to on/off detection, CPU 72 also may detect whether VCR 24 is drawing a level of power that indicates that VCR 24 is operating in a playback or recording mode.

CPU also maintains communication with controller 78, and, by appropriate commands, selects the mode of operation of microcontroller 78.

Finally, CPU 72 communicates with a hub for the purpose of uploading monitoring data for subsequent reporting to a central data gathering system.

Microcontroller 78, under control of CPU 72, supervises injection signal generation and detection, and also VCR erase signal detection, and transmits to CPU 72 data representative of detected signals. Microcontroller 78 is preferably driven by a 12 MHz clock crystal so that adequate execution speed is achieved.

SYSTEM OPERATION

Operation of T/M module 28, particularly with respect to channel detection, channel identification, signal source selection, and detection of VCR mode of operation, will now be described with reference to FIGS. 8A–8I, which together make up a flow chart illustrating those operations.

While system 20 shown in FIG. 1 includes both a VCR and a cable converter, it will be appreciated that at any time one or both of the VCR and the cable converter may be disconnected or turned off. It should also be understood that T/M module 28 is operable in a viewing system which lacks a cable converter or a VCR or which lacks both components.

Figure 8A:
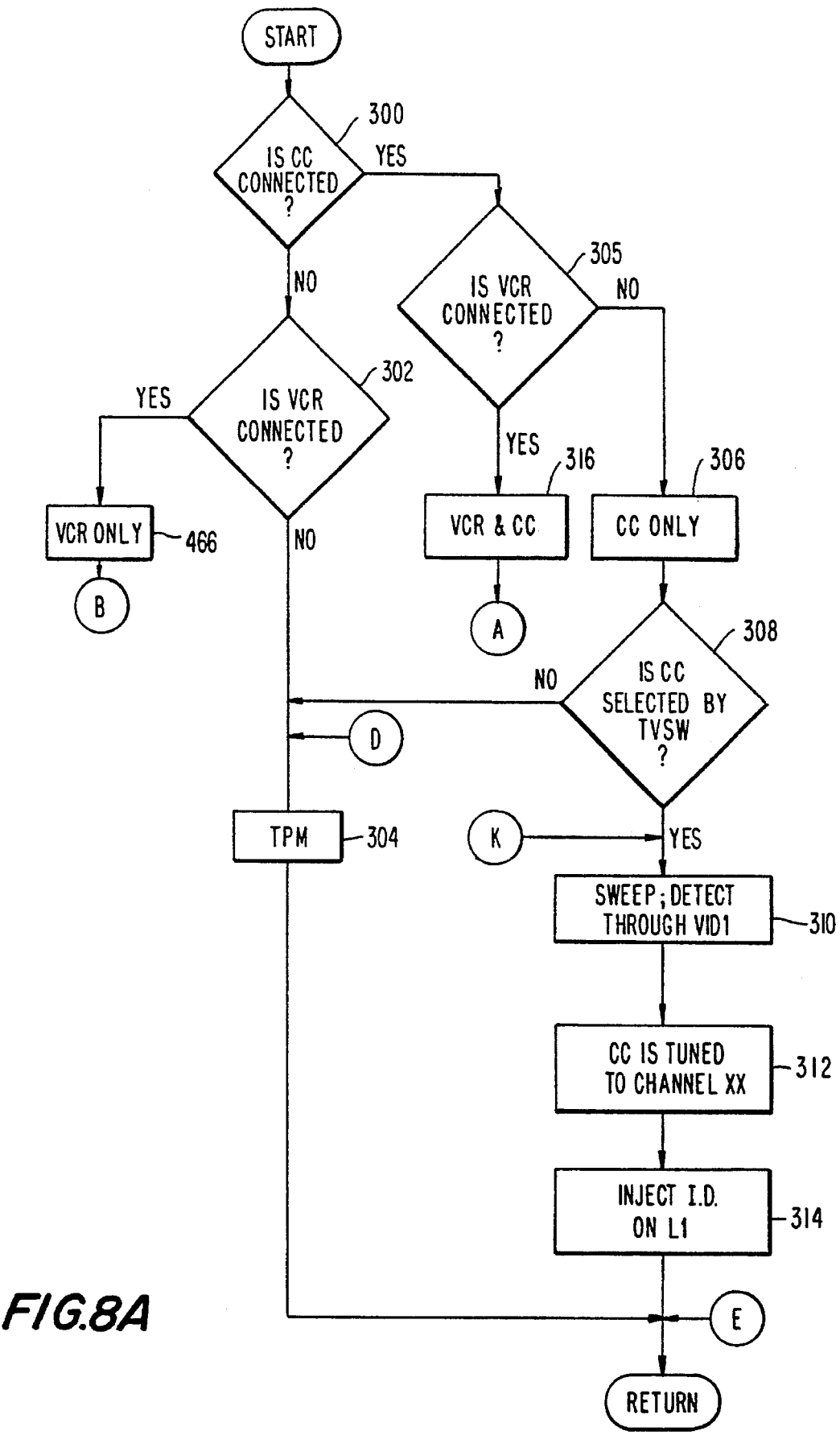
FIGS. 8A–8I are a flow chart of monitoring operations carried out by the tuning and monitoring module of FIG. 2.

Thus, referring now to FIG. 8A, T/M module 28 first determines whether a cable converter is present and operative (step 300). If at step 300 the cable converter was not found to be present and operative, step 302 follows, at which it is determined whether a VCR is present and operative. If not, then T/M module 28 operates in the same manner as a conventional tuning people meter (step 304) in which channel selections are made through, and monitored by, CPU 72 and tuning in response to channel selections is performed by TPM submodule 88.

If at step 300 it was found that the cable converter was present and operative, step 305 follows, at which again it is determined whether a VCR is present and operative. If not, T/M module 28 operates in a mode appropriate for a viewing system in which a cable converter is present but a VCR is not (step 306). In this mode it is first determined whether the output of cable converter 26 has been selected by TV switch 112 (FIG. 3) as the source of signals for TV 22 (step 308). If not, it will be appreciated that conventional tuning people meter operation will follow (step 304).

If at step 308 the cable converter was selected by TV switch 112, the operation proceeds to step 310, at which channel detection signals are injected into cable converter 26, and a video baseband output of TPM submodule 84 (supplied to input terminal VID1 of injection receiver 88) is monitored, all in a manner to be described in more detail below. On the basis of the channel detection operation carried out at step 310, it is determined that the cable converter has selected a given channel (step 312) and channel identification signals are then injected into cable converter 26 and monitored in the video baseband signal received at input terminal VID1 (step 314) as will also be described in more detail. Briefly, however, 'L1' referred to at step 314 of FIG. 8A means a set of one or more horizontal scanning intervals of the video signal and 'L2' referred to, for instance, in step 330 of FIG. 8B means another set of one or more horizontal scanning intervals. Sets L1 and L2 together will sometimes be referred to as an "augmented set" of intervals.

Returning to step 305 (FIG. 8A), if it is determined therein that a VCR is present and operative, then T/M module 28 operates in a mode for monitoring a viewing system that includes both a cable converter and a VCR (step 316). In this mode, it is first determined whether the cable converter was selected by TV switch 112 to be the signal source for the television receiver (step 318, FIG. 8B). If not, it is next determined whether the VCR was selected to be the signal source for the TV (step 320). If, again, the determination is in the negative, step 322 follows, at which it is determined whether the VCR's tape transport motor is on. The manner in which this determination is made will be discussed below. If this determination also is made in the negative, then, in effect, neither the cable converter nor the VCR is performing any function in the viewing system so that again T/M module 28 operates as a stand-alone tuning people meter (step 304).

However, if at step 322 it is found that the VCR's motor is on, then step 324 follows, at which it is determined whether the cable converter was selected by VCR switch 114 of antenna switch 82 (FIG. 3) to be the source of signals provided to the VCR. If so, it is necessary to determine whether the VCR is recording signals received from the cable converter. Therefore, a code signal is injected into the input of the VCR on a frequency corresponding to the cable converter's output channel and terminal VID2 is monitored (step 326). It is then determined whether the code signal is detected at VID2 (step 328). If not, the VCR is found to be in a playback mode (step 330), but since the VCR is not providing signals to the TV receiver (per step 320), the playback by the VCR is of no interest. Tuning people meter operation as in step 304 then follows.

If at step 328, the code signal was detected, it is necessary to determine which channel has been selected by the cable converter. Therefore, a channel detection operation is carried out (step 332), in which channel detection signals are injected into cable converter 26 and the video baseband signal output by VCR 24 is monitored through input terminal VID2 of injection receiver 88. The channel selected by cable converter 26 is determined (step 334). It is noted that VCR 24 is in record mode (step 336) and channel identification signals are injected into cable converter 26 on an augmented set of intervals (step 338). The identification signals are monitored via input terminal VID2, as will be described in more detail below.

Since neither the VCR nor the cable converter is the source of signals for TV 22, tuning people meter operation as in step 304 follows step 338.

Returning to step 324, if it was determined therein that the cable converter was not selected to be the signal source for the VCR, then step 340 follows step 324. At step 340 it is determined whether an auxiliary source is providing the input signal to VCR 24. If not, a channel detection operation is performed to determine the channel to which the VCR 24 is tuned (step 342, FIG. 8C) with monitoring of the VCR's video baseband output through input terminal VID2. It is then determined whether the operation was successful (step 344). If the channel detection operation of step 342 was not successful, it is concluded that the VCR is playing back so that step 330 follows. Otherwise, the channel to which the VCR is tuned is determined (step 346), it is noted that VCR is in record mode (step 348) and a corresponding identification signal is injected into VCR 24 on an augmented set of intervals and is monitored through input terminal VID2 (step 350). Again, because neither the cable converter nor the VCR was found to be the source of signals for TV 22, tuning people meter operation as in step 304 follows step 350.

Going back now to step 320, if it is determined at that step that the VCR was selected to be the signal source for the TV, then step 352 (FIG. 8E) follows step 320. At step 352 it is determined whether the VCR's motor is on. If not, step 354 (FIG. 8I) follows, at which it is determined whether an auxiliary source has been selected to provide signals to the VCR. If such is the case, tuning people meter operation as in step 304 follows. Otherwise, step 356 follows step 354. At step 356 it is determined whether the VCR is operating in the "TV" mode or the "VCR" mode. The distinction between these two modes of operation of the VCR will now be briefly explained with reference to FIG. 7, while a description of the procedure for determining in which of those two modes the VCR is operating will be deferred.

FIG. 7 is a simplified block diagram of a typical known VCR 24. VCR 24 includes an input terminal 500 to which RF television signals (as, for instance, from an antenna) are supplied and also includes output terminals 502 and 504 at which VCR 24 outputs respectively RF video signals and video baseband signals.

The input signal received at terminal 500 is tuned by tuner 506 and the tuned signal output by tuner 506 is demodulated by intermediate frequency strip demodulator 508. Demodulator 508 outputs a video baseband signal that is supplied to record electronics 510 for recording on a magnetic tape by a video head 512.

Video head 512 is also operable, when VCR 24 is in a playback mode, to reproduce signals from the videotape and provide the reproduced signals to playback electronics 514, which in turn outputs a video baseband signal corresponding to the signals reproduced from the tape.

The outputs of both demodulator 508 and playback electronics 514 are connected to respective inputs of two input, one output playback switch 516. The output of playback switch 516 is connected to video output terminal 508 and also is connected to the input of RF modulator 518.

When the VCR is in record or standby mode, the playback switch 516 is positioned as shown in FIG. 7, so that a video baseband signal corresponding to the tuned output of tuner 506 is provided to video output 504 and to RF modulator 518. On the other hand, when the VCR is in playback mode, switch 516 is in its other position, so that signals reproduced from a videotape are provided to output 504 and RF modulator 518.

VCR 24 also includes a two input, one output "TV/VCR" switch 520 which has one of its inputs connected to input terminal 500 of the VCR and which has its other input connected to the output of RF modulator 518. Modulator 518 provides an RF signal that corresponds to the video baseband signal obtained from playback switch 516 and is typically at a frequency that corresponds to channel 3.

If switch 520 is in the position shown in FIG. 7, the VCR is said to be in "VCR" mode and the RF signal output at terminal 502 is the signal provided by modulator 518. As noted above, that signal is either a signal obtained through tuner 506 or is a signal reproduced from the videotape, depending on whether the VCR is in playback mode or record/standby mode.

If switch 520 is in its other position, i.e., so that output 502 is coupled to input 500, then the VCR is said to be in "TV" or "pass-through" mode. It will be understood that in this latter mode the signal received on terminal 500 simply passes through VCR 24 to its output terminal 502, without tuning via tuner 506. Thus TV or VCR mode is determined entirely by the state of the TV/VCR switch 520.

Figure 8B:
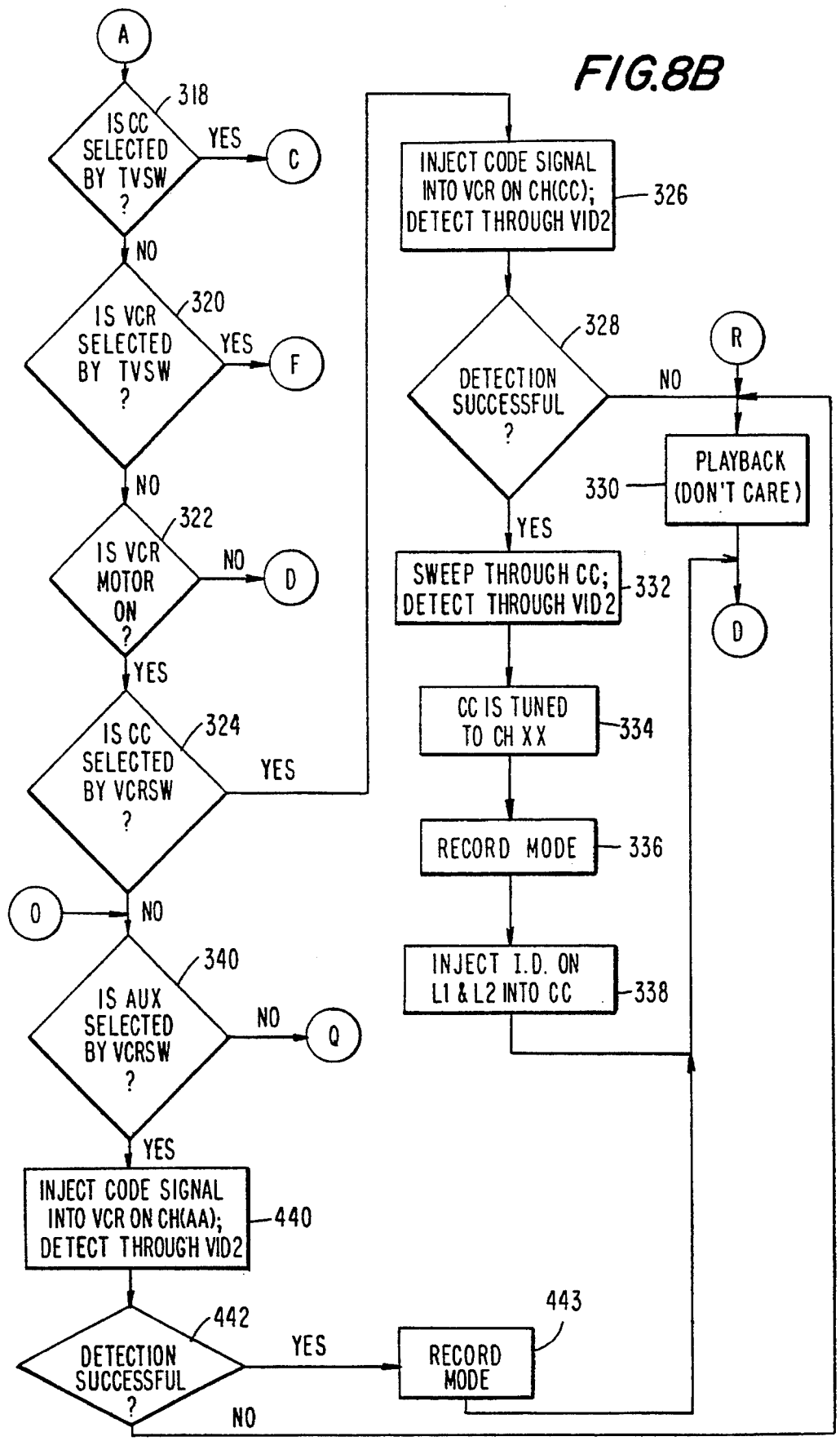
Figure 8C:
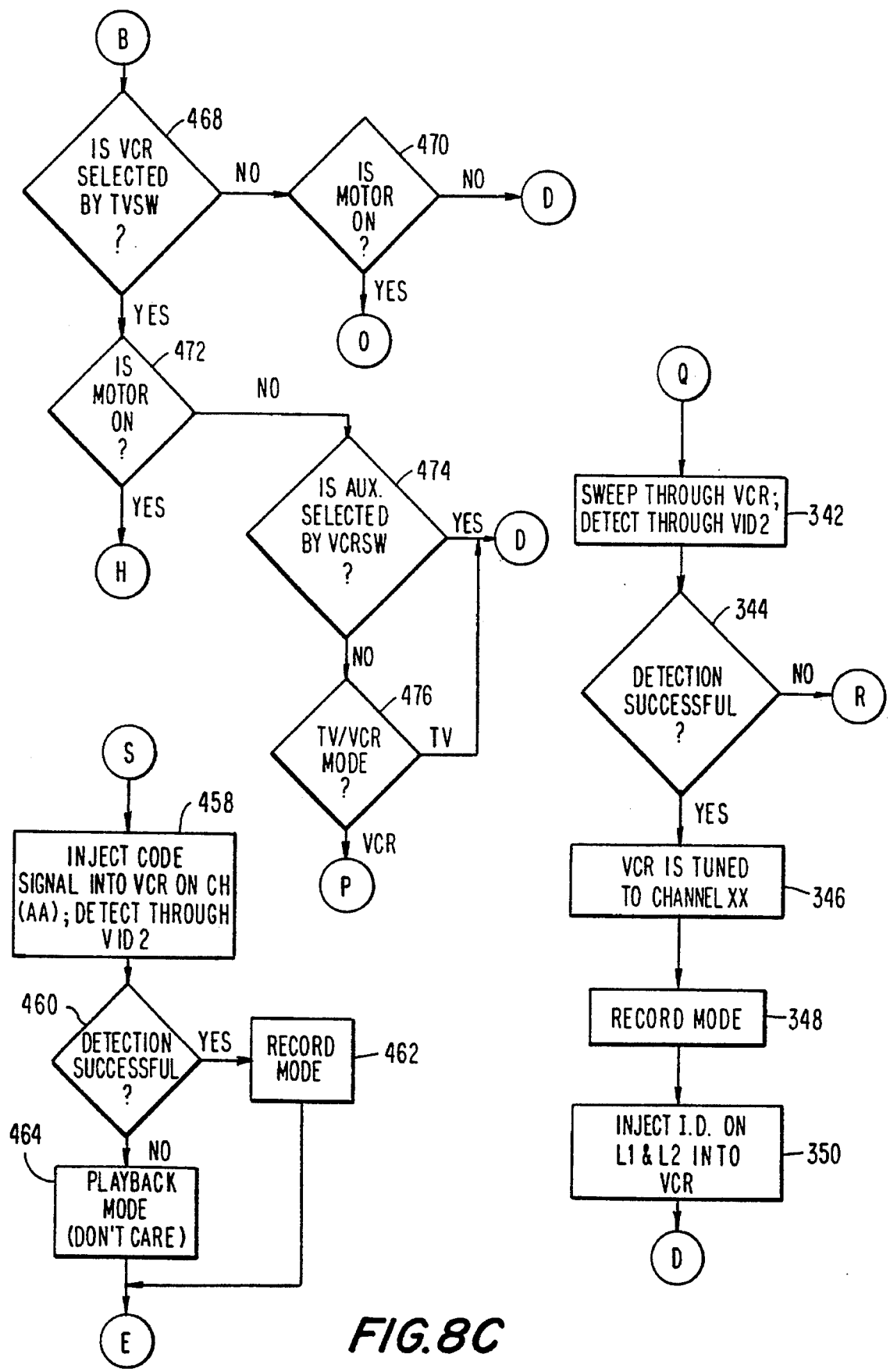
Figure 8D:
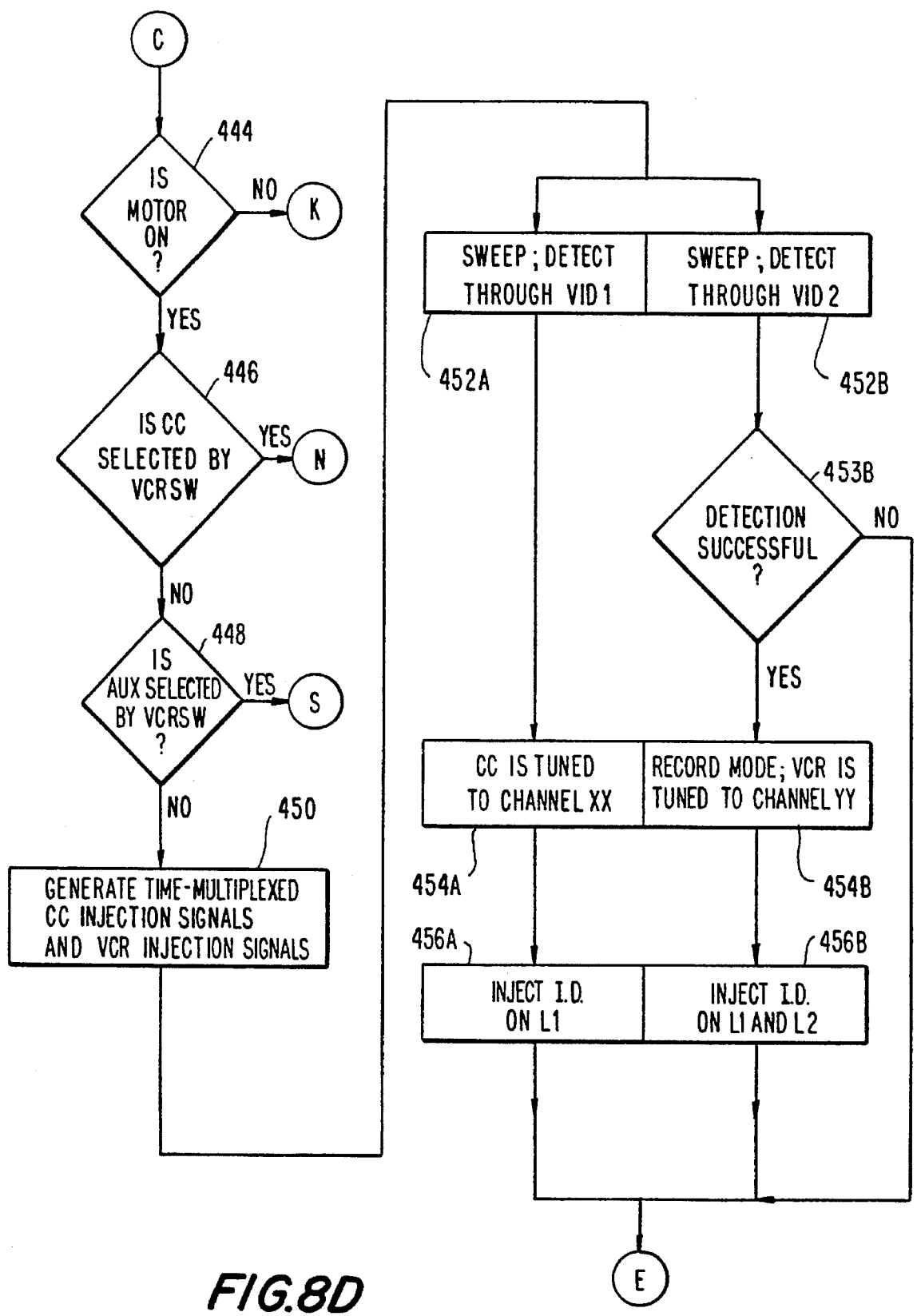
Figure 8E:
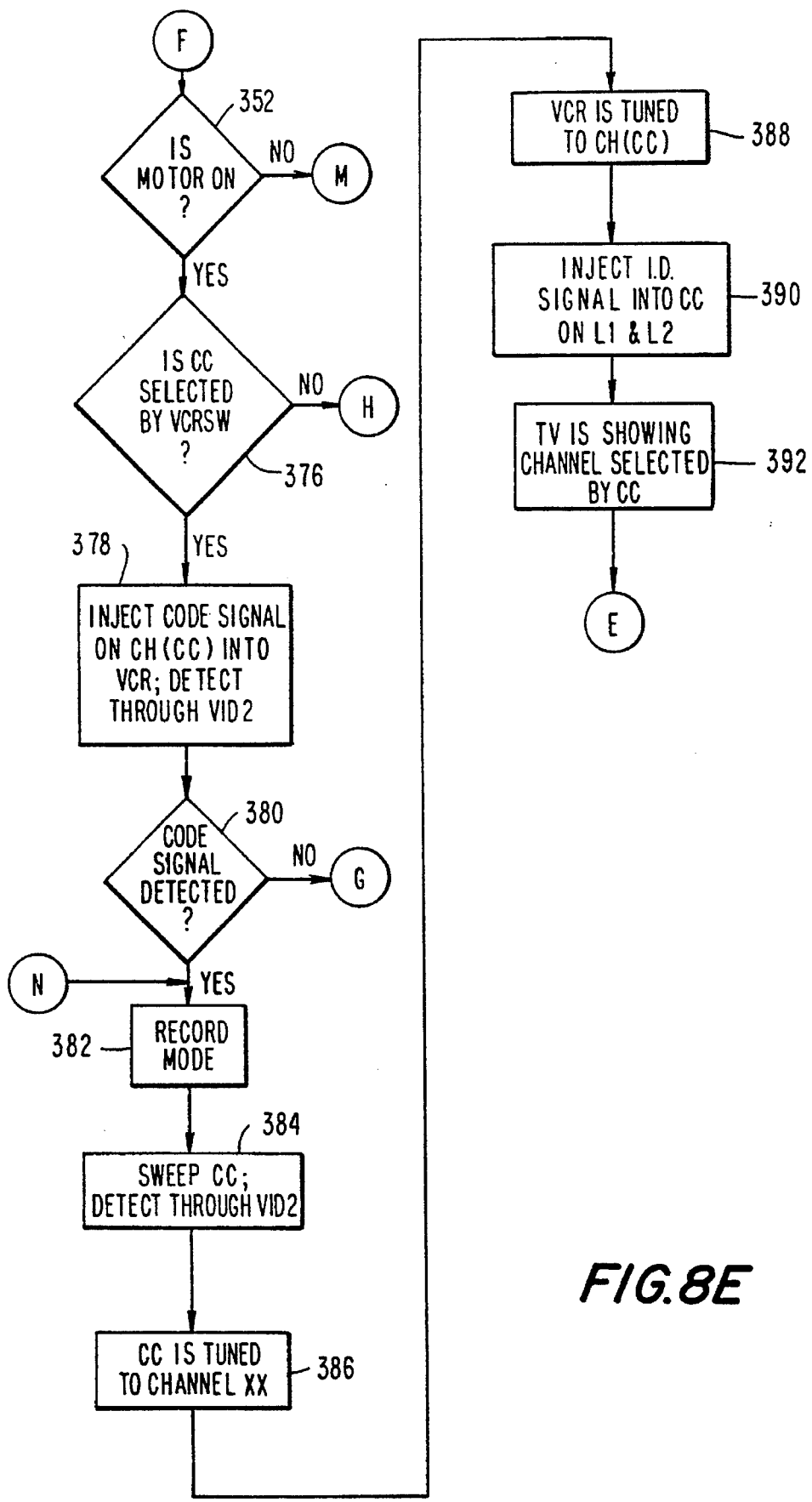
Figure 8F:
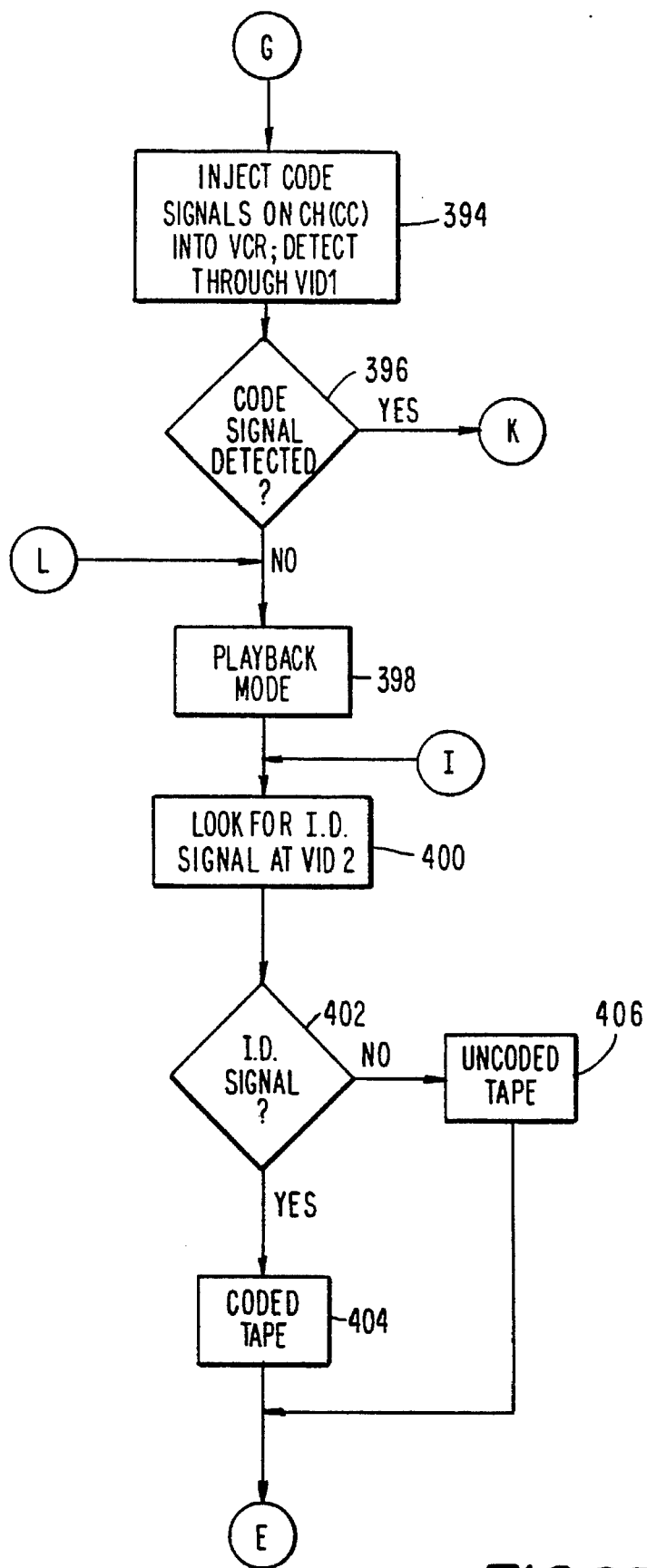
Figure 8G:
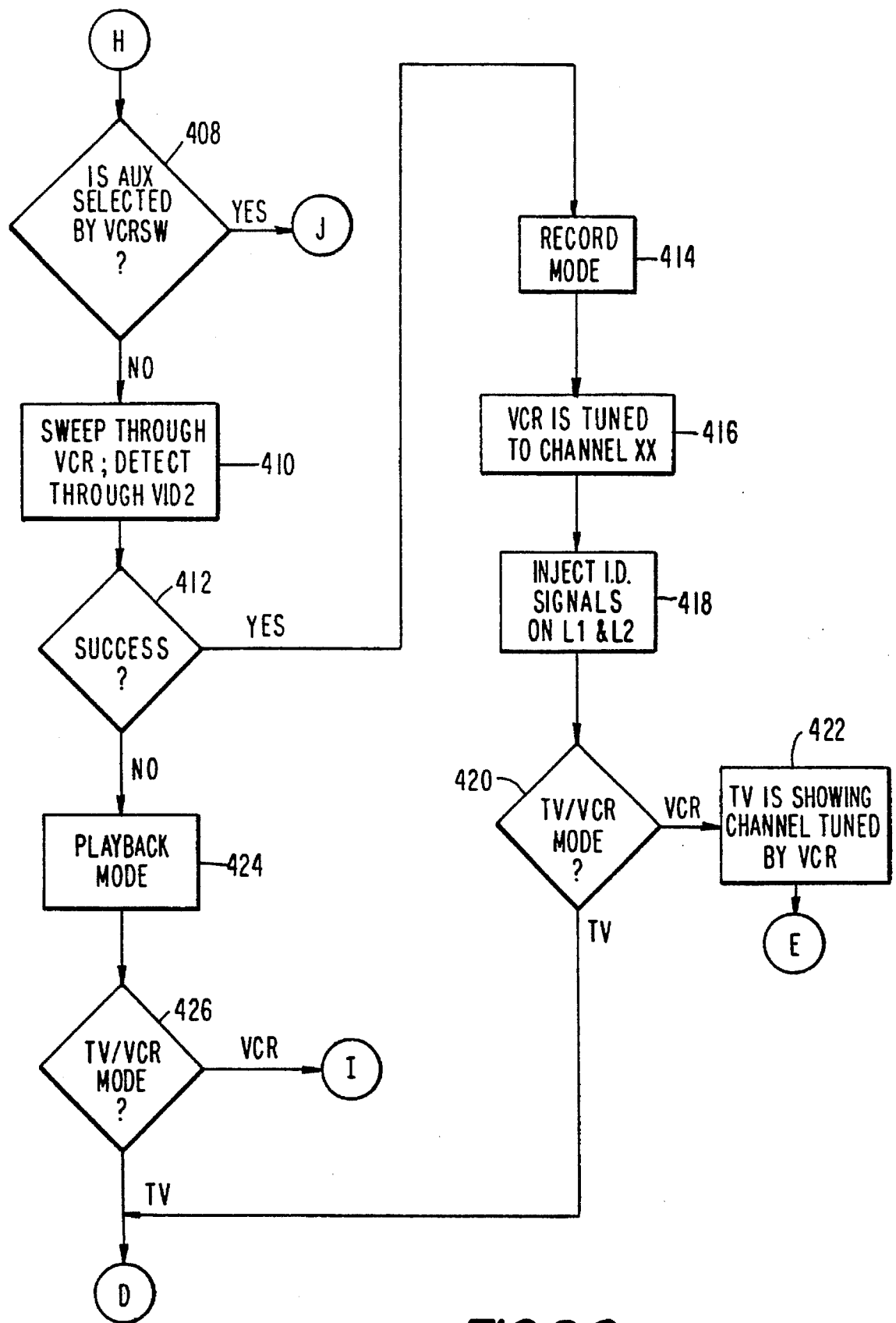
Figure 8H:
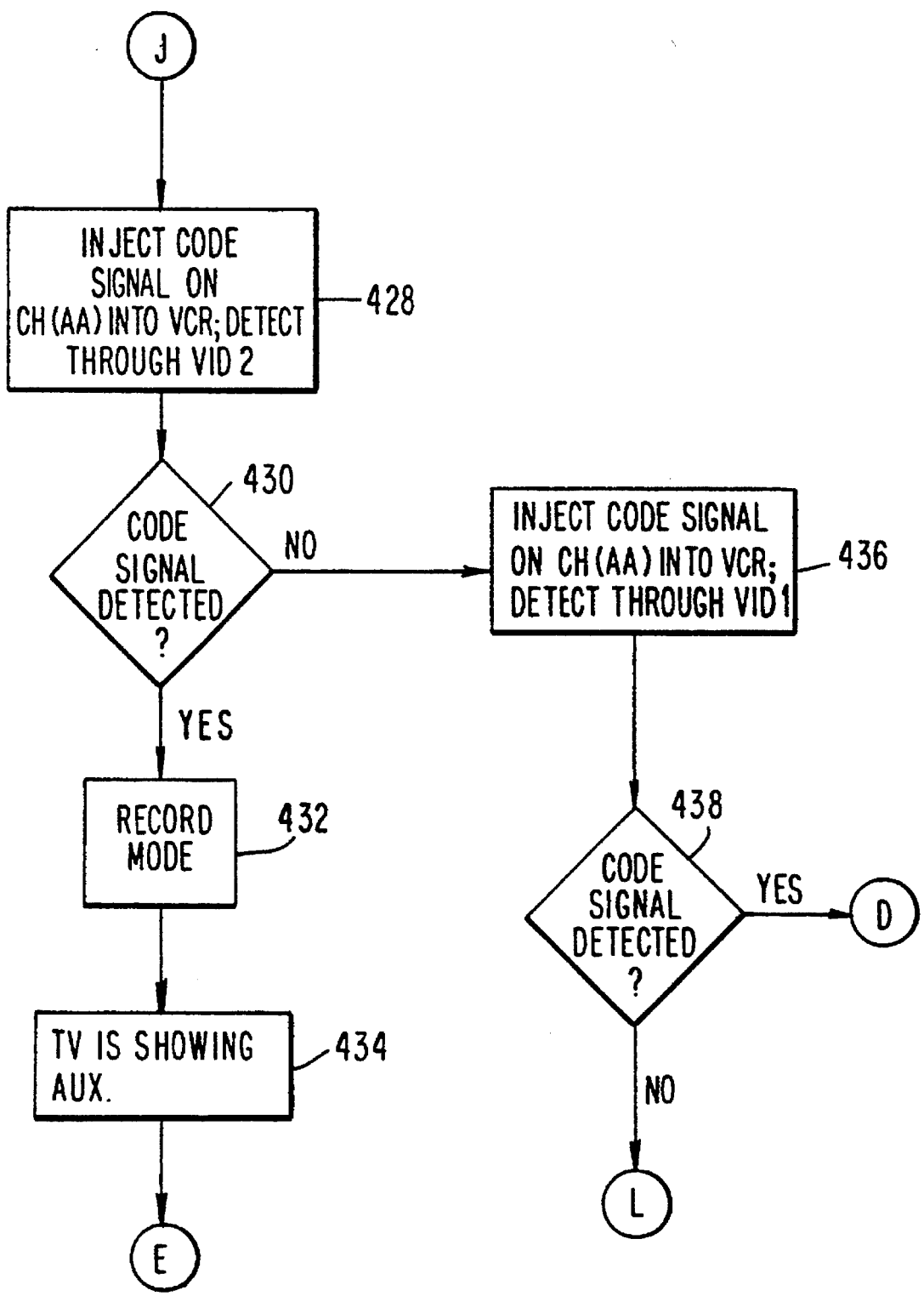
Figure 8I:
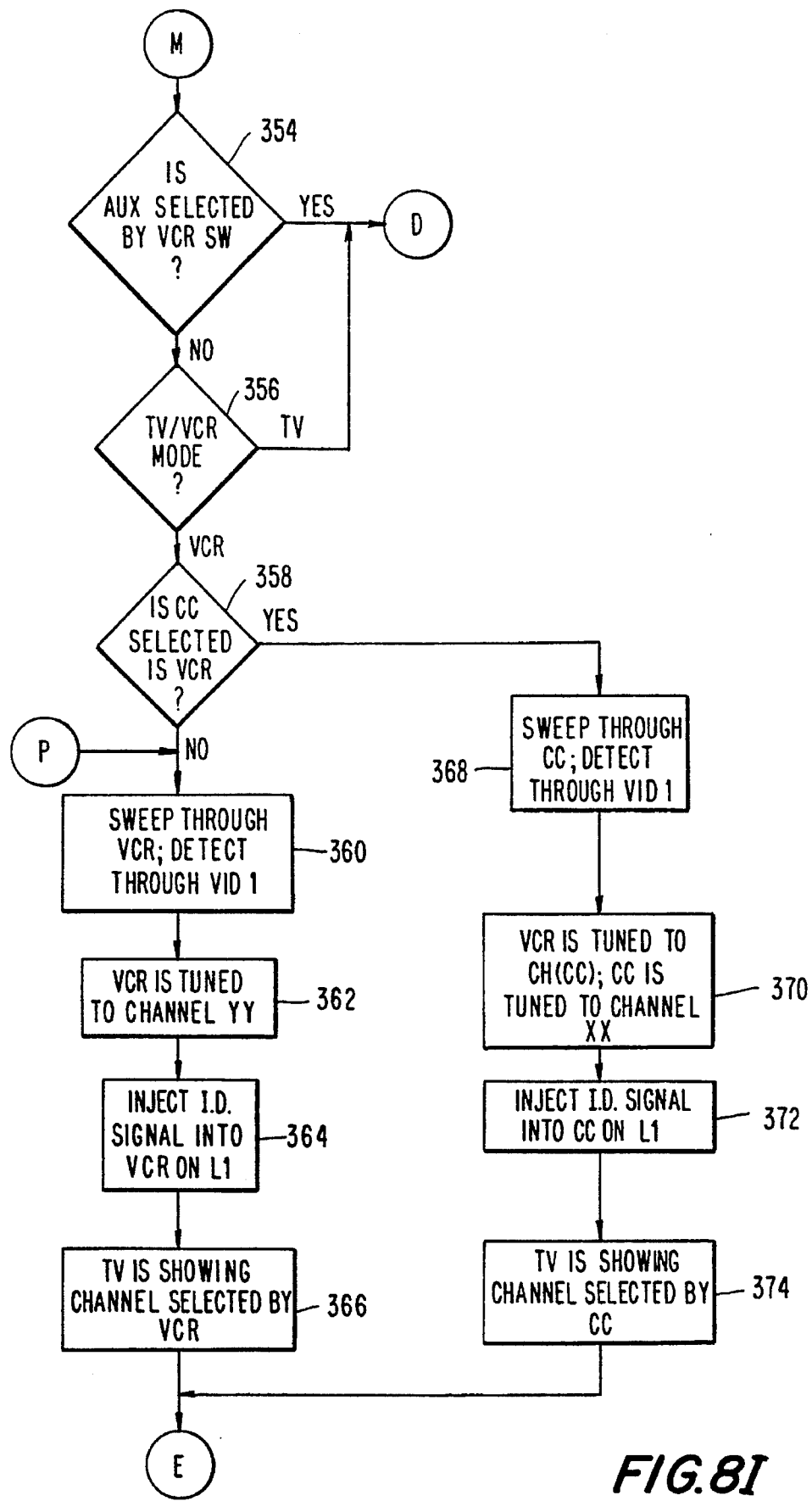

Returning once more to step 356 of FIG. 8I, let it be assumed that the VCR 24 was found to be operating in VCR mode. In that case, step 358 follows, at which it is determined whether cable converter 26 was selected to be the source of input signals for VCR 24. If not, a channel detection operation will be performed (step 360) in which channel detection signals are injected into VCR 24 and the video baseband output of the VCR is monitored through input terminal VID2. The channel to which the VCR is tuned is noted (step 362) and a channel identification signal is injected into VCR 24 and monitored through input terminal VID2 (step 364) and it is noted that TV 22 is showing the channel selected by VCR 24 (step 366).

It will now be assumed that at step 358, it was determined that cable converter 26 was selected to be the source of signals for VCR 24. In that case, step 358 is followed by step 368 (FIG. 8D) at which a channel detection operation is carried out with injection of channel detection signals into cable converter 26 and with monitoring of output signals from VCR 24 via input terminal VID1. The channel selected by cable converter 26 is detected (step 370). Then there is a channel identification and monitoring operation (step 372) with injection of channel identification signals into cable converter 26 and monitoring of those signals via input terminal VID1 and it is noted that TV 22 is showing the channel selected by cable converter 26 (step 374).

Let it next be assumed that at step 356 the VCR was found to be in TV mode. In that case tuning people meter operations in accordance with step 304 follows. Such is also the case if it was found at step 354 that an auxiliary source was selected for the VCR.

Next assume that at step 352 (FIG. BE) the VCR's motor was found to be on. In that case, step 376 (FIG. 8E) follows step 352. At step 376 it is determined whether the cable converter was selected to be the signal source for the VCR. If so, step 378 follows, in which a code signal is injected into VCR 24 at a frequency that corresponds to the output channel of cable converter 26. It is then determined whether that code signal is present at terminal VID2 (step 340). If so, it is noted that VCR 24 is in record mode (step 382), since the VCR's motor is on (step 352) and if VCR 24 were playing back the code signal would not be present at terminal VID2.

Following step 382 is step 384, in which a channel detection operation is carried out with injection of channel detection signals into cable converter 26 and monitoring of the video signal received at input terminal VID2. Next is step 386, at which it is noted which channel cable converter 26 has selected (step 388), and then channel identification signals are injected into cable converter 26 on an augmented set of intervals (step 390). It is next noted that TV 22 is showing the channel selected by cable converter 26 (step 392) and the program then returns.

Again considering step 380, if at that step the code signal was not detected at terminal VID2, then it is known that the signal received by the VCR from the cable converter is not being output on VCR's video base band output, i.e. the VCR must be playing back. However, it must still be determined whether the signal received by the VCR from the cable converter is being output through the VCR's RF output, which depends on the state of the VCR's TV/VCR switch. Therefore, when the code signal is not detected at VID2 (step 380) step 394 follows step 380. At step 394 a code signal is again injected into the VCR on a frequency corresponding to the output channel of the cable converter, but this time detection occurs through VID1. Thus at step 396 it is determined whether the code signal is present at terminal VID1. If so, the VCR is merely passing through signals received from the cable converter and the VCR's being in playback mode is of no consequence. Accordingly, the monitoring system is operating in a manner equivalent to the cable-converter-only case so that steps 310, 312 and 314 (FIG. 8A) and the program then returns.

Returning again to step 396 (FIG. 8F), if the code signal was not detected at terminal VID1, then it is concluded that the VCR is in playback mode (Step 398). It is therefore necessary to determine whether a coded or uncoded tape is being played back (step 400). Thus step 402 follows, at which it is determined whether a channel identification signal is present at terminal VID2. If so, the time of recording, and source channel for the program recorded on the tape, as indicated by the data in the identification signal, are noted (step 404). Otherwise, it is noted that the tape is uncoded (step 406), and therefore is a rented or purchased movie or video, or the like.

Consideration will again be given to step 376 (FIG. 8E). If at that step it was determined that the cable converter is not the signal source for the VCR, then step 408 (FIG. 8G) follows. At step 408 it is determined whether an auxiliary source has been selected for the VCR. If not, step 410 follows, in which a channel detection operation is carried out, with channel detection signals being injected into the VCR and monitoring through terminal VID2. It is then determined whether the channel detection operation was successful (step 412). If so, it is noted that the VCR is in the record mode (step 414), since it will be recalled that the VCR's tape transport motor is on (step 352, FIG. 8E). Thus after step 414 is step 416, at which note is made of the channel to which the VCR is tuned. Following is step 418, at which channel identification signals are injected into the VCR on an augmented set of scanning intervals.

Following step 418 is step 420, at which it is determined whether the VCR is in the TV mode or the VCR mode. In other words, the state of the VCR's "TV/VCR" switch is determined. The manner of making this determination will be described below.

If at step 420 the VCR was found to be operating in TV mode, then a tuning people meter operation as in step 304 follows. Otherwise, step 422 follows, at which is it noted that the TV is showing the channel selected by the VCR, and the program then returns.

Returning now to step 412 (FIG. 8G), if the channel detection operation of step 410 was not successful, then the VCR is found to be in playback mode (step 424). There follows step 426, at which it is determined whether the VCR is operating in TV or VCR mode. If it is operating in TV mode, then again a tuning people meter operation (step 304, FIG. 8A) follows. Otherwise, steps 400, 402 etc (FIG. 8F), as previously described, follow step 426.

Returning again to step 408, if it was determined at that step that the VCR is receiving a signal from an auxiliary source, then step 428 (FIG. 8H) follows step 408. At step 428, a code signal is injected into the VCR on a frequency corresponding to the channel on which the VCR receives auxiliary signals. Terminal VID2 is monitored, and it is determined whether the code signal is present at terminal VID2 (step 430). If so, it is noted that the VCR is in record mode (step 432) and it is also noted that the television is showing material received from an auxiliary source (step 434).

If at step 430 the code signal is not detected, then a code signal is again injected on the frequency on which the VCR receives auxiliary signals (step 436) and terminal VID1 is monitored to determine whether the code signal is being output from the VCR's RF output (step 436). If so, it can be concluded that the VCR is in TV mode, so that tuning people meter operations per step 304 (FIG. 8A) follow step 438. Otherwise, i.e. if the code signal is detected at step 438, then the VCR is determined to be in playback mode and a determination is made whether a coded or uncoded tape is being played back, as in steps 398, 400, etc. (FIG. 8F).

Further consideration will now be given to step 340 (FIG. 8B). It will be recalled that at step 340 it is determined whether the VCR is receiving a signal from an auxiliary source. It will also be noted that according to the conditions under which step 340 was reached, neither the VCR nor the cable converter is the source of signals for the television, the VCR's motor is not on, and the cable converter is not the source of signals for the VCR. Thus at step 340 if it is determined that the VCR is receiving signals from an auxiliary source, a code signal is injected into the VCR on a frequency at which the VCR receives auxiliary signals (step 440), and terminal VID2 is monitored to determine whether the code signal is present (step 442). If not, steps 330, etc. (FIG. 8B) occur, as described before. Otherwise, tuning people meter operation as in step 304 (FIG. 8A) then follows.

Returning again to step 318, it will now be assumed that the cable converter was selected to be the source of signals for the television. In that case, step 444 (FIG. 8D) follows step 318. At step 444 it is determined whether the VCR's tape transport motor is on. If not, then the VCR is performing no function in the viewing system so that steps 310, etc. (FIG. 8A) follow step 444. Otherwise, step 444 is followed by step 446, in which it is determined whether the cable converter was selected to be the signal source for the VCR. If so, the situation is equivalent to that encountered at step 382 (FIG. 8E), i.e., both the television and VCR are receiving signals output by the cable converter. Accordingly, in this case, steps 382 etc. of FIG. 8E follow step 446. If will be noted that it has not been positively determined that the VCR is in record rather than playback mode, however, if the VCR happens to be in playback mode, there will be no harm in the injection of ID signals into the cable converter as per step 390 of FIG. 8E, because those signals will simply fail to be recorded by the VCR if it is in the playback mode.

Otherwise, i.e., if the cable converter was found at step 446 to have been selected as the signal source for the VCR, then 448 follows step 446. At step 448 it is determined whether an auxiliary source has been selected to be the signal source for the VCR. If not, step 450 follows step 448.

Regarding step 450, it should first be noted that it has been determined through step 318 (FIG. 8B) and steps 444, 446, and 448 (FIG. 8D), that the television is receiving its signals from the cable converter, while the VCR may be recording (since its tape transport motor is on) and the VCR is receiving signals from a source other than the cable converter or an auxiliary source. Thus both cable converter 26 and VCR 24 are performing channel selection functions, both of which require channel detection and channel identification operations. Step 450 therefore includes time multiplexing of injection signals applied to cable converter 26 with injection signals applied to VCR 24. The exact manner of multiplexing will be described in more detail below. For the time being, it will simply be noted that the remaining steps shown on FIG. 8D make up two virtually parallel control paths, consisting first of parallel channel detection steps 452A and 452B. Step 452A consists of a channel detection operation in which channel detection signals are injected into cable converter 26 and the video baseband signal output by TPM submodule 84 is monitored through input terminal VID1. Step 452B consists of a channel detection operation in which channel detection signals are injected into VCR 24 and the video baseband signal output from VCR 24 is monitored through input terminal VID2. Following step 452A is step 454A, in which note is made of the channel which was determined in step 452A to have been selected by cable converter 26. Meanwhile, step 453B follows step 452B. In step 453B it is determined whether the channel detection operation of step 452B was successful. If not, then the VCR is not in record mode and, since the playback mode is not meaningful (i.e. the TV is not receiving its signals from the VCR), the control path relating to the VCR simply returns. However, if detection at step 452B was successful, then 454B follows, in which it is noted that the VCR is in record mode and note is made of the channel to which the VCR is tuned. It will be understood that steps 453B and 454B are virtually parallel to step 454A.

Following steps 454A and 454B are two more virtually parallel steps 456A and 456B. In step 456A channel identification signals reflecting the channel noted at step 454A are injected into cable converter 26 and are monitored through input terminal VID1. Meanwhile, in step 456B, channel identification signals reflecting the channel noted at step 454B are injected into VCR 24 for recording by VCR 24 on a videotape. These signals are monitored through input terminal VID2.

At this point the discussion will return to step 448 of FIG. 8D. If at step 448 it was found that the signal source for the VCR has been selected to be an auxiliary source, then step 458 (FIG. 8C) follows step 448. At step 458 a code signal is injected into the VCR on the channel on which the VCR receives auxiliary signals. Terminal VID2 is monitored to determine whether the code signal is present (step 460). If so, it is simply noted that the VCR is in a record mode (step 462), but no identification signals are injected into the VCR, since it is unknown what the ultimate source of the program signals is. On the other hand, if the code signal is not detected, then step 464 follows step 460. Step 464 is a "don't care" playback mode because the VCR is not the signal source for the TV, so the program simply returns.

With reference again to FIG. 8A, if it is determined in step 300 that the cable converter is not present and operative, but in following step 302, it is determined that the VCR is present and operative, T/M module 28 enters a VCR only operating mode (step 466). In this mode it is first determined whether the VCR was selected to be the signal source for the TV receiver (step 468, FIG. 8C). If not, step 470 follows, in which it is determined whether the VCR's tape transport motor is on.

If at step 470 the motor is not found to be on, then tuning people meter operation as in step 304 (FIG. 8A) follows because the VCR is not performing any function in the system. Otherwise, steps 340, 440, etc. of FIG. 8B follow step 470.

Returning again to step 468, if it is determined at that step that the VCR was selected to be the signal source for the TV receiver, then step 472 follows, at which again it is determined whether the tape transport motor of the VCR is on. If so, steps 408, etc., of FIG. 8G, as previously described, follow step 472. Otherwise, step 474 (FIG. 8C) follows step 472. At step 474 it is determined whether an auxiliary source has been selected for the single source for the VCR. If so, a tuning people meter operation as in step 304 follows. Otherwise, step 476 follows step 474. At step 476, it is determined whether the VCR is in the TV mode or the VCR mode. If the VCR is found to be in TV mode, then tuning people meter operation follows. Otherwise, detection of the channel to which the VCR is tuned follows along with the other procedures previously discussed with respect to steps 360, 362, 364 and 366 (FIG. 8I).

It should be understood that step 300 and step 302 or step 305 (FIG. 8A), as the case may be, are performed each time T/M module 28 is initialized (e.g. when it is turned on). Thereafter a "program return" represents a return to whichever one of steps 306, 316, 304 and 466 was first reached after initialization.

CHANNEL DETECTION

A channel detection operation will now be described.

Channel detection operations are typically carried out when power up is detected for TV 22 or VCR 24, or when there is a change in the signal source selected by switch 112 or switch 114 (FIG. 3) or when a change in a previously selected channel is detected, as will be described below.

Figure 9A:
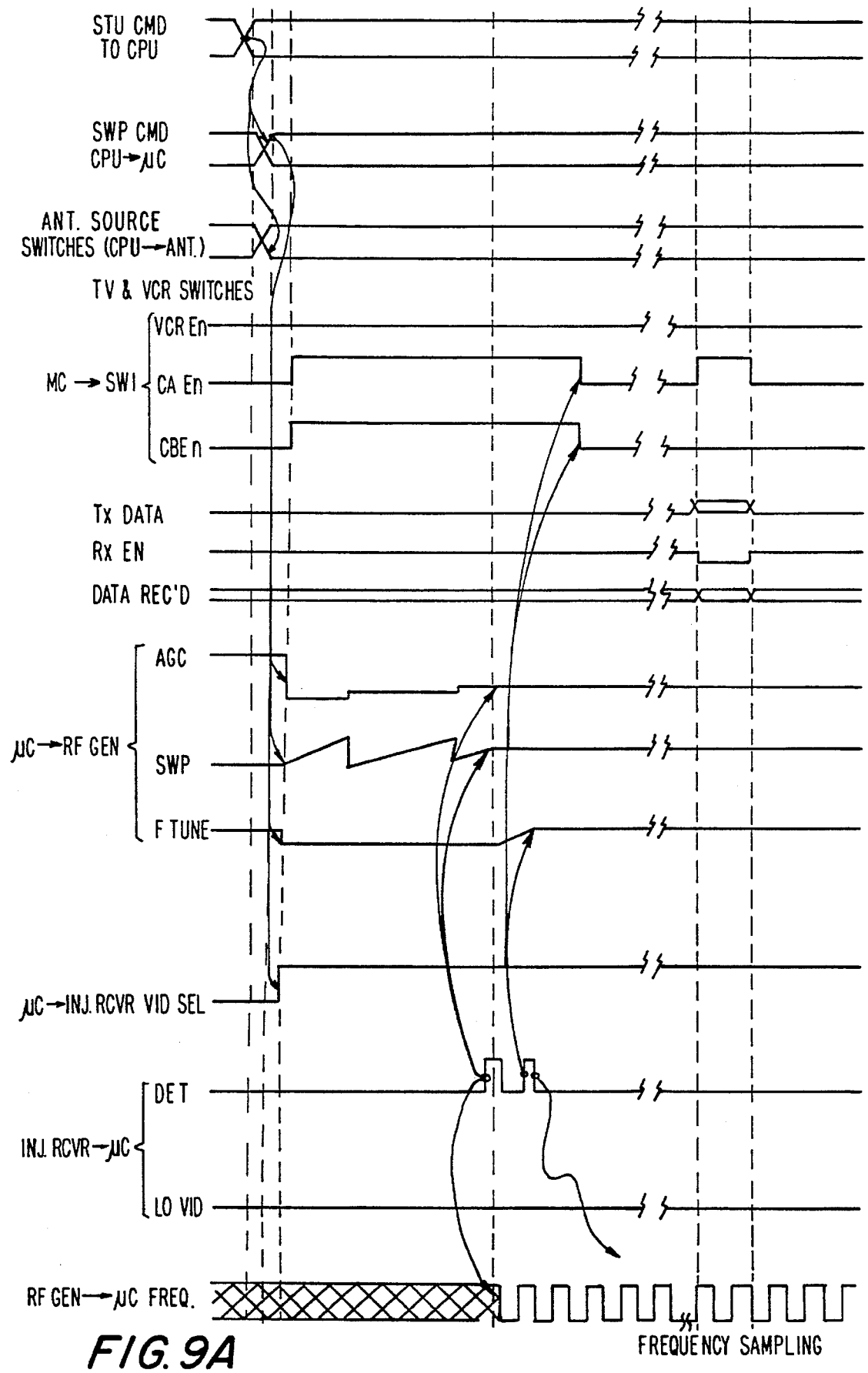
FIG. 9A is a timing diagram that illustrates a channel detection operation carried out by the tuning and monitoring module of FIG. 2.

A typical channel detection operation will now be described with reference to FIG. 9A, which is a timing diagram showing signal waveforms for signals sent and received in connection with a channel detection operation. It is assumed for the purposes of FIG. 9A that the channel detection operation is initiated by a change in signal source selection and that a channel selected by cable converter 26 is to be detected. Thus the first waveform shown on FIG. 9A is indicative of a source selection command entered through set top unit 30. It will be appreciated that the command may have originated from remote control unit 32.

The next two waveforms respectively indicate command data sent from CPU 72 to microcontroller 78 directing microcontroller 78 to commence an appropriate sweep operation and control signals sent from CPU 72 to antenna switch 82 for controlling source selection settings of switches 112 and 114 of antenna switch 82.

In response to the command signal received from CPU 72, microcontroller 78 sends control signals to switch SW1 of antenna switch 82 (FIG. 3). These control signals VCREn, CAEn and CBEn are shown as fourth, fifth and sixth waveforms of FIG. 9A. As indicated in FIG. 9A, signal VCREn is held low and signals CAEn and CBEn are set high during the sweep operation. Switch SW1 operates under control of the signals indicated in FIG. 9A to couple the channel detection signals to both cable output terminals 106 and 108.

Also in response to the command received from CPU 72, microcontroller 78 sends a control signal "VID SEL" to switch 130 of injection receiver 88 (FIG. 5). It will be assumed in this case that the source of the signal provided by VCR 24 is to be determined in this operation so that the VID SEL signal is set high, causing switch 130 to select input terminal VID2 for monitoring.

Microcontroller 78 also sends voltage ramp signals (wave form "SWP") so as to cause voltage controlled oscillator 118 (FIG. 4) to sweep through its entire frequency range. The sweep is preferably performed from the highest frequency to the lowest frequency to prevent false detection of harmonics of the channel detection signals. The first time the VCO 118 is swept through its frequency range, attenuator 126 (FIG. 4) is set by microcontroller 78 to a minimum amplitude level. If the first sweep does not result in detection of the signal output by RF generator 86, microcontroller 78 steps up the level of the signal output from attenuator 126 and causes VCO 118 to sweep again. This is repeated through several upward amplitude steps until either the injection signal is detected or a sweep has been performed at a predetermined maximum amplitude level. It will be assumed in this case that detection occurs at the third amplitude level of the detection signals. As indicated in the above discussion of injection receiver 88 (FIG. 5), the signal output by RF generator 86 is received at junction 131 of injection receiver 88, and filtered by BPF 142. The filtered signal is received by log power block 144, which produces a log power signal that varies as a function of the logarithm of the spectral energy of the received signal in the pass band of filter 142. The log power signal output by FSK block 144 is integrated and amplified. The amplified signal is compared to a time average of the amplified signal to provide a detection or "hit" signal to microcontroller 78. The hit signal is shown on FIG. 9A as a pulse in the "DET" wave form. It is also assumed for the purposes of the operation illustrated in FIG. 9A that the signal level detected by sync separator 136 is satisfactory so that a weak signal indication (shown as waveform "LO VID") is not sent.

Upon receipt of the first hit signal, microcontroller 78 maintains the signal output by attenuator 130 at the same level, steps the SWP signal back to compensate for over-shooting, and sends a ramp signal represented by waveform "Ftune"0 (FIG. 9B) to voltage controlled oscillator 120, causing VCO 120 to sweep through its frequency range so that a precise frequency for the detected signal can be determined. Assuming that a second, confirming, hit signal is received, the frequency signal "FREQ" received by microcontroller 78 from frequency divider block 128 (FIG. 4) of RF generator 86 is sampled to determine the precise frequency that has been detected. This frequency and the attenuator level are then stored for future updating.

Since, in this case, it has been assumed that channel selection by cable converter 26 is to be detected, it is necessary to determine whether the channel source is cable A or cable B. Accordingly, control signal CAEn is set high by microcontroller 78 after the confirming hit signal is received. The CBEn signal is held low so that data pulsing switch 116 (FIG. 3) is coupled only to output terminal 106. At the same time, microcontroller 78 causes a logic pattern to be applied to data pulsing switch 116 of antenna switch 82. If the logic pattern is detected at injection receiver 88 (as is assumed to be the case for the purpose of this example), then it is known that cable A has been selected by cable converter 26. Otherwise it is known that cable B has been selected. Data related to the detected frequency and the selected cable are transmitted by microcontroller 78 to CPU 72, which then determines the detected channel by reference to a look up table in a ROM (not shown for purposes of simplicity and clarity).

In an operation in which channel selection by VCR 24, rather than cable converter 26, is to be determined, it will be understood that signal VCREn is set high and CAEn and CBEn are held low, so that switch SW1 of antenna switch 82 couples the RF injection signals only to output terminal 104. It will also be understood that coupling the injection signal only to one of the cable output terminals 106 or 108 will not be required, and neither will transmission of a logic pattern for the purpose of identifying one of the two cables that has been selected.

It will also be appreciated that in some cases, as noted above, channel detection is to be performed through input terminal VID1, rather than input terminal VID2. In these cases, signal VID SEL is maintained low during the channel detection operation.

CHANNEL IDENTIFICATION SIGNALS

Figure 9B:
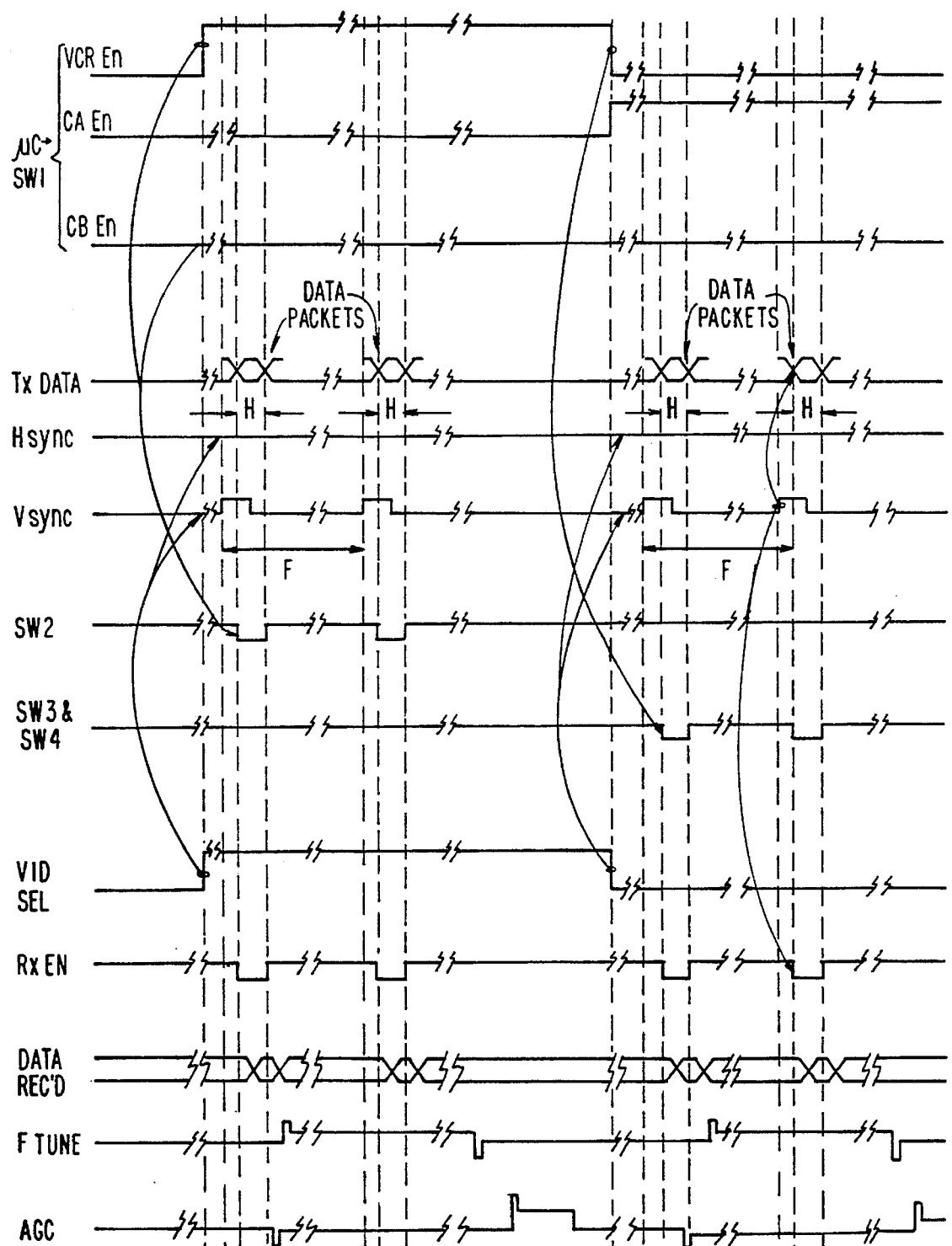
FIG. 9B is a timing diagram that illustrates injection of channel identification signals by the tuning and monitoring module of FIG. 2.

Injection of channel identification signals will now be described with reference to FIG. 9B. In particular, FIG. 9B shows waveforms of signals present in a channel identification operation which includes injection of identification signals on a time-multiplexed basis into both cable converter 26 and VCR 24.

The portion of the operation relating to injection of channel identification signals into the VCR is shown first, with signal VCREn set high so that switch SW1 of antenna switch 82 couples the injection signals to output terminal 104 and the signal VID SEL is set high to select input terminal VID2 for monitoring. Signals CAEn and CBEn are held low at this time. The vertical and horizontal synchronizing pulses "Vsync" and "Hsync" are detected through sync separator 136 and are received by microcontroller 78. On the basis of these timing signals, microcontroller 78 manages injection of channel identification signals at predetermined times that coincide with either the vertical blanking interval of the video signal or active invisible horizontal scanning lines. For example, in a preferred embodiment of the invention, a group of video lines L1 is used for injection of channel identification signals. Group L1 consists of one or more horizontal lines among lines 21 to 26. In this embodiment, 8 data bits are sent during a 40-microsecond period of each of the video lines making up group L1.

If the VCR was found to be in record mode, channel identification signals are also transmitted during an additional group of horizontal scanning lines referred to as group L2. Group L2, for example, may consist of one or more of lines 21 to 26 that are not included in group L1. As will be seen, injection of channel identification signals during both groups L1 and L2 during recording will aid in the confirmation of playback when channel identification signals recorded on a videotape by VCR 24 are played back and monitored.

The channel identification signals include data indicative of (a) the channel to which the VCR is tuned as determined in a channel detection operation; (b) the current time and date and (c) a serial number that identifies the particular T/M module 28.

After detection of the horizontal and vertical synchronization signals, a data signal "Tx data" is applied by microcontroller 78 to data pulsing switch 116, which causes on and off modulation of the RF injection carrier signal output by RF generator 86. At the same time, signal "SW2" as shown on FIG. 9B is set low so that a signal C2 is applied to switch SW2, uncoupling output terminal 104 from the signal source selected by switch 114. Thus, the channel identification signals received through switch SW1 are applied to output terminal 104 in substitution for the program signal received through switch 114. Also at the same time, the signal RxEN is made active (i.e., set low) so that time window 154 of injection receiver 88 (FIG. 5) is enabled to pass through the data comprising the channel identification signal received through input terminal VID2. The received data signal passed through time window 154 is buffered, integrated and compared with a reference to provide received data signals to microcontroller 78.

Interruption of the program signal at switch SW2, and substitution of the channel identification signal therefor, as noted above, facilitates detection of the channel identification signal by preventing any interference from the program signal.

In a preferred embodiment of the invention, the amplitude of the RF signal output by RF generator 86 is ramped up at the beginning of each data transmission, and ramped down at the end of each data transmission, in order to minimize signal disruption due to automatic signal leveling circuitry in the cable converter and/or VCR.

After one or more injections of channel identification signals to VCR 24, the other portion of the time multiplexed channel identification signal injection operation follows, in which identification signals are injected into cable converter 26. It will be assumed that cable A was previously determined to be the signal source for cable converter 26. Thus, signals VCREn, CBEn and VID SEL are set low and CAEn is set high, so that injection signals are coupled to output terminal 106 and input terminal VID1 is selected for monitoring. Again the horizontal and vertical timing signals are detected, a data signal is applied to data pulsing switch 116 to provide on and off data modulation of the RF injection signal, and this time switches SW3 and SW4 are shut off so that the signal supplied to cable converter 26 from input terminals 94 and 92 is cut off, and the channel identification signal is substituted therefor. Also, as before, time window 154 is at the same time enabled to receive data and the data received is sent to microcontroller 78.

It should be noted that the channel identification signal injected into cable converter 26 includes data indicative of a previously detected channel selected by the cable converter as well as current date and time and the serial number of T/M module 28.

It will be understood that in each case the RF injection signal output by RF generator 86 and modulated at data pulsing switch 116 is at a frequency that is related to the previously detected channel selected by VCR 24 or cable converter 26, as the case may be. In a preferred embodiment, the frequency is 1 MHz above the carrier frequency for the channel in question to facilitate clear reception of the channel identification signals.

It will also be recognized that occasional fine tuning and gain control adjustments are made as illustrated in the last two waveforms of FIG. 9B.

The two suboperations (injection of ID signals into the VCR and injection of ID signals into the cable converter) are alternated at regular intervals through time multiplexing and the presence of the identification signals is monitored through the respective input terminals VID2 and VID1, until, for a number of cycles, it is found in one or the other of the suboperations that the ID signal is no longer present. The absence of the ID signal over a number of cycles is taken to indicate a change of channel or other change of signal source, requiring a new channel detection operation as to one or both of VCR 24 and cable converter 26.

In an alternative embodiment of T/M module 28, TPM submodule 84 is connected to microcontroller 78 and provides to microcontroller 78 sync pulses derived from the demodulated signal produced within TPM submodule 84. Microcontroller 78 is programmed to carry out a channel detection routine in case there is a change or interruption in the sync pulses received from TPM submodule 84.

Assuming now that the cable converter 26 is the signal source for TV 22, channel detection will begin immediately on a change of channel by cable converter 26 even if the VCR's video baseband signal happens to be the signal being monitored at the time of the channel change. Without this arrangement, channel detection might be delayed for several seconds until it was time to inject identification signals into cable converter 26. As a result of the delay, the injection of the channel detection signals would take place several seconds after the channel change and so might cause a noticeable interference with the displayed picture.

Although there has been described with reference to FIG. 9B injection of channel identification signals into both cable converter 26 and VCR 24 with time-multiplexing, it should be understood that in many operating modes of T/M module 28, channel identification signals are injected into only one of cable converter 26 and VCR 24.

In another preferred embodiment of the invention, if VCR 24 is not in record mode, the channel identification signals are only a single bit, since the channel is already known for the purpose of selecting the frequency at which the channel identification signals are generated.

ALTERNATIVE PROCEDURE FOR DETECTING CHANGE OF CHANNEL

In another preferred embodiment of T/M module 28, a change in the channel selected by the VCR 24 or cable converter 26, or both, is carried out without monitoring channel identification signals. It will be understood that this procedure is carried out periodically, at times determined by CPU 72, after detection of a channel selected by VCR 24 or cable converter 26. The procedure will be described with reference to FIG. 9C.

The first step of the procedure is step 550, at which microcontroller 78 controls video switch 130 of injection receiver 88 (FIG. 5) to select either VCR 24 or cable convertor 26 for the channel change detection operation. A video baseband signal originating from the selected device is received at injection receiver 88 and the vertical and horizontal synchronization signals present in the received signal are separated by sync separator 136 and supplied to microcontroller 78 so that microcontroller 78 can synchronize the channel change detection operation with the received signal (step 552).

It will be understood that if VCR 24 is the selected device, the video baseband signal output by VCR 24 at its output terminal 504 (FIG. 7) is received directly at input terminal VID2 of injection receiver 88 (FIG. 5). On the other hand, where cable converter 26 is the selected device, an RF signal output by cable converter 26 is received and demodulated by TPM submodule 84 (FIG. 6) and a video baseband signal output by TPM submodule 84 is received at input terminal VID1 of injection receiver 88 (FIG. 5). In this latter case, the video baseband signal is to be understood as "originating" from cable converter 26.

Next is step 554 (FIG. 9C), at which microcontroller 78 initializes a count which will be used to control how many times the channel detection operation is repeated. Following step 554 is step 556, at which microcontroller 78 finds and selects three horizontal scanning intervals in a vertical blanking interval of the received signal. These selected horizontal scanning intervals are found by reference to the vertical sync signal provided by sync separator 136 and by counting an appropriate number of horizontal sync signals also supplied from sync separator 136. The three selected horizontal scanning intervals are preferably consecutive scanning intervals.

Next follows step 558 at which microcontroller 78 controls sample and hold block 134 of injection receiver 88 to sample and hold the received baseband signal during the first selected horizontal scanning interval. The resulting level is supplied to microcontroller 78 where it is converted from analog to digital and stored as a "black reference" level.

The next step is 560, in which, during the second selected horizontal scanning interval, microcontroller 78 interrupts the input signal to the device selected for the channel change detection operation. This is accomplished by appropriate control signals to switch SW2 (FIG. 3) if VCR 24 is the selected device or to switches SW3 and SW4 in case cable converter 26 is the selected device. As in step 558, microcontroller 78 controls sample and hold block 134 (FIG. 5) so that the signal received from the selected device is sampled and held during that second selected horizontal scanning interval and the resulting level again is converted by microcontroller 78 and stored as the "white reference" level.

Following step 560 is step 562, at which, during the third selected horizontal scanning interval, the input signal to the selected device is again interrupted, as in step 560. In addition, during that third horizontal scanning interval microcontroller 78 controls RF generator 86 (FIG. 4) and switch SW1 (FIG. 3) so that a substitute RF video signal is supplied to the selected channel selection device. The substitute RF video signal is at a frequency that is related to the channel which was previously detected to have been selected by the device being monitored. For example, the substitute RF video signal may be at the center frequency of that channel. Also during step 562, similarly to steps 558 and 560, microcontroller 78 controls sample and hold block 134 (FIG. 5) so that the signal received from the selected device is sampled and held, and the resulting level is converted and stored by microprocessor 78 as a "test value" level.

There then follows step 564, at which microcontroller 78 compares the test value with the black and white references. Next follows step 566 at which it is determined whether the test value is closer to the white reference level than it is to the black reference level. If not, it is concluded that the selected device has not changed the channel to which it was tuned (step 568), and the routine ends.

If at step 566 the test value was found to be closer to the white reference level, then step 570 follows. At step 570 the count is compared with a predetermined number to determine whether the finding that the test value is closer to white has been confirmed a desired number of times. If so, it is concluded that a channel change has occurred (step 571), and a flag is set or similar action is taken so that a channel detection operation like that of FIG. 9A is performed. The routine then ends. Otherwise, step 572 follows, at which the count is incremented and the routine then cycles back to step 556 and the following steps so that the detection of a channel change is confirmed a desired number of times. In a preferred embodiment of the invention, at step 572 arrangement is also made so that on the next iteration of step 562 the amplitude of the substitute RF signal is higher than the level of that signal during the immediately preceding step 562. Accordingly, steps 556 through 566 are repeated a predetermined number of times, with the amplitude of the substitute signal being increased each time. It will, of course, be understood that the repetition of those steps stops if it is determined at step 566 that a channel change has not occurred. Alternatively, it is also within the contemplation of this invention to carry out steps 556 though 566 only once for a selected device.

According to another preferred embodiment of the invention, in the case where the cable converter 26 is the selected device, a test is performed to determine whether the signal source for cable converter 26 has been changed from cable A to cable B or vice versa, before performing steps 556 through 566. In accordance with this embodiment, first and second horizontal scanning intervals are selected and then a first sample level is generated during the first of the two horizontal scanning intervals in the same manner was described with respect to step 558. Then, for the second of the two horizontal scanning intervals, microcontroller 78 controls either switch SW3 or switch SW4, as the case may be, in order to cut off from cable converter 26 whichever one of the two cables had previously been detected as the signal source therefor. At the same time, a second sample level is generated and the two sample levels are then compared and if they are found to differ by less than a predetermined reference amount, it is determined that the signal source has been changed so that a flag is set, for example, and a channel detection operation follows. Otherwise, it is determined that the same cable continues to be the signal source for cable converter 26, so that steps 554, 556 and so forth are then performed. It will be appreciated that this alternative with respect to monitoring of cable converter 26 may result in a more rapid detection of a change in the signal source, when the change has taken the form of changing cables and not just changing channels within the same cable.

It should also be understood that a procedure similar to that described with reference to FIG. 9C, and particularly steps 556 through 566, may be applied to a predetermined plurality of channels and thereby used as an alternative to the channel detection/sweep operation previously described with reference to FIG. 9A.

Figure 9C:
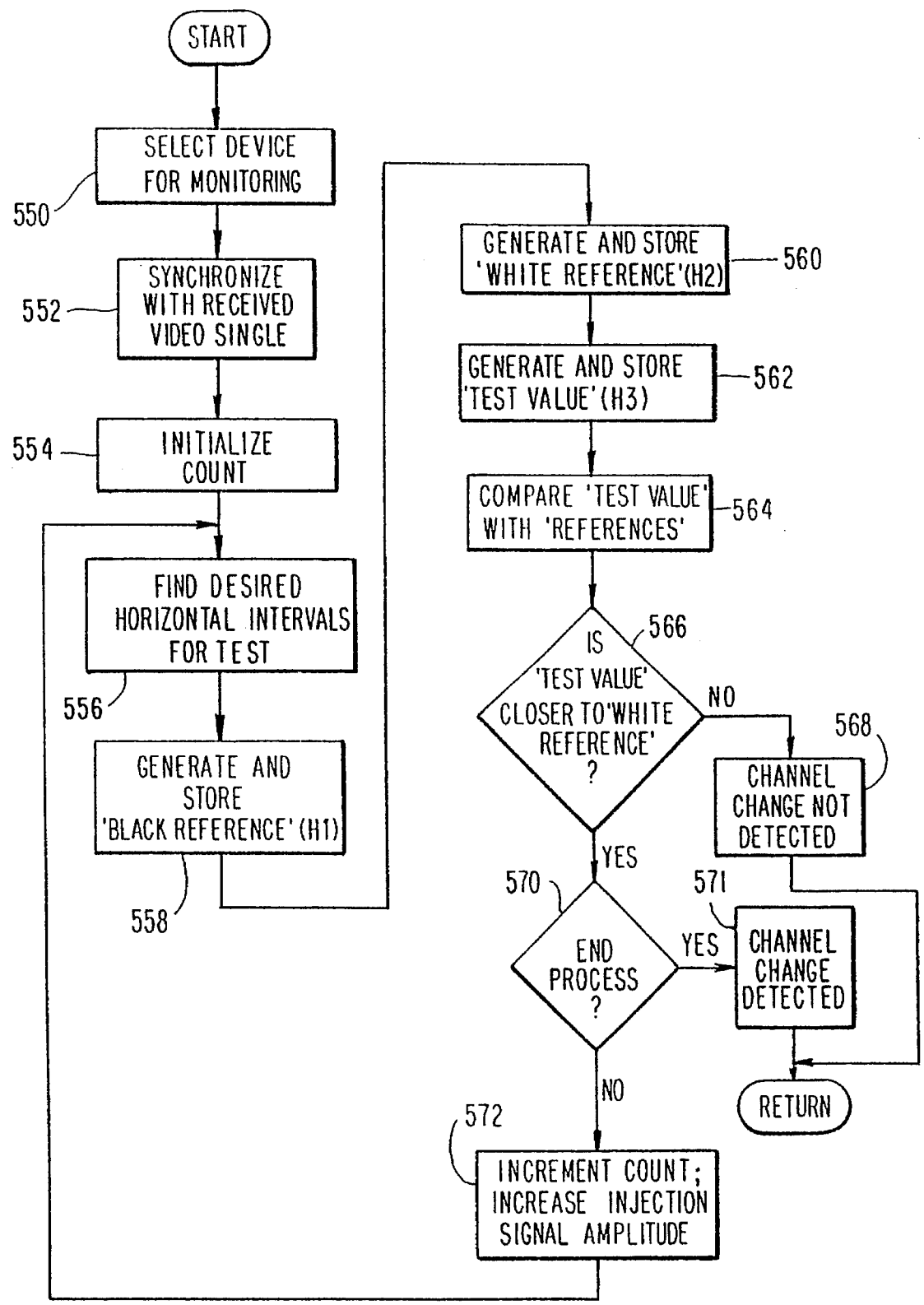
FIG. 9C is a flow chart of a process in an alternative embodiment of the invention for detecting a change of channel.

It should be noted that when the procedure of FIG. 9C is used, channel identification signals may be dispensed with, except with respect to programs that are being recorded by VCR 24.

DETECTION OF RECORD AND PLAYBACK MODE

Detection of operation of the VCR in record and playback mode will now be discussed.

In one preferred embodiment of the invention as shown in FIG. 1, an erase sensor pickup 62 is installed on or near VCR 24 and erase sensor electronics 90, as previously described, detects the presence of the VCR erase signal, which is taken to indicate a recording operation by the VCR.

Alternatively and as discussed with respect to FIGS. 8A–8I, erase sensing electronics may not be included and instead a level of power consumption by VCR 24 is sensed to determine whether the VCR's tape transport motor is in operation. Next, either a channel detection operation is carried out as described above, or a code signal is injected into the RF input of VCR 24 and terminal VID2 is monitored to determine whether the code signal is outputted at the VCR's video output terminal 504. If the channel detection operation fails, or the code signal is not detected, it can be concluded that the signal output at the video output terminal 504 is being produced by playing back a tape. Otherwise, it is concluded that the VCR is in record mode. When a video tape with identification signals recorded thereon is present in VCR 24, other modes of VCR 24, such as fast forward and rewind, can be detected by T/M module 28 by tracking the time data included in the identification signals in order to determine speed and direction of tape movement.

The presence of i.d. signals in groups L1 and L2, is used to confirm that a previously recorded tape is being played back.

DETECTION OF TV/VCR MODE

There will now be described a procedure for determining whether VCR 24 is in TV or VCR mode, i.e. for determining the state of TV/VCR switch 520 (FIG. 7) of VCR 24.

As previously noted, VCR 24 includes an RF terminal 502. As indicated above, it is necessary to determine the state of switch 520 only when the output of terminal 502 has been selected as the signal source for TPM submodule 84 (and therefore TV 22). At such a time, it will be understood that the signal output from terminal 502 will be received and tuned by TPM 84 and the received and tuned signal will be supplied in the form of a video baseband signal from TPM submodule 84 to input terminal VID1 of injection receiver 88.

The first step in the procedure is to determine whether TPM submodule 84 is tuned to the output frequency (typically channel 3) of RF modulator 518 (FIG. 7). If not, it can be concluded that switch 520 is coupled to input terminal 500 (i.e. VCR 24 is in the TV mode) and TPM submodule 84 is receiving and tuning an untuned signal that has passed through terminals 500 and 502.

If TPM 84 is tuned to channel 3, then a code signal such as a logic pattern at a carrier frequency corresponding to channel 3 is supplied by RF generator 86 and data pulsing switch 116 to input 500 of VCR 24. Then the received and tuned signal output from TPM submodule 84 is monitored through input terminal VID1 of injection receiver 88 to determine whether that data signal supplied to input terminal 500 of VCR 24 is present in the signal monitored through input terminal VID1.

If the code signal is not detected at VID1, then it can be concluded that the VCR is in VCR mode, and that either the code signal has been "tuned out" by tuner 506 of VCR 24 or the signal output at terminal 502 is being played back from a tape. If the signal is detected, then the VCR is found to be in TV mode, since it is assumed that tuner 506 has been bypassed. (In the special case where VCR 24 is in VCR mode and is not playing back a tape, but is tuned to channel 3, this procedure give a "false" indication that the VCR is in TV mode, but this "false" reading is acceptable, because operation of TPM 84 gives the correct information that channel 3 is the source of the signal for TV 22.)

It should also be noted that when TPM submodule 84 is tuned to channel 3, the VCR has been found to be in TV mode, and the signal source for the VCR is the antenna, cable A or cable B, it is necessary to inject channel identification signals into the VCR on a frequency corresponding to channel 3, and to monitor terminal VID1 to detect discontinuance of these signals. This is needed because the TV mode finding may be "false", so that the VCR is really in VCR mode and tuned to channel 3. In this case, a change in the channel to which the VCR is tuned can only be detected through provision of channel identification signals.

MONITORING OF SYSTEM HAVING TWO VCRS

Figure 10:
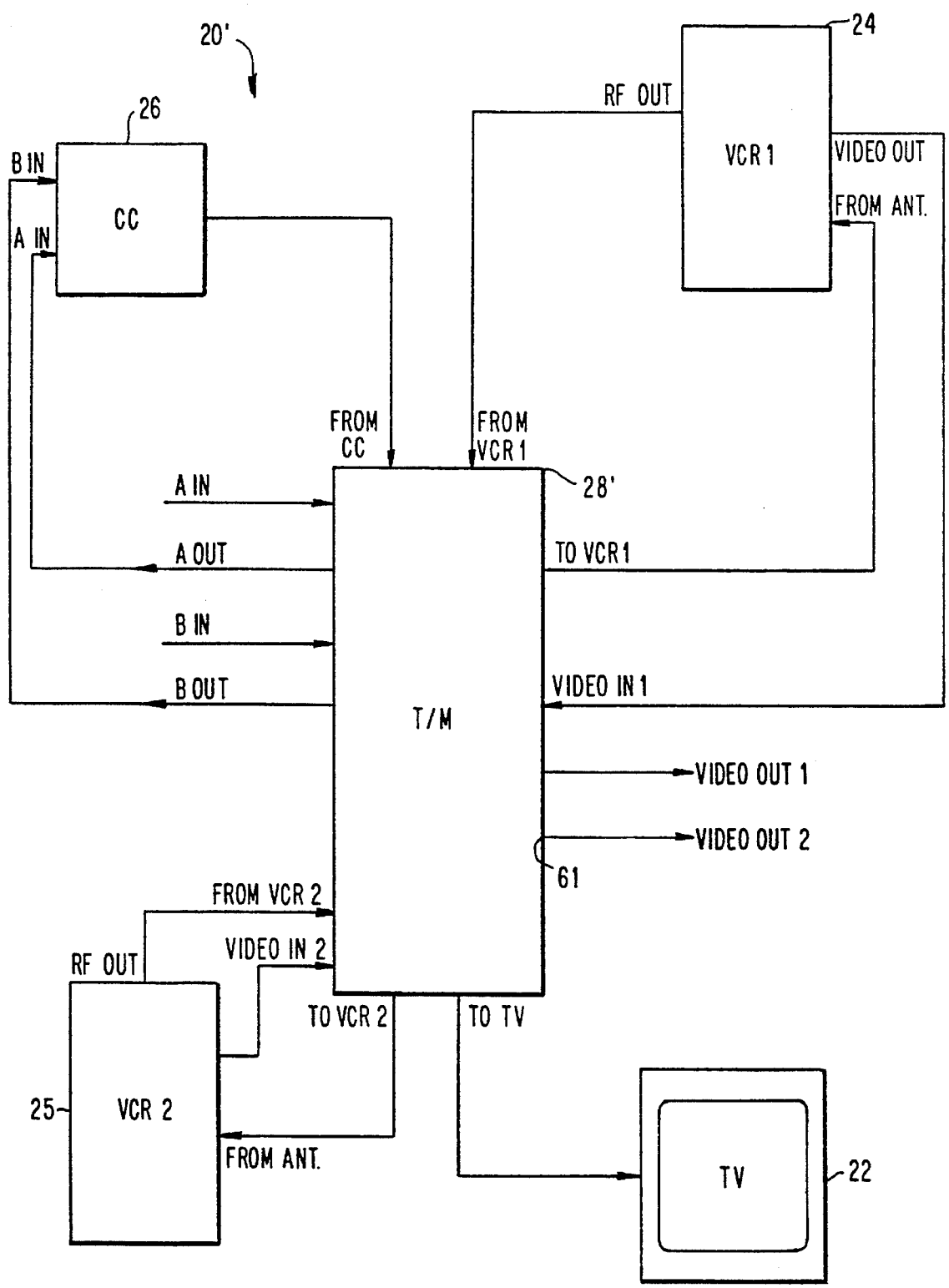
FIG. 10 is a block diagram of a video monitoring system that includes two VCRs and a tuning and monitoring module according to another embodiment of the invention.

There will now be described with reference to FIGS. 10 and 11A–11D another embodiment of the invention in which a viewing system that includes two VCRs is monitored. Referring first to FIG. 10, a viewing system 20' is shown, which includes VCR's 24 and 25 and T/M module 28' which is a modified version of T/M module 28 (FIGS. 1 and 2). For the sake of simplifying FIG. 10, not all of the components, connections and terminals of FIG. 1 are shown in FIG. 10, but it should be understood that viewing system 20' and T/M module 28' of FIG. 10 respectively have all of the components, connections and components shown in FIG. 1, in addition to the new component, connections and terminals shown in FIG. 10. Thus, in FIG. 10, VCR 25 is connected to T/M module 28' to receive an RF video signal therefrom and to supply thereto an output RF video signal and an output video baseband signal. Although not explicitly shown in FIG. 10 for simplicity and clarity, it should be understood that VCR 25 also has a power cord that is plugged into T/M module 28' in the same manner and for the same purpose as power cord 64 of VCR 24 in FIG. 1. It should also be noted that T/M module 28' of FIG. 10 has a second video output terminal 61, by which, as will be seen, the video baseband output of VCR 25 passes through T/M module 28'.

FIGS. 11A–11C illustrate modifications made to the antenna switch 82 of T/M module 28 in order to permit monitoring of a second VCR. FIGS. 11A–11C are to be compared with FIG. 3. Accordingly, in FIG. 11A there is shown a modified TV switch 112' which is to replace switch 112 of FIG. 3. Switch 112' is a seven input/one output switch. Six of the inputs are taken from the same sources as the inputs of switch 112 of FIG. 3. The seventh input is taken from an input terminal 103, to which the RF video output of VCR 25 is supplied. As with switch 112 of FIG. 3, the output of switch 112' is supplied to TPM submodule 84.

FIG. 11B shows a switch 114' which is to take the place of switch 114 of FIG. 3. Switch 114' is a six input/one output switch. Five of the inputs are taken from the same sources as the inputs to switch 114, while the sixth input is taken from input terminal 103.

FIG. 11C shows a switch 115 to be added to antenna switch 82 of FIG. 3 and also a modified switch SW1' to take the place of switch SW1 of FIG. 3. A switch SW5 shown in FIG. 11C also is to be added to antenna switch 82.

The six inputs of switch 115 (FIG. 11C) are taken from the same sources as the six inputs to switch 112 of FIG. 3. It should be understood that in the case of the inputs from terminals 92, 94, 96 and 100 the inputs to switch 115 are taken through respective amplifiers 110, as was the case with the inputs for switch 112. Switch 115 operates under the control of a control signal $c_V'$ provided by microprocessor 72. The output of switch 115 is connected to switch SW5, which selectively couples that output to output terminal 105. Switch SW5 operates under control of a control signal $c_5$ provided by microcontroller 78. Output terminal 105 is connected to provide the RF video input signal for VCR 25.

Switch SW1' is a one input/four output switch. Like switch SW1 of FIG. 3, the input of switch SW1' is supplied by data pulsing switch 116 (FIG. 3, not shown in FIG. 11C).

Three of the outputs of switch SW1' are provided to the same points as the three outputs of switch SW1 of FIG. 3. The fourth output of switch SW1' is connected to output terminal 105 through directional coupler DC 5.

Switch SW1' receives control signals CAEn, CBEn, VCR1En and VCR2En from microcontroller 78. Each of these control signals enable connection of the input of switch SW1' to a respective one of its outputs.

FIG. 11D shows a video switch 130' which replaces switch 130 in injection receiver 88 (FIG. 5). In addition to the two input terminals VID1 and VID2 as in switch 130, switch 130' also includes an input terminal VID3 to which is supplied the video baseband signal output from VCR 25. It will be noted that this signal is taken out from input VID3 to output terminal 61.

Switch 130' is operable under control of signals VID SEL1 and VID SEL2 provided by microcontroller 78 to selectively couple one of its input terminals VID1, VID2 and VID3 to AGC amp 132 of injection receiver 88.

With these modifications to T/M module 28, it will be appreciated that an embodiment thereof is provided which will monitor operation of a viewing system that includes two video cassette recorders and a cable converter. As will be understood by those skilled in the art, the operations of T/M module 28' are similar to those of T/M module 28, but with modifications as required to allow monitoring of additional VCR 25. Thus, in addition to channel detection with respect to VCR 24 and cable converter 26, channel detection is also carried out with respect to VCR 25, with a channel detection signal being supplied to the RF input of VCR 25 and monitoring of the video baseband output signal of VCR 25 of determine whether the channel detection signal is present in the output signal.

Channel identification signals are also injected into the RF input of VCR 25. It will be appreciated that these signals include data that indicates a channel to which VCR 25 is tuned as well as the date and time and the serial number of T/M module 28'. The data may also include a code that uniquely identifies the particular VCR.

As used in the appended claims, and also in the specification, the term "injection signal" should be understood to include (without limitation) any and all signals generated by RF generator 86 and applied to cable converter 26, or VCRs 24 or 25, including signals used for channel detection as well as signals that include channel identification data. It will also be noted that the channel identification signals are sometimes referred to as "i.d. signals".

While the invention has been described with reference to television viewing systems that include a "VCR", the term "VCR" should be understood to include reel to reel videotape recorders, video disk recorders and players, and any other device that records and reproduces video signals, in addition to conventional video cassette recorders. Also, the term "video recording device" should be considered to have the same meaning as that just ascribed to "VCR".

Also, as used in the appended claims and in the specification, the term "channel selection device" should be understood to include (without limitation) a VCR, a cable converter or any other device that selects one RF communication channel from a plurality of communication channels.

It will also be noted that both of the terms "television viewing system" and "video monitoring system" are used to signify a system that comprises a television receiver, a video monitor or any other device which displays video signals for viewing. "Video monitor" should be understood to include a conventional TV receiver.

What is claimed is:

1. A method of monitoring the usage of a video monitoring system that includes a video monitoring device, a cable converter and a VCR, said cable converter having an output terminal that is selectively connected to an input terminal of said VCR, the method comprising the steps of:

determining by means of a monitoring device whether said output terminal of said cable converter is connected to said input terminal of said VCR;

if it is determined that said output terminal of said cable converter is connected to said input terminal of said VCR, supplying a first channel detection signal from said monitoring device to an input terminal of said cable converter while varying a frequency of said first channel detection signal, receiving by means of said monitoring device a signal output from an output terminal of said VCR, determining by means of said monitoring device whether said first channel detection signal supplied to said input terminal of said cable converter is present in said signal output from said output terminal of said VCR, and if so, detecting by means of said monitoring device which of a first plurality of channels has been selected by said cable converter on the basis of the frequency of said first channel detection signal that is present in said signal output from said output terminal of said VCR; and if it is determined that said output terminal of said cable converter is not connected to said input terminal of said VCR, supplying a second channel detection signal from said monitoring device to said input terminal of said VCR while varying a frequency of said second channel detection signal, receiving by means of said monitoring device a signal output from said VCR, determining by means of said monitoring device whether said second channel detection signal is present in said signal output from said VCR, and if so, detecting by means of said monitoring deyice which of a second plurality of channels has been selected for reception by said VCR on the basis of the frequency of said second channel detection signal that is present in said signal output from said VCR.

2. The method of claim 1, wherein said video monitoring system includes a second VCR and further comprising the steps of:

supplying a third channel detection signal from said monitoring device to an input of said second VCR; and determining by means of said monitoring device whether said third channel detection signal is present in a signal output from said second VCR, and if so, detecting which of a third plurality of channels has been selected for reception by said second VCR on the basis of the frequency of said third channel detection signal that is present in said signal output from said second VCR.

3. The method of claim 1, further comprising the step of supplying a channel identification signal to said input terminal of said VCR when said output terminal of said cable converter is not connected to said input terminal of said VCR, said channel identification signal including data that identifies a channel selected for reception by said VCR and being recorded on a magnetic tape by said VCR to identify a source of a program signal recorded on said magnetic tape with said channel identification signal.

4. The method of claim 3, wherein said input terminal of said VCR is an RF input terminal.

5. The method of claim 1, further comprising the step of supplying a channel identification signal to said input terminal of said cable converter at a time when said output terminal of said cable converter is connected to said input terminal of said VCR; said channel identification signal including data that identifies a channel selected by said cable converter and being recorded on a magnetic tape by said VCR to identify a source of a program signal recorded on said magnetic tape with said channel identification signal.

6. The method of claim 5, further comprising the step of supplying a second channel identification signal to said input terminal of said VCR at a time when said output terminal of said cable converter is not connected to said input terminal of said VCR; said second channel identification signal including data that identifies a channel selected for reception by said VCR and being recorded on a further magnetic tape by said VCR to identify a source of a second program signal recorded on said further magnetic tape with said second channel identification signal.

7. An apparatus for monitoring the usage of a video monitoring system that includes a video monitoring device, a cable converter and a VCR, the apparatus comprising:

means for selectively connecting an output terminal of said cable converter to an input terminal of said VCR;

means for supplying a first channel detection signal to an input terminal of said cable converter while varying a frequency of said first channel detection signal when said output terminal of said cable converted is connected to said input terminal of said VCR;

means for receiving a signal output from an output terminal of said VCR;

means connected to said means for receiving for detecting that said first channel detection signal is present in said signal output from said output terminal of said VCR and for determining which of a plurality of channels has been selected by said cable converter on the basis of the frequency of said first channel detection signal that was detected in said signal output from said output terminal of said VCR;

means for supplying a second channel detection signal to said input terminal of said VCR while varying a frequency of said second channel detection signal when said output terminal of said cable converter is not connected to said input terminal of said VCR; and means connected to said means for receiving for detecting that said second channel detection signal is present in said signal output from said output terminal of said VCR and for determining which of a second plurality of channels has been selected for reception by said VCR on the basis of the frequency of said second channel detection signal that was detected in said signal output from said output terminal of said VCR.

8. The apparatus of claim 7, wherein said means for supplying said first channel detection signal and said means for supplying said second channel detection signal comprise a single RF generator means for generating both said first and second channel detection signals.

9. The apparatus of claim 7, further comprising means for supplying a channel identification signal to said input terminal of said VCR when said output terminal of said cable converter is not connected to said input terminal of said VCR, said channel identification signal including data that identifies a channel selected for reception by said VCR and being recorded on a magnetic tape by said VCR to identify a source of a program signal recorded on said magnetic tape with said channel identification signal.

10. The apparatus of claim 7, further comprising means for supplying a channel identification signal to said input terminal of said cable converter when said output terminal of said cable converter is connected to said input terminal of said VCR, said channel identification signal including data that identifies a channel selected by said cable converter and being recorded on a magnetic tape by said VCR to identify a source of a program signal recorded on said magnetic tape with said channel identification signal.

11. The apparatus of claim 10, further comprising means for supplying a second channel identification signal to said input terminal of said VCR when said output terminal of said cable converter is not connected to said input terminal of said VCR, said second channel identification signal including data that identifies a channel selected for reception by said VCR and being recorded on a further magnetic tape by said VCR to identify a source of a second program signal recorded on said further magnetic tape with said second channel identification signal.

12. The apparatus of claim 11, wherein said means for supplying said first channel detection signal and said means for supplying said second channel detection signal comprise a single RF generator means for generating both said first and second channel detection signals.

13. The apparatus of claim 12, further comprising means for generating said channel identification signals by modulating an RF signal generated by said RF generator means.

14. A method of monitoring usage of a video monitoring system that includes a video monitoring device and a VCR, the method comprising the steps of:

supplying a channel detection signal to an input terminal of said VCR; detecting that said channel detection signal is present in a signal outputted from an output terminal of said VCR and determining to which channel said VCR is tuned; and supplying a channel identification signal from said monitoring device to an RF input of said VCR, said channel identification signal including data that identifies said detected channel and being recorded on a magnetic tape by said VCR to identify a source of a program signal recorded on said magnetic tape with said channel identification signal.

15. The method of claim 14, further comprising the step of monitoring by means of said monitoring device a signal outputted by the VCR to determine whether said channel identification signal is present in said signal output by the VCR.

16. The method of claim 15, wherein said channel identification signal is repeatedly supplied to said RF input by said monitoring device at regular intervals and further comprising the step of detecting by.means of said monitoring device a change in a source of said signal output by the VCR by determining that said channel identification signal is not present in said signal outputted by the VCR.

17. The method of claim 14, wherein said video monitoring system includes a second VCR and further comprising the steps of:

detecting by means of said monitoring device a channel to which said second VCR is tuned; and supplying a second channel identification signal from said monitoring device to an RF input of said second VCR, said second channel identification signal including data that identifies said channel to which said second VCR is tuned and being recorded on a further magnetic tape by said second VCR to identify a source of a second program signal recorded on said further magnetic tape with said second channel identification signal.

18. The method of claim 17, further comprising the step of generating both of said channel identification signals by using a single RF generating means.

19. An apparatus for monitoring usage of a video monitoring system that includes a video monitoring device and a VCR, the apparatus comprising:

means for supplying a channel detection signal to an input terminal of said VCR;

means for detecting that said channel detection signal is present in a signal outputted from an output terminal of said VCR and for determining to which channel said VCR is tuned; and signal supply means for supplying a channel identification signal to an RF input of said VCR, said channel identification signal including data that identifies said detected channel and being recorded on a magnetic tape by said VCR to identify a source of a program signal recorded on said magnetic tape with said channel identification signal.

20. The apparatus of claim 19, further comprising means for monitoring said signal outputted by the VCR to determine whether said channel identification signal is present in said signal output by the VCR.

21. The apparatus of claim 20, wherein said signal supply means comprises means for repeatedly supplying said channel identification signal to said RF input at regular intervals and further comprising means for detecting a change in a source of said signal outputted by the VCR by determining that said channel identification signal is not present in said signal outputted by the VCR.

22. The apparatus of claim 19, wherein said video monitoring system includes a second VCR and further comprising:

means for detecting a channel to which said second VCR is tuned; and means for supplying a second channel identification signal to an RF input of said second VCR, said second channel identification signal including data that identifies said channel to which said second VCR is tuned and being recorded on a further magnetic tape by said second VCR to identify a source of a second program signal recorded on said further magnetic tape with said second channel identification signal.

23. The apparatus of claim 22, further comprising a single RF generating means for generating both of said channel identification signals.

24. A method of monitoring usage of a video recording device that is tuned to a channel in order to receive a program signal, said video recording device being selectively operated in a recording mode in which said program signal is recorded on a recording medium, the method comprising the steps of:

detecting by means of a monitoring device said channel to which said video recording device is tuned;

detecting by means of said monitoring device timing pulses present in said program signal;

generating by means of said monitoring device an identification signal that identifies said detected channel;

modulating by means of said monitoring device an RF carrier with the generated identification signal, the RF carrier having a frequency which corresponds to the frequency of said detected channel;

determining by means of said monitoring device whether said video recording device is being operated in the recording mode; and when it is determined that said video recording device is not being operated in the recording mode, repeatedly supplying said modulated RF carrier from said monitoring device to an RF input of said video recording device on the basis of said detected timing pulses and in synchronism with a first set of scanning intervals of said program signal, and when it is determined that said video recording device is being operated in the recording mode, repeatedly supplying said modulated RF carrier from said monitoring device to the RF input of said video recording device on the basis of said detected timing signals and in synchronism with a second set of scanning intervals of said program signal so that said identification signal is recorded on said recording medium in said second set of scanning intervals of said program signal to identify a source of said program signal; said second set of intervals comprising said first set and additional scanning intervals of said program signal.

25. The method of claim 24, wherein said video recording device is selectively operated in a playback mode in which said program signal and said identification signal recorded on said recording medium are played back and further comprising the step of determining by means of said monitoring device whether or not said video recording device is being operated in the playback mode.

26. The method of claim 25, wherein said step of determining whether or not the video recording device is being operated in the playback mode comprises the substeps of:

sequentially supplying a plurality of channel detecting signals to the RF input of the video recording device;

monitoring signals output from the video recording device; and determining that the video recording device is being operated in the playback mode if none of said plurality of detecting signals are present in said signals output by the video recording device.

27. The method of claim 25, wherein said identification signal includes data representative of a time at which said identification signal was generated and further comprising the steps of detecting and decoding an identification signal that has been recorded on said recording medium when the video recording device is playing back a program signal recorded therewith in order to determine a time at which and a channel from which said program signal was recorded.

28. The method of claim 24, wherein said step of determining whether or not the video recording device is being operated in the recording mode comprises detecting a level of power drawn by the video recording device.

29. The method of claim 24, wherein said step of determining whether or not the video recording device is being operated in the recording mode comprises detecting an erase signal that is applied to the recording medium by the video recording device when the video recording device is being operated in the recording mode.

30. The method of claim 24, wherein said step of supplying said modulated RF carrier to the RF input of the video recording device comprises interrupting said program signal during intervals that are in synchronism with times at which said modulated RF carrier is supplied so that said video recording device receives only said modulated RF carrier during said intervals.

31. An apparatus for monitoring usage of a video recording device that is tuned to a channel in order to receive a program signal, said device being selectively operated in a recording mode in which said program signal is recorded on a recording medium, the apparatus comprising:

means for detecting said channel to which said device is tuned, the channel detecting means being coupled to an output terminal of said device;

means for detecting timing pulses present in said program signal, the timing pulse detecting means being coupled to said output terminal of said device;

means for generating an identification signal that identifies said detected channel;

means for modulating an RF carrier with the generated identification signal, the RF carrier having a frequency which corresponds to the frequency of said detected channel;

means for determining whether said device is being operated in the recording mode, the recording mode determining means including one of erase sensor pickup means located on or near said VCR for detecting a VCR erase signal and power consumption sensing means coupled to an input power terminal of said VCR for sensing a level of power consumption by said VCR; and means for supplying said modulated RF carrier to an RF input of the device in accordance with a timing based on said detected timing pulses;

said means for supplying comprising means repeatedly supplying said modulated RF carrier in synchronism with a first set of scanning intervals of said program signal when it is determined that the device is not being operated in the recording mode and repeatedly supplying said modulated RF carrier in synchronism with a second set of scanning intervals of said program signal when it is determined that the device is being operated in the recording mode so that said identification signal is recorded on said recording medium in said second set of scanning intervals of said program signal to identify a source of said program signal; said second set of intervals comprising said first set and additional scanning intervals of said program signal.

32. The apparatus of claim 31, wherein said device is selectively operated in a playback mode in which said program signal and said identification signal recorded on said recording medium are played back and further comprising means for determining whether or not said device is being operated in the playback mode, the playback mode determining means being coupled to said output terminal of said device.

33. The apparatus of claim 32, wherein said means for determining whether or not the device is being operated in the playback mode comprises:

means for sequentially supplying a plurality of channel detection signals to the RF input of the device;

means for monitoring signals output from the device; and means for determining that the device is being operated in the playback mode if none of said plurality of detection signals are present in said signals output by the device.

34. The apparatus of claim 31, wherein said means for supplying said modulated RF carrier to the RF input of the device comprises means for interrupting said program signal during intervals that are in synchronism with times at which said modulated RF carrier is supplied so that said device receives only said modulated RF carrier during said intervals.

35. A method of monitoring usage of a video monitoring system that includes a video monitoring device, a cable converter and a VCR, the method comprising the steps of:

detecting by means of a monitoring device which of a plurality of channels is selected for reception by said cable converter;

connecting an output terminal of said cable converter to an input terminal of said VCR; and supplying a channel identification signal from said monitoring device to an input terminal of said cable converter, said channel identification signal including data that identifies said detected channel and being recorded on a magnetic tape by said VCR to identify a source of a program signal recorded on said magnetic tape with said channel identification signal.

36. The method of claim 35, wherein said channel identification signal is repeatedly supplied to said input of the cable converter at regular intervals and further comprising the steps of:

monitoring by means of said monitoring device a signal output by the cable converter to determine whether said channel identification signal is present in said signal outputted by the cable converter; and detecting by means of said monitoring device a change of channels by the cable converter by determining that said channel identification signal is not present in said signal output by the cable converter.

37. The method of claim 35, wherein said channel detecting step comprises the substeps of:

supplying a channel detection signal to said input terminal of said cable converter while varying a frequency of said channel detection signal;

receiving signals output from an output terminal of said VCR;

detecting that said channel detection signal is present in said signals output from said output terminal of said VCR; and determining which of said plurality of channels is selected by said cable converter on the basis of the frequency of said channel detection signal that was detected in said signal output from said output terminal of said VCR.

38. An apparatus for monitoring usage of a video monitoring system that includes a video monitoring device, a cable converter and a VCR, the apparatus comprising:

channel detection means for detecting which of a plurality of channels is selected for reception by said cable converter, said channel detection means being included in said monitoring device and being coupled to at least one of an input terminal and an output terminal of said cable converter;

means for connecting said output terminal of said cable converter to an input terminal of said VCR; and means for supplying a channel identification signal to an input terminal of said cable converter, said channel identification signal including data that identifies said detected channel and being recorded on a magnetic tape by said VCR to identify a source of a program signal recorded on said magnetic tape with said channel identification signal, the supplying means being included in said monitoring device.

39. The apparatus of claim 38, wherein said means for supplying said channel identification signal comprises means for repeatedly supplying said identification signal to said input of the cable converter at regular intervals and further comprising:

means for monitoring a signal output by the cable converter to determine whether said channel identification signal is present in said signal output by the cable converter, the monitoring means being included in said monitoring device; and means for detecting a change of channels by the cable converter by determining that said channel identification signal is not present in said signal output by the cable converter, the channel change detecting means being included in said monitoring device.

40. The apparatus of claim 38, wherein said channel detection means comprises:

means for supplying a channel detection signal to said input of said cable converter while varying a frequency of said channel detection signal;

means for receiving signals output from an output terminal of said VCR;

means for detecting that said channel detection signal is present in said signals output from said output terminal of said VCR; and means for determining which of said plurality of channels is selected by said cable converter on the basis of the frequency of said channel detection signal that was detected in said signal output from said output terminal of said VCR.

41. In a video monitoring system including a VCR which has an input terminal for receiving input video signals and an RF output terminal for outputting RF modulated video signals, the VCR being selectively operated in a first mode in which said input video signals are passed through to said RF output terminal without tuning and a second mode in which a tuned RF modulated video signal is output via said RF output terminal, a method of detecting the VCR's mode of operation, comprising the steps of:

supplying a code signal from a monitoring device to said input terminal of the VCR;

receiving and tuning a signal output from said RF output terminal by means of said monitoring device in order to provide a tuned video signal for display by a display device;

determining by means of said monitoring device whether said code signal is present in said signal that was received and tuned, and determining by means of said monitoring device that the VCR is in said first mode if said code signal is present in said signal that was received and tuned, and that the VCR is in said second mode if said code signal is not present in said signal that was received and tuned.

42. The method of claim 41, wherein said receiving and tuning step comprises supplying said signal output from said RF output terminal to a tuning/meter device which tunes said signal output from said RF output terminal, provides said tuned signal to said display device and collects data concerning usage of said display device.

43. An apparatus for detecting a mode of operation of a VCR which has an input terminal for receiving input video signals and an RF output terminal for outputting RF modulated video signals, the VCR being selectively operated in a first mode in which said input video signals are passed through to said RF output terminal without tuning and a second mode in which a tuned RF modulated video signal is output via said RF output terminal, the apparatus comprising:

means for supplying a code signal to said input terminal of the VCR;

means for receiving and tuning a signal output from said RF output terminal in order to .provide a tuned video signal for display by a display device; and means for determining whether said code signal is present in said signal that was received and tuned, determining that the VCR is in said first mode if said code signal is present in said signal that was received and tunedt and determining that the VCR is in said second mode if said code signal is not present in said signal that was received and tuned.

44. The apparatus of claim 43, wherein said receiving and tuning means comprises a tuning/meter device which tunes said signal output from said RF output terminal, provides said tuned signal to said display device and collects data concerning usage of said display device.

45. A method of monitoring usage of a VCR that is selectively operated in a playback mode in which the VCR reproduces a video signal from a videotape, the method of comprising the steps of:

sequentially supplying a plurality of channel detection signals to an RF input terminal of the VCR;

monitoring signals output from the VCR; and detecting that the VCR is being operated in the playback mode by determining that none of said channel detection signals are present in said signals output from the VCR.

46. The method of claim 45, further comprising the step of determining whether the VCR is playing back a program recorded on the videotape by the VCR by detecting channel identification signals recorded on the videotape with the program and played back with the program by the VCR, said channel identification signals comprising data that identifies a time at which, a channel from which, and the VCR by which said program was recorded.

47. An apparatus for monitoring usage of a VCR that is selectively operated in a playback mode in which the VCR reproduces a video signal from a videotape, the apparatus comprising:

means for sequentially supplying a plurality of channel detection signals to an RF input terminal of the VCR;

means for monitoring signals output from the VCR; and means for detecting that the VCR is being operated in the playback mode by determining that none of said channel detection signals are present in said signals output from the VCR.

48. The apparatus of claim 47, further comprising means for determining whether the VCR is playing back a program recorded on the videotape by the VCR by detecting channel identification signals recorded on the videotape with the program and played back with the program by the VCR, said channel identification signals comprising data that identifies a time at which, a channel from which, and the VCR by which said program was recorded.

49. In a device for monitoring usage of a video monitoring system that includes a video monitor, a cable converter and a VCR, an apparatus for interconnecting said video monitor, cable converter and VCR, the apparatus comprising:

a plurality of input terminals for each receiving video signals from respective sources including an output terminal of said cable converter;

a VCR input terminal for receiving signals from an output terminal of said VCR;

a tuning/meter module for receiving an input video signal, tuning said input video signal, providing said tuned signal to an input terminal of said video monitor, and collecting data concerning usage of said video monitor;

a VCR output terminal for providing a selected signal to an input terminal of said VCR;

first switch means for selectively coupling one of said plurality of input terminals to said VCR output terminal;

second switch means for coupling a selected one of said VCR input terminal and said plurality of input terminals to said tuning/meter module; and control means for controlling operation of said first and second switch means.

50. The apparatus of claim 49, wherein said plurality of input terminals comprises:

an antenna input terminal for receiving broadcast television signals from an antenna;

an auxiliary input terminal for receiving signals from an auxiliary source;

a first cable input terminal for receiving cable television signals from a first cable;

a second cable input terminal for receiving cable television signals from a second cable; and a cable converter input terminal for receiving signals output by said cable converter.

51. The apparatus of claim 50, further comprising:

an injection signal input terminal for receiving RF injection signals;

two cable converter output terminals; each coupled to a respective one of said cable input terminals, for providing said cable television signals to said cable converter; and third switch means controlled by said control means for coupling said injection signal input terminal to a selected one of said two cable converter output terminals and said VCR output terminal.

52. The apparatus of claim 51, further comprising:

means for generating said RF injection signals; and means for supplying said RF injection signals to said injection signal input terminal.

53. The apparatus of claim 52, wherein said RF injection signals comprise channel identification signals.

54. The apparatus of claim 50, further comprising:

a second VCR input terminal for receiving signals output by a second VCR;

a second VCR output terminal for providing a selected signal to said second VCR; and third switch means for selectively coupling to said second VCR output terminal a selected one of said input terminals other than said second VCR input terminal;

said second switch means including means for selectively coupling said second VCR input terminal to said tuning/meter module;

said first switch means including means for selectively coupling said second VCR input terminal to said VCR output terminal that is not said second VCR output terminal.

55. The apparatus of claim 54, further comprising:

an injection signal input terminal for receiving RF injection signals;

two cable converter output terminals, each coupled to a respective one of said cable input terminals, for providing said cable television signals to said cable converter; and fourth switch means controlled by said control means for coupling said injection signal input terminal to a selected one of said second VCR output terminal, said VCR output terminal that is not said second VCR output terminal, and said two cable converter output terminals.

56. An apparatus for receiving channel detection and channel identification signals generated by injection signal generating circuitry and applied to and transmitted through an RF channel selection device, the apparatus comprising:

an input terminal for receiving signals output from said RF channel selection device;

means for selectively coupling said input terminal to one of a plurality of channel selection devices;

means for transmitting a signal indicative of a level of said signals output from said RF channel selection device being below a predetermined level;

means for transmitting to a control means signals indicative of timing pulses present in a video signal output from the channel selection device, said timing pulses being indicative of vertical and horizontal scanning periods of said video signal;

means connected to said input terminal for generating a hit signal in response to said channel detection signal being present at said input terminal and for transmitting said hit signal to said control means; and means connected to said input terminal for transmitting data contained in said received channel identification signal to said control means.

57. An apparatus for receiving channel detection and channel identification signals generated by injection signal generating circuitry and applied to and transmitted through an RF channel selection device, the apparatus comprising:

an input terminal for receiving signals output from said RF channel selection device;

means connected to said input terminal for generating a hit signal in response to said channel detection signal being present at said input terminal and for transmitting said hit signal to a control means, said hit signal generating means including means for generating a log power signal that varies as a function of the logarithm of the spectral energy, in a predetermined frequency band, of a signal present at said input terminal;

means for integrating said log power signal;

means for amplifying said integrated log power signal;

means for averaging said amplified signal to produce a reference signal; and means for comparing said amplified signal to said reference signal and generating said hit signal in response to a level of said amplified signal exceeding a level of said reference signal by a predetermined factor; and means connected to said input terminal for transmitting data contained in said received channel identification signal to said control means.

58. An apparatus for receiving channel detection and channel identification signals generated by injection signal generating circuitry and applied to and transmitted through an RF channel selection device, the apparatus comprising:

an input terminal for receiving signals output from said RF channel selection device including a video signal having horizontal scanning intervals;

means connected to said input terminal for generating a hit signal in response to said channel detection signal being present at said input terminal and for transmitting said hit signal to a control means; and means connected to said input terminal for transmitting data contained in said received channel identification signal to said control means and including means responsive to a control signal supplied thereto for preventing said data transmitting means from transmitting data at times other than predetermined ones of said horizontal scanning intervals of said video signal.

59. The apparatus of claim 58, wherein said intervals are concurrent with times at which said channel identification signals are applied to the channel selection device.

60. An apparatus for receiving channel detection and channel identification signals generated by injection signal generating circuitry and applied to and transmitted through an RF channel selection device, the apparatus comprising:

an input terminal for receiving signals output from said RF channel selection device;

means connected to said input terminal for generating a hit signal in response to said channel detection signal being present at said input terminal and for transmitting said hit signal to a control means, said hit signal generating means including means for generating a ramp signal in response to said channel detection signal being present at said input terminal;

means for differentiating said ramp signal;

means for filtering said differentiated signal;

means for buffering said filtered signal; and means for comparing said buffered signal against a reference level and generating said hit signal in response to said buffered signal being not less than said reference level; and means connected to said input terminal for transmitting data contained in said received channel identification signal to said control means.

61. A method of determining whether a channel selection device is receiving an input signal from a predetermined signal source, said method comprising the steps of:

receiving a video baseband signal originating from said channel selection device, said video baseband signal having vertical blanking intervals that each include a plurality of horizontal scanning intervals;

separating vertical and horizontal synchronizing signals from the received video baseband signal;

selecting first, second and third ones of said plurality of horizontal scanning intervals in one of said vertical blanking intervals of said received video baseband signal;

interrupting said input signal during said second and third horizontal scanninq intervals and supplying a comparison signal to said channel selection device during said third horizontal scanning interval;

generating a respective sample level for each of said first, second and third horizontal scanning intervals, by sampling and holding a level of said received video baseband signal during each of said first, second and third horizontal scanning intervals;

storing said generated sample levels;

comparing said stored sample levels; and determining that said input signal is from said predetermined signal source if said stored sample level corresponding to said third horizontal scanning interval is closer to said stored sample level corresponding to said first horizontal scanning interval than to said stored sample level corresponding to said second horizontal scanning interval.

62. The method of claim 61, wherein said input signal is an RF video signal and said predetermined signal source is a predetermined channel, and said comparison signal is an RF video signal at a frequency that corresponds to said predetermined channel.

63. A method of determining whether a channel selection device is receiving an input signal from a cable over which a plurality of programs are transmitted simultaneously on respective channels, said cable being selectively connected to said channel selection device, said method comprising the steps of:

receiving a video baseband signal originating from said channel selection device, said video baseband signal having vertical blanking intervals that each include a plurality of horizontal scanning intervals;

separating vertical and horizontal synchronizing signals from the received video baseband signal;

selecting first and second ones of said plurality of horizontal scanning intervals disconnecting said cable from said channel selection device during said second horizontal scanning interval;

generating a respective sample level for each of said first and second horizontal scanning intervals, by sampling and holding a level of said received video baseband signal during each of said first and second horizontal scanning intervals;

storing said qenerated sample levels;

comparing said stored sample levels; and determining that said channel selection device is not receiving the input signal from said cable if said stored sample levels corresponding to said first and second horizontal scanning intervals differ by less than a predetermined amount.

64. The method of claim 63, wherein said channel selection device is a cable converter.

65. Apparatus for determining whether a channel selection device is receiving an input signal from a predetermined signal source, said apparatus comprising:

means for receiving a video baseband signal originating from said channel selection device, said video baseband signal having vertical blanking intervals that each include a plurality of horizontal scanning intervals;

means for separating vertical and horizontal synchronizing signals from the received video baseband signal;

selecting means for selecting first, second and third ones of said plurality of horizontal scanning intervals in one of said vertical blanking intervals of said received video baseband signal;

means for interrupting said input signal during said second and third horizontal scanning intervals and supplying a comparison signal to said channel selection device during said third horizontal scanning interval;

sample means for generating a respective sample level for each of said first, second and third horizontal scanning intervals by sampling and holding a level of said received video baseband signal during each of said first, second and third horizontal scanning intervals;

storage means for storing said sample levels generated by said sample means;

comparison means for comparing said sample levels stored in said storage means; and determining that said input signal is from said predetermined signal source if said stored sample level corresponding to said third horizontal scanninq interval is closer to said stored sample level corresponding to said first horizontal scanning interval than to said stored sample level corresponding to said second horizontal scanning interval.

66. The apparatus of claim 65, wherein:

said input signal is an RF video signal;

said predetermined signal source is a predetermined channel; and said comparison signal is an RF video signal at a frequency that corresponds to said predetermined channel.

67. Apparatus for determining whether a channel selection device is receiving an input signal from a cable over which a plurality of programs are transmitted simultaneously on respective channels, said cable being selectively connected to said channel selection device, said apparatus comprising:

means for receiving a video baseband signal originating from said channel selection device, said video baseband signal having vertical blanking intervals that each include a plurality of horizontal scanning intervals;

means for separating vertical and horizontal synchronizing signals from the received video baseband signal;

means for selecting first and second ones of said plurality of horizontal scanning intervals;

means for disconnecting said cable from said channel selection device during said second horizontal scanning interval;

sample means for generating a respective sample level for each of said first and second horizontal scanning intervals, by sampling and holding a level of said received video baseband signal during each of said first and second horizontal scanning intervals;

storage means for storing said generated sample levels;

comparison means for comparing said sample levels generated by said sample means; and means for determining that said channel selection device is not receiving the input signal from said cable if said stored sample levels corresponding to said first and second horizontal scanning intervals differ by less than a predetermined amount.

68. A method of determining whether a predetermined channel selected by a channel selection device has been changed, said channel selection device receiving an input RF video signal, said method comprising the steps of:

receiving a video baseband signal originating from said channel selection device, said video baseband signal having vertical blanking intervals that include a plurality of horizontal scanning intervals;

separating vertical and horizontal synchronizing signals from said received video baseband signal;

selecting a first horizontal scanning interval in a vertical blanking interval of said received video baseband signal;

generating a black reference level by sampling, holding and storing a level of said received video baseband signal during said first horizontal scanning interval;

interrupting said input video signal during a second horizontal scanning interval in said vertical blanking interval;

generating a white reference level by sampling, holding and storing a level of said received video baseband signal during said interruption of said input video signal;

interrupting said input video signal during a third horizontal scanning interval in said vertical blanking interval;

supplying a substitute RF video signal to said channel selection device during said interruption of said input video signal during said third horizontal scanning interval, said substitute RF video signal being at a frequency that corresponds to said predetermined channel;

generating a test level by sampling, holding and storing a level of said received baseband signal while said substitute RF video signal is being supplied to said channel selection device;

comparing said test level to said black and white reference levels; and determining that said predetermined channel has been changed when said test level is closer to said white reference level than to said black reference level.

69. The method of claim 68 wherein said first, second and third horizontal scanning intervals are consecutive horizontal scanning intervals.

70. The method of claim 68, further comprising repeating all of said steps, other than said determining step in sequence a predetermined number of times.

71. The method of claim 69, wherein a signal level of said substitute RF video signal is increased with each repetition of said supplying step.

72. Apparatus for determining whether a predetermined channel selected by a channel selection device has been changed, said channel selection device receiving an input RF video signal, said apparatus comprising:

means for receiving a video baseband signal originating from said channel selection device, said video baseband signal having vertical blanking intervals that include a plurality of horizontal scanning intervals;

means for separating vertical and horizontal synchronizing signals from said received video baseband signal;

means for selecting a first horizontal scanning interval in a vertical blanking interval of said received video baseband signal;

means for generating a black reference level by sampling, holding and storing a level of said received video baseband signal during said first horizontal scanning interval;

means for interrupting said input video signal during a second horizontal scanning interval in said vertical blanking interval;

means for generating a white reference level by sampling, holding and storing a level of said received video baseband signal during said interruption of said input video signal;

means for interrupting said input video signal during a third horizontal scanning interval in said vertical blanking interval;

means for supplying a substitute RF video signal to said channel selection device during said interruption of said input video signal during said third horizontal scanning interval, said substitute RF video signal being at a frequency that corresponds to said predetermined channel;

means for generating a test level by sampling, holding and storing a level of said received baseband signal while said substitute RF video signal is being supplied to said channel selection device; and comparison means for comparing said test level to said black and white reference levels and for determining that said predetermined channel has been changed when said test level is closer to said white reference level than to said black reference level.

73. The apparatus of claim 72, wherein said first, second and third horizontal scanning intervals are consecutive horizontal scanning intervals.

* * * * *